(12) United States Patent
Nichol et al.

(10) Patent No.: US 12,117,639 B2
(45) Date of Patent: Oct. 15, 2024

(54) FILM-BASED LIGHTGUIDE WITH INTERIOR LIGHT DIRECTING EDGES WITH CURVED SECTIONS IN A TAPERED LIGHT MIXING REGION

(71) Applicant: Azumo, Inc., Chicago, IL (US)

(72) Inventors: Anthony Nichol, Orono, MN (US); Zane Coleman, Elmhurst, IL (US)

(73) Assignee: Azumo, Inc., Chicago, IL (US)

( * ) Notice: Subject to any disclaimer, the term of this patent is extended or adjusted under 35 U.S.C. 154(b) by 0 days.

(21) Appl. No.: 18/219,520

(22) Filed: Jul. 7, 2023

(65) Prior Publication Data

US 2023/0350122 A1    Nov. 2, 2023

Related U.S. Application Data

(63) Continuation-in-part of application No. 17/931,369, filed on Sep. 12, 2022, now Pat. No. 11,703,626, which is a continuation of application No. 17/322,856, filed on May 17, 2021, now Pat. No. 11,442,213, which is a continuation of application No. 16/260,072, filed on Jan. 28, 2019, now Pat. No. 11,009,646, which is a continuation-in-part of
(Continued)

(51) Int. Cl.
*F21V 8/00*    (2006.01)

(52) U.S. Cl.
CPC ......... *G02B 6/0048* (2013.01); *G02B 6/0018* (2013.01); *G02B 6/0028* (2013.01); *G02B 6/0035* (2013.01); *G02B 6/005* (2013.01); *G02B 6/0065* (2013.01); *G02B 6/0068* (2013.01); *G02B 6/0076* (2013.01); *G02B 6/0088* (2013.01); *G02B 6/009* (2013.01); *G02B 6/0045* (2013.01); *G02B 6/0046* (2013.01); *G02B 6/0078* (2013.01)

(58) Field of Classification Search
CPC .... G02B 6/0006; G02B 6/0008; G02B 6/001; G02B 6/0011–0096
See application file for complete search history.

(56) References Cited

U.S. PATENT DOCUMENTS

| 6,354,724 | B1 * | 3/2002 | Sakashita | G01N 21/8806 356/402 |
| 2004/0114342 | A1 | 6/2004 | Lin et al. | |

(Continued)

FOREIGN PATENT DOCUMENTS

WO    2018144720 A1    9/2018

*Primary Examiner* — Keith G. Delahoussaye

(57) ABSTRACT

In one embodiment, a film-based lightguide comprises a plurality interior light directing edges in a tapered light mixing region with curved sections which redirect light within the tapered light mixing region of the film. The interior light directing edges may be formed by cuts in the film that create an air gap between internal edges of the film. In one embodiment, the difference between radii of curvature of neighboring radii of arc sections of interior light directing edges is within 20% of an average distance between the arc sections. In one embodiment, the interior light directing edges totally internally reflect light propagating through the tapered light mixing region such that the light propagates at a smaller angle to a direction orthogonal to a width direction and orthogonal to the thickness direction of the film.

20 Claims, 11 Drawing Sheets

Related U.S. Application Data application No. 15/618,336, filed on Jun. 9, 2017, now Pat. No. 10,191,199, which is a continuation of application No. 14/207,045, filed on Mar. 12, 2014, now Pat. No. 9,690,032.

(60) Provisional application No. 63/489,867, filed on Mar. 13, 2023, provisional application No. 61/777,632, filed on Mar. 12, 2013.

(56) References Cited

U.S. PATENT DOCUMENTS

| | | |
|---|---|---|
| 2005/0194896 A1 | 9/2005 | Sugita et al. |
| 2007/0035843 A1 | 2/2007 | Casserly |
| 2009/0027588 A1* | 1/2009 | Medendorp, Jr. .... G02B 6/0076 349/62 |
| 2011/0227487 A1* | 9/2011 | Nichol ................ G02B 6/0018 362/613 |
| 2011/0255303 A1* | 10/2011 | Nichol ................ G02B 6/0088 362/606 |
| 2013/0235608 A1* | 9/2013 | Tsai ...................... F21S 41/151 362/551 |
| 2018/0335629 A1 | 11/2018 | Cheng et al. |
| 2019/0107665 A1 | 4/2019 | Bu et al. |
| 2020/0310020 A1 | 10/2020 | Sasaki et al. |

* cited by examiner

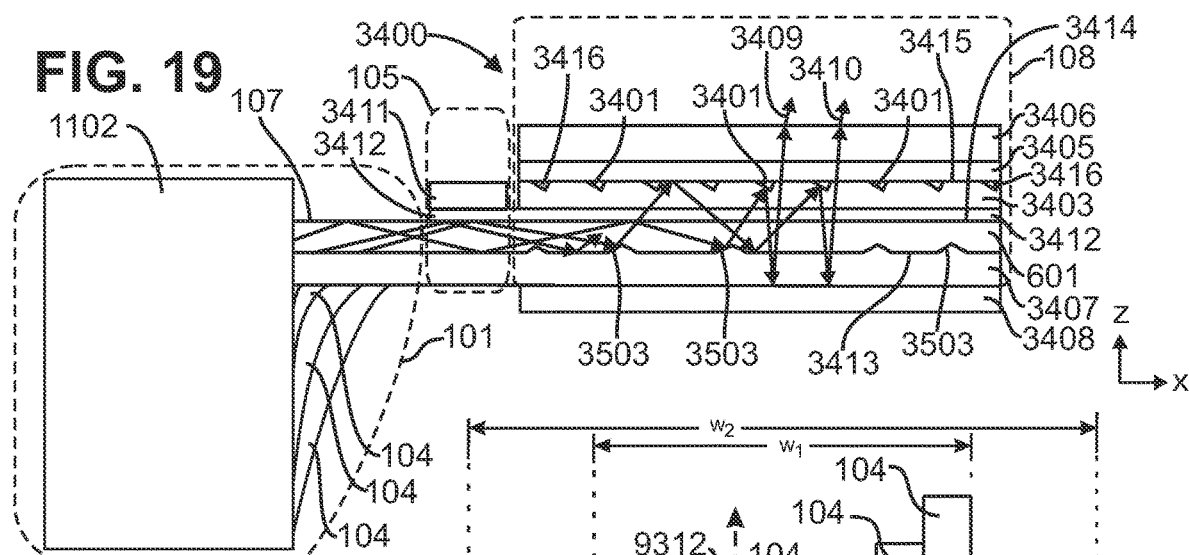
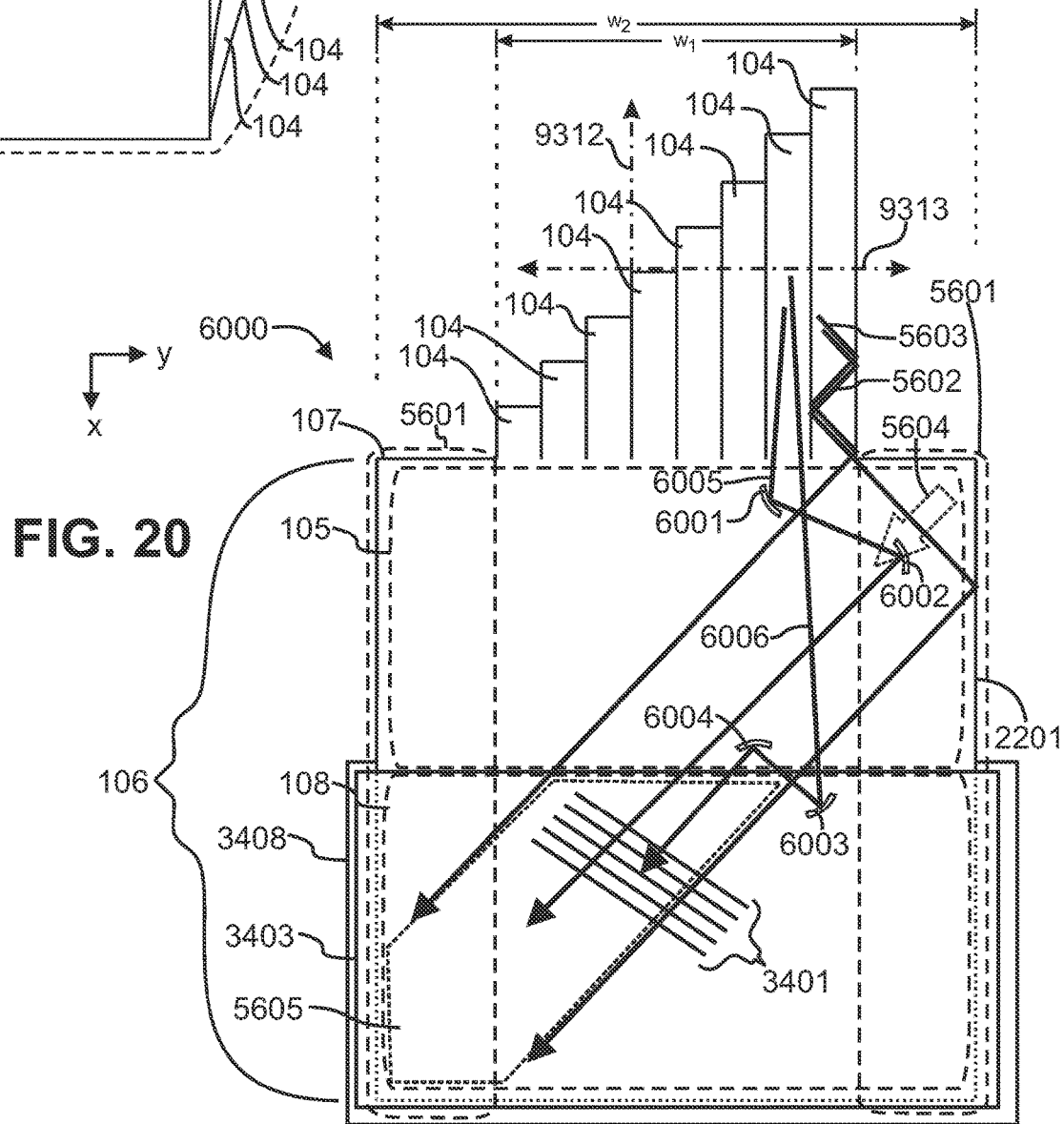

FILM-BASED LIGHTGUIDE WITH INTERIOR LIGHT DIRECTING EDGES WITH CURVED SECTIONS IN A TAPERED LIGHT MIXING REGION

CROSS-REFERENCE TO RELATED APPLICATIONS

This application claims the benefit of U.S. Provisional Application No. 63/489,867, entitled "Film-based lightguide with interior light directing edges forming angle redirectors," filed Mar. 13, 2023 and is a continuation-in-part application of U.S. application Ser. No. 17/931,369, entitled "Light emitting device with film-based lightguide and added reflecting surfaces," filed on Sep. 12, 2022, which is a continuation application of U.S. application Ser. No. 17/322,856, entitled "Film-based lightguide with extended coupling lightguide region," filed on May 17, 2021, which is a continuation application of U.S. application Ser. No. 16/260,072, issued as U.S. Pat. No. 11,009,646, entitled "Film-based lightguide with interior light directing edges in a light mixing region," filed on Jan. 28, 2019, which is a continuation-in-part application of U.S. application Ser. No. 15/618,336, issued as U.S. Pat. No. 10,191,199, entitled "Display including a guide element and film lightguide bent around the guide and behind the display," filed on Jun. 9, 2017, which is a continuation application of U.S. application Ser. No. 14/207,045, issued as U.S. Pat. No. 9,690,032, entitled "Lightguide including a film with one or more bends," filed on Mar. 12, 2014, which claims the benefit of U.S. Provisional Application No. 61/777,632, entitled "Illumination device including a frame and a film with one or more bends," filed Mar. 12, 2013, the entire contents of each are incorporated herein by reference.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Conventionally, in order to reduce the thickness of displays and backlights, edge-lit configurations using rigid lightguides have been used to receive light from the edge of and direct light out of a larger area face. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one embodiment, a film based lightguide comprises a plurality interior light directing edges separated spatially forming angle redirectors positioned in a light mixing region which redirect the axis (or the average angle of the light propagating between two neighboring interior light directing edges forming a channel) of incident light from a first angle to a different second angle closer to a direction orthogonal to the array direction of the array of coupling lightguides or in a direction perpendicular to an average direction from the light mixing region to the light emitting region of the lightguide. The angle redirectors may have curved regions and linear sections. In one embodiment, the ends of the plurality of coupling lightguides comprise spatially distributing end portions with curved lateral edges that distribute light in the coupling lightguides into a wider section of a tapered light emitting region.

In one embodiment, a film-based lightguide includes a film including a body having lateral edges opposing each other in a width direction, a first surface, and a second surface opposing the first surface in a thickness direction of the film orthogonal to the width direction; a light emitting region of the film defined by a plurality of light extracting features; a plurality of coupling lightguides in a form of strips arrayed in an array direction and extended from the body of the film in an extended direction perpendicular to the thickness direction and perpendicular to the array direction of the coupling lightguides, the plurality of coupling lightguides folded along a fold line including fold points at which the plurality of coupling lightguides begin to fold; a light mixing region of the film positioned along the film between the plurality of coupling lightguides and the light emitting region; and an extended coupling lightguide region of the coupling lightguides between the fold line and the light mixing region where the coupling lightguides are not folded. In one embodiment, an average length of the plurality of coupling lightguides in the extended coupling lightguide region in the extended direction is greater than 0.5 times or 1 times an average length of the plurality of coupling lightguides between the fold line and light input ends of the plurality of coupling lightguides opposite the light mixing region. In another embodiment, an average length of the plurality of coupling lightguides in the extended coupling lightguide region in the extended direction is greater than 1.5 times or 2 times an average length of the light mixing region between the plurality of coupling lightguides and the light emitting region. In another embodiment, one or more of the coupling lightguides of the plurality of coupling lightguides comprises lateral edges oriented at angles greater than 0 degrees to each other in the extended coupling lightguide region. In one embodiment, a total width of the plurality of coupling lightguides in the extended coupling lightguide region is less at the fold line than at the light mixing region. In a further embodiment, lateral edges of one or more of the plurality of coupling lightguides on a side of the fold line closer to the light input ends of the plurality of coupling lightguides are parallel and the extended coupling lightguide region comprises a region of tapered coupling lightguides. In another embodiment, widths of the plurality of coupling lightguides decrease in the region of tapered coupling lightguides in a direction from the light mixing region to the fold line in a plane orthogonal to the thickness direction.

In one embodiment, the plurality of coupling lightguides have a total lateral width in the width direction in the extended coupling lightguide region less than a total width of the light mixing region. In a further embodiment, a difference between a coupling lightguide orientation angle in the extended coupling lightguide region for two or more coupling lightguides is greater than 0 degrees such that they are not parallel. In one embodiment, orientation angles for one or more first coupling lightguides of the plurality of coupling lightguides in the extended coupling lightguide region or in a sub-region of the extended coupling lightguide region is greater than 5 degrees and orientation angles for one or more second coupling lightguides of the plurality of coupling lightguides different from the first coupling lightguides in the extended coupling lightguide region or in a sub-region of the extended coupling lightguide region is less than −5 degrees. In another embodiment, widths of the plurality of coupling lightguides decrease in the extended coupling lightguide region in a direction from the light mixing region to the fold line in a plane orthogonal to the thickness direction.

In one aspect, a film-based lightguide includes a film with a light emitting region, a plurality of coupling lightguides in a form of an array of strips extended from the body of the film and folded along a fold line, a light mixing region of the film positioned along the film between the plurality of coupling lightguides and the light emitting region, and an extended coupling lightguide region of the coupling lightguides between the fold line and the light mixing region where the plurality of coupling lightguides are not folded. For one or more of the plurality of coupling lightguides, a length along a coupling lightguide between the fold line and a light input end of the coupling lightguide is less than a length of the coupling lightguide in the extended coupling lightguide region. In another embodiment, for two or more of the plurality of coupling lightguides, a length along a coupling lightguide between the fold line and the light input end of the coupling lightguide is less than a length of the coupling lightguide in the extended coupling lightguide region in the extended direction. In another embodiment, a first coupling lightguide of the plurality of coupling lightguides has a shortest length along the first coupling lightguide from the light mixing region to a light input end of the first coupling lightguide of the plurality of coupling lightguides, and a length between the fold line and the light input end of the first coupling lightguide is less than a length of the first coupling lightguide in the extended coupling lightguide region in the extended direction. In one embodiment, a second coupling lightguide of the plurality of coupling lightguides different from the first coupling lightguide has a length from the light mixing region to a light input end of the coupling lightguide closest to the shortest length, and a length along the second coupling lightguide between the fold line and the light input end of the second coupling lightguide is less than a length of the second coupling lightguide in the extended coupling lightguide region in the extended direction. In another embodiment, a length of the extended coupling lightguide region in the extended direction is longer than a length of the light mixing region in the extended direction. In one embodiment, for each of the plurality of coupling lightguides a length along a coupling lightguide between the fold line and a light input end of the coupling lightguide is less than the length of the coupling lightguide in the extended coupling lightguide region in the extended direction. In one embodiment, a total width of the plurality of coupling lightguides in the extended coupling lightguide region is less at the fold line than at the light mixing region. In another embodiment, the extended coupling lightguide region comprises a tapered region adjacent the fold line and a linear region between the tapered region and the light mixing region.

BRIEF DESCRIPTION OF THE DRAWINGS

FIG. 19 is a cross-sectional side view of one embodiment of a light emitting device comprising low angle directing features.

FIG. 20 is a top view of portions of one embodiment of a light emitting device with interior light directing edges that reduce the visibility of an angular shadow region.

DETAILED DESCRIPTION

Figure 1:
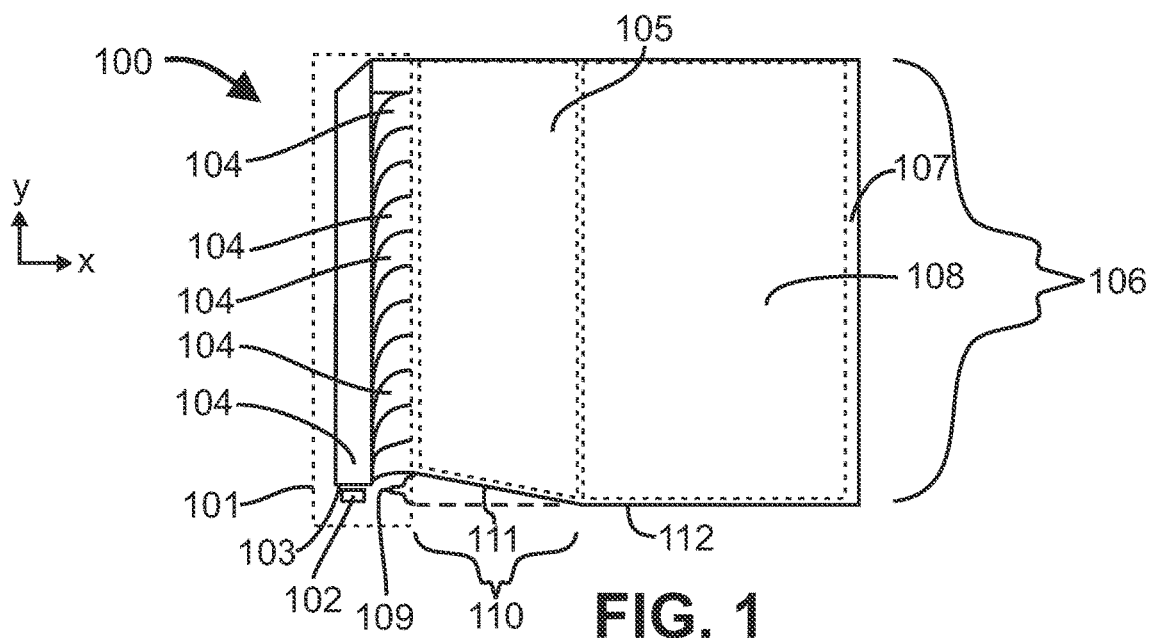
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any face (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5-micron region or layer of a film or it may be a 3-millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

"Adjacent" is generally used to refer to an element that is located next or in contact with the adjacent element without an object therebetween. In the context of this application, adjacent may include an air gap between two adjacent elements or the elements may be contacting each other.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element toward a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, in this example, the peak angular intensity is a range of angles. When the light emitting device has a light emitting device optical axis in a range of angles, the optical axis of the light emitting device includes the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Various light emitting devices, components or layers of light emitting devices, displays, electroluminescent displays, their methods of manufacture, and their configurations can be used with embodiments disclosed herein and include those disclosed in U.S. patent application Ser. No. 13/088,167, the contents of which are incorporated by reference herein.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one face or edge of the core material with a refractive index less than a refractive index of the core material. In other embodiment, the light input coupler includes a plurality of coupling lightguides wherein a portion of light from a light source incident on a face of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radio fluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

LED Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e., such as not on the same circuit board). In one embodiment, the array of LEDs is an array including at least two selected from the group: red, green, blue, and white LEDs. In this embodiment, the variation in the white point due to manufacturing or component variations can be reduced. In another embodiment, the LED array includes at least one cool white LED and one red LED. In this embodiment, the CRI, or Color Rendering Index, is higher than the cool white LED illumination alone.

LED Array Location

In one embodiment, a plurality of LED arrays are disposed to couple light into a single light input coupler or more than one light input coupler. In a further embodiment, a plurality of LEDs disposed on a circuit board are disposed to couple light into a plurality of light input couplers that direct light toward a plurality of sides of a light emitting device including a light emitting region. In a further embodiment, a light emitting device includes an LED array and light input coupler folded behind the light emitting region of the light emitting device such that the LED array and light input coupler are not visible when viewing the center of the light emitting region at an angle perpendicular to the surface. In another embodiment, a light emitting device includes a single LED array disposed to couple light into at least one light input coupler disposed to direct light into the light emitting region from the bottom region of a light emitting device. In one embodiment, a light emitting device includes a first LED array and a second LED array disposed to couple light into a first light input coupler and a second light input coupler, respectively, wherein the first light input coupler and second light input coupler are disposed to direct light into the light emitting region from the top region and bottom region, respectively, of a light emitting device. In a further embodiment, a light emitting device includes a first LED array, a second LED array, and a third LED array, disposed to couple light into a first light input coupler, a second light input coupler, and a third light input coupler, respectively, disposed to direct light into the light emitting region from the bottom region, left region, and right region, respectively, of a light emitting device. In another embodiment, a light emitting device includes a first LED array, a second LED array, a third LED array, and a fourth LED array, disposed to couple light into a first light input coupler, a second light input coupler, a third light input coupler, and a fourth light input coupler, respectively, disposed to direct light into the light emitting region from the bottom region, left region, right region, and top region, respectively, of a light emitting device.

Wavelength Conversion Material

In another embodiment, the LED is a blue or ultraviolet LED combined with a phosphor. In another embodiment, a light emitting device includes a light source with a first activating energy and a wavelength conversion material which converts a first portion of the first activating energy into a second wavelength different than the first. In another embodiment, the light emitting device includes at least one wavelength conversion material selected from the group: a fluorophore, phosphor, a fluorescent dye, an inorganic phosphor, photonic bandgap material, a quantum dot material, a fluorescent protein, a fusion protein, a fluorophores attached to protein to specific functional groups (such as amino groups (active ester, carboxylate, isothiocyanate, hydrazine), carboxyl groups (carbodiimide), thiol (maleimide, acetyl bromide), azide (via click chemistry or non-specifically (glutaraldehyde))), quantum dot fluorophores, small molecule fluorophores, aromatic fluorophores, conjugated fluorophores, a fluorescent dye, and other wavelength conversion material.

In one embodiment, the light source includes a semiconductor light emitter such as an LED and a wavelength conversion material that converts a portion of the light from the emitter to a shorter or longer wavelength. In another embodiment, at least one selected from the group: light input coupler, cladding region, coupling lightguide, input surface optic, coupling optic, light mixing region, lightguide, light extraction feature or region, and light emitting surface includes a wavelength conversion material.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

Coupling Lightguides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with cross-sectional dimensions of 40.5 millimeters by 0.2 millimeters.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling lightguide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending.

Width of the Coupling Lightguides

In one embodiment, the dimensions of the coupling lightguides are substantially equal in width and thickness to each other such that the input surface areas for each edge surface are substantially the same. In another embodiment, at least one selected from the group: coupling lightguide width, the largest width of a coupling waveguide, the average width of the coupling lightguides, and the width of each coupling lightguides is selected from a group of: 0.5 mm-1 mm, 1 mm-2 mm, 2 mm-3 mm, 3 mm-4 mm, 5 mm-6 mm, 0.5 mm-2 mm, 0.5 mm-25 mm, 0.5 mm-10 mm, 10-37 mm, and 0.5 mm-5 mm. In one embodiment, at least one selected from the group: the coupling lightguide width, the largest width of a coupling waveguide, the average width of the coupling lightguides, and the width of each coupling lightguides is less than 20 millimeters.

Separation Between the Lightguide Region Edge and the Coupling Lightguide Nearest the Edge In one embodiment, a coupling lightguide nearest the edge of the film-based lightguide is spaced from the edge of the film adjacent the side. For example, in one embodiment, the first coupling lightguide along a side of a film-based lightguide is separated from the edge of the lightguide region by a distance greater than 1 mm. In another embodiment, the first coupling lightguide along a side of a film-based lightguide is separated from the edge of the lightguide region by a distance greater than one selected from the group: 0.5, 1, 2, 4, 6, 8, 10, 20, and 50 millimeters. In one embodiment, the distance between the lightguide region edge and the first coupling lightguide along a side improves the uniformity in the lightguide region due to the light from the first coupling lightguide reflecting from the lateral edge of the lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

Interior Light Directing Edge

In one embodiment, the interior region of one or more coupling lightguides, the light mixing region, the lightguide region, or the light emitting region includes one or more interior light directing edges. The interior light directing edge may be formed by cutting or otherwise removing an interior region of the coupling lightguide, light mixing region, lightguide region, or light emitting region such that an air gap is created between two internal edges of the film. In one embodiment, the interior light directed edge redirects by total internal reflection a first portion of light within the coupling lightguide, light mixing region, lightguide region, or light emitting region. In one embodiment, the interior light directing edges provide an additional level of control for directing the light within the coupling lightguides, light mixing region, lightguide region, or light emitting region and can provide light flux redistribution within the coupling lightguide, light mixing region, lightguide region, and/or within the light emitting region to achieve a predetermined light output pattern (such as higher uniformity or higher flux output) in a specific region.

In one embodiment, at least one interior light directing edge is positioned within a coupling lightguide, light mixing region, lightguide region, or light emitting region to receive light propagating within the coupling lightguide, light mixing region, lightguide region, or light emitting region within a first angular range from the optical axis of light traveling within the coupling lightguide, light mixing region, lightguide region, or light emitting region and direct the light to a second, different angular range propagating within the coupling lightguide, light mixing region, lightguide region, or light emitting region. In one embodiment, the first angular range is selected from the group: 70-89, 70-80, 60-80, 50-80, 40-80, 30-80, 20-80, 30-70, and 30-60 degrees; and the second angular range is selected from the group: 0-10, 0-20, 0-30, 0-40, 0-50, 10-40, and 20-60 degrees. In one embodiment, a plurality of interior light directing edges are formed after the coupling lightguides are stacked. In another embodiment, one or more coupling lightguides, the light mixing region, the lightguide region, or the light emitting region has interior light directing edges that form a channel that spatially separates light traveling within the coupling lightguide. In one embodiment, a length along the optical axis of light travelling within the coupling lightguide, light mixing region, lightguide region, or light emitting region of one or more interior light directing edges is greater than one selected from the group: 20%, 30%, 40%, 50%, 60%, 70%, 80%, and 90% of a length from an input surface of the coupling lightguide to the lightguide region or the light mixing region along the optical axis of light traveling within the coupling lightguide, light mixing region, lightguide region, or light emitting region, respectively. In another embodiment, the interior light directing edges are positioned within one selected from the group: 1, 5, 7, 10, 15, 20, 25 millimeters from the input surface of the coupling lightguides, the boundary where the coupling lightguide meets the lightguide region or light mixing region, or the boundary between the light mixing region and the light emitting region of the film-based lightguide. In one embodiment, one or more coupling lightguides have interior light directing edges positioned within one selected from the group: 1, 5, 7, 10, 15, 20, 25 millimeters from the light input surface of the one or more coupling lightguides. In a further embodiment, one or more coupling lightguides have at least one interior light directing edge with a width of the interior light directing edge in a direction parallel to the fold line greater than one selected from the group of: 5, 10, 15, 20, 25, 30, 35, 40, 45, 50, and 60 percent of a width of the coupling lightguide at the lightguide region. The fold line is the line including the fold points at which the coupling lightguides begin to fold from the light mixing region (or light emitting region) and the fold line may be perpendicular to the extended direction of the coupling lightguides for a 90-degree fold. In a further embodiment, at least one coupling lightguide has two adjacent interior light directing edges wherein the average separation between the interior light directing edges in a direction parallel to a fold line is greater than one selected from the group of: 5, 10, 15, 20, 25, 30, 35, 40, 45, 50, and 60 percent of the width of the coupling lightguide at the lightguide region.

In another embodiment, at least one coupling lightguide, light mixing region, lightguide region, or light emitting region includes a plurality of channels defined by at least one interior light directing edge and a lateral edge of the coupling lightguide, light mixing region, lightguide region, or light emitting region. In a further embodiment, the coupling lightguide, light mixing region, lightguide region, or light emitting region includes a channel defined by a first interior light directing edge and a second interior light directing edge. In one embodiment, one or more channels defined by interior light directing edges and/or lateral edges of the coupling lightguide, light mixing region, lightguide region, or light emitting region separate angular ranges of light from the light source into spatially separated channels that can transfer the spatial separation to the lightguide region, light mixing region, or light emitting region. In one embodiment, the channels are parallel to the extended direction of an array of coupling lightguides. In another embodiment, the light source includes a plurality of light emitting diodes formed in an array such that the optical axis of a first light source enters a first channel defined in a coupling lightguide and the optical axis of a second source enters a second channel defined in a coupling lightguide. In one embodiment, one or more interior light directing edges extend from within one or more coupling lightguides into the lightguide region of the lightguide. In another embodiment, the lightguide region has one or more interior light directing edges. In a further embodiment, the lightguide region has one or more interior light directing edges and one or more coupling lightguides include one or more interior light directing edges. In another embodiment, one or more interior light directing edges extend from within one or more coupling lightguides into the light emitting region of the lightguide. In this embodiment, for example, a light source including red, green, and blue light emitting diodes in a linear array adjacent a first, second, and third channel of a plurality of coupling lightguides, respectively can be directed to an alternating first, second, and third pixel region within the light emitting region to create a spatial arrangement of repeating red, green, blue, red, green, blue, red, green, blue color pixels in a light emitting region for a color display or sign. In another embodiment, the interior region of the light mixing region or lightguide region includes at least one interior light directing edge.

In one embodiment, the light mixing region comprises a plurality of interior light directing edges extending at least a portion of the length of the light mixing region between the coupling lightguides and the light emitting region. In another embodiment, the interior light directing edges extend at an angle toward the lateral edges of the light mixing region in the light mixing regions. In this embodiment, the interior light directing edges may create tapered channels in a tapered channel region within the light mixing region that direct light flux received across a first width dimension to a larger width dimension closer to the light emitting region in a width direction (which may be the array direction of the array of coupling lightguides) perpendicular to the thickness direction of the film and perpendicular to the direction of the optical axis of light propagating in the light mixing region. In one embodiment, the interior light directing edges are angled to each other in a tapered channel region of the light mixing region and substantially parallel to each other in a linear channel region of the light mixing region. In one embodiment, the interior light directing edges in the light mixing region form channels for directing light flux by total internal reflection from the coupling lightguides into a larger or smaller width in the width direction prior to or within the light emitting region. In one embodiment, the total width in the width direction of the tapered channels at the end of the light mixing region near the coupling lightguides is less than one selected from the group of 1, 0.9, 0.8, 0.7, 0.6, and 0.5 times the width of the channels closer to the light emitting region in the width direction. In this embodiment, the channels may direct portions of the flux received from the coupling lightguides to desired regions of the light emitting region in the width direction prior to the light entering the light emitting region, for example. In one embodiment, the interior light directing edges form a plurality of reflecting surfaces between the lateral edges of the film in one or more regions (such as the light mixing region or light emitting region) that may or may not extend through the full thickness of the film or core layer of the film. In one embodiment, the average depth of an internal light directing edge in the film-based lightguide is less than one selected from the group of 95%, 90%, 80%, 70%, 60%, 50%, and 40% of the thickness of the film-based lightguide along the internal light directing edge. In one embodiment, the plurality of reflecting surfaces may form channels that have a channel orientation angle. The channel orientation angle is defined as the average angle between the interior light directing edges (or reflecting surfaces) of the channel from the optical axis of the light propagating through the light mixing region (which may be a direction orthogonal to the array direction of an array of coupling lightguides and orthogonal to the thickness direction of the film). If one or more interior light directing edges or reflecting surfaces are curved, then the angle for that interior light directing edge or reflecting surface is the total average angle across the curved (and straight if it also comprises straight sections) interior light directing edge or reflecting surface. In one embodiment, the orientation angle of a channel comprising interior light directing edges or reflecting surfaces or the average orientation angle of a plurality of channels comprising interior light directing edges or reflecting surfaces is at least one selected from the group: 0 to 5 degrees, 1 to 10 degrees, 10 to 20 degrees, 20 to 30 degrees, 30 to 40 degrees, 40 to 50 degrees, 60 to 70 degrees, 70 to 80 degrees, 1 to 80 degrees, 10 to 70 degrees, 20 to 60 degrees, 30 to 50 degrees, greater than 5 degrees, greater than 10 degrees, greater than 20 degrees, 0 to −5 degree, −1 to −10 degrees, −10 to −20 degrees, −20 to −30 degrees, −30 to −40 degrees, −40 to −50 degrees, −60 to −70 degrees, −70 to −80 degrees, −1 to −80 degrees, −10 to −70 degrees, −20 to −60 degrees, −30 to −50 degrees, less than −5 degrees, less than −10 degrees, and less than −20 degrees. For example, in one embodiment, a film-based lightguide comprises a plurality of channels defined by interior light directing edges wherein the channels have orientation angles of −9 degrees, −3 degrees, 0 degrees, +3 degrees, and 9 degrees across the width of the light mixing region in the width direction. In one embodiment, the channel orientation angles are symmetric about the central channel (such as angles −c degrees, −b degrees, −a degrees, 0 degrees, +a degrees, +b degrees, and +c degrees with the 0 degree channel being the central channel and a, b, and c are different numbers) or symmetric about the middle of the width of the portion of the light mixing region receiving light from the plurality of channels in the width direction. In one embodiment, the film-based lightguide comprises a plurality of channels defined by interior light directing edges wherein the channels have orientation angles of between −5 degrees and −15 degrees, between −2 degrees and −10 degrees, between −3 degrees and +3 degrees, between +2 degrees and +10 degrees, and between +5 and +15 degrees in order across the width of the light mixing region in the width direction. In one embodiment, the difference between channel orientation angles for at least two channels is greater than one selected from the group: 5, 10, 15, 20, 25, and 30 degrees. In one embodiment, the plurality of coupling lightguides have a total width in the width direction at the light mixing region that is less than one selected from the group of 1, 0.9, 0.8, 0.7, 0.6, and 0.5 times the largest width of the light mixing region in the width direction.

Spatially Distributing End Portions

In one embodiment, a plurality of coupling lightguides in the array of coupling lightguides join the light mixing region of the lightguide at different orientation angles such that the axes (or average angle of the light propagating out of the coupling lightguide) of light from the coupling lightguides propagate at angles greater than zero degrees from a direction orthogonal to the array direction of the array of coupling lightguides and the thickness direction of the lightguide. In one embodiment the orientation angles of the coupling lightguides (and/or the average angle of light propagating out of the coupling lightguide into the light mixing region) at the end portions of the coupling lightguides where they meet the light mixing region redistribute the light flux output from the coupling lightguides such that light from the plurality of coupling lightguides is oriented such that upon propagation through the light mixing region is spatially distributed into a larger region (larger width light mixing region) in a light mixing region that tapers outward from where the ends of the coupling lightguides meet the light mixing region toward the light emitting region. In one embodiment, the orientation angle at the end portions increases the further from the center of the width of the light mixing region where the coupling lightguides meet the light mixing region. In one embodiment, the lateral edges of a plurality of coupling lightguides in the array of coupling lightguides curve away from the middle region (or central region) of the width of the light mixing region or curve in a direction toward lateral edges of the light mixing region as they connect to the light mixing region. In one embodiment, the spatially distributing end portions direct light to angle redirectors in the light mixing region to distribute the light flux output from the end portions of the coupling lightguides to a larger width region of the light mixing region (with a width larger than the width of the light mixing region proximate the end portions of the coupling lightguides), such as, for example, in a tapered light mixing region comprising angle redirectors in a region of a tapered light mixing region with a larger width than the region of the tapered light mixing region proximate the end portions of the coupling lightguides. In one embodiment, the lateral edges of the plurality of coupling lightguides comprise linear sections perpendicular to the array direction of the array of coupling lightguides (and perpendicular to the thickness direction of the film) and the end portions adjacent the light mixing region comprise curved lateral edges curving outward toward lateral edges of a tapered (or wider) light mixing region or angled sections at an angle greater than 0 degrees from the direction perpendicular to the array direction of the array of coupling lightguides. In one embodiment, the lateral edges of the plurality of coupling lightguide comprise edges that curve outward in the form of an arc with a radius greater than one selected from the group of: 2, 4, 5, 8, and 10 times the average width of the plurality of coupling lightguides in the array direction of the array of the plurality of coupling lightguides. In one embodiment, the spatially distributing end portions of the plurality of coupling lightguides comprise angled sections oriented at an angles greater than 5, 10, 15, or 20 degrees from a direction orthogonal to the array direction of the array of coupling lightguides and the thickness direction of the lightguide. In one embodiment, the lateral edges of the central (in the width direction) coupling lightguide (such as can occur the case of an odd number of coupling lightguides) curve outward in opposite directions (toward opposite lateral edges of the light mixing region). In one embodiment, the lateral edges of the central (in the width direction) coupling lightguide (such as can occur the case of an odd number of coupling lightguides) do not curve outward toward opposite lateral edges of the light mixing region. In another embodiment the lateral edges of the two central (in the width direction) coupling lightguides (such as can occur the case of an even number of coupling lightguides) curve outward in opposite directions (toward opposite lateral edges of the light mixing region). In one embodiment, a portion of the total coupling lightguides in the array of coupling lightguides comprise end portions that that join the light mixing region of the lightguide at different orientation angles such that the axes (or average angle of the light propagating out of the coupling lightguide) of light from the more than one coupling lightguides propagate at angles greater than zero degrees from a direction orthogonal to the array direction of the array of coupling lightguides and the thickness direction of the lightguide. For example, in one embodiment, one lateral edge of every fourth coupling lightguide in an array of coupling lightguides may comprise an end portion where the lateral edge curves outward in the width direction toward the lateral edge of the light mixing region (for example the nearest lateral edge). In one embodiment, less than one selected from the group of 95%, 90%, 85%, 80%, 75%, 50%, 40% and 30% of the coupling lightguides in an array of coupling lightguides comprises a lateral edge that curves toward the lateral edges of the light mixing region and, optionally, the remaining coupling lightguides comprises linear lateral edges at the light mixing region at angles perpendicular to the array direction of the array of coupling lightguides.

Coupling Lightguide Orientation Angle

In a further embodiment, at least one portion of the array of coupling lightguides is disposed at a first coupling lightguide orientation angle at the edge of at least one of the light mixing region and light emitting region which it directs light into. A coupling lightguide or a region of a coupling lightguide may have an average orientation angle. The coupling lightguide orientation angle (or coupling lightguide orientation angle for a region of the coupling lightguide) is defined as the angle between the coupling lightguide axis and the direction parallel to the major component of the direction of the coupling lightguides to the light emitting region of the lightguide. The major component of the direction of the coupling lightguide to the light emitting region of the lightguide is orthogonal to the array direction of the array of coupling lightguides at the light mixing region (or lightguide region if they extend directly from the light emitting region). In one embodiment, the orientation angle of a coupling lightguide or the average orientation angle of a plurality of coupling lightguides is at least one selected from the group: 1-10 degrees, 10-20 degrees, 20-30 degrees, 30-40 degrees, 40-50 degrees, 60-70 degrees, 70-80 degrees, 1-80 degrees, 10-70 degrees, 20-60 degrees, 30-50 degrees, greater than 5 degrees, greater than 10 degrees, and greater than 20 degrees. The coupling lightguide axis may be defined for a coupling lightguide or a region of the coupling lightguide. The coupling lightguide axis is defined as the average angle of the lateral edges of the coupling lightguide from the direction orthogonal to the array direction of the array of coupling lightguides at the light mixing region (or lightguide region if they extend directly from the light emitting region) and orthogonal to the thickness direction of the film). For regions of the coupling lightguide with curved edges, the angle of the lateral edges is the average angle of the lateral edge.

Non-Folded Coupling Light Guide

In a further embodiment, the film-based lightguide includes a non-folded coupling lightguide disposed to receive light from the light input surface and direct light toward the lightguide region without turning the light. In one embodiment, the non-folded lightguide is used in conjunction with one or more light turning optical elements, light coupling optical elements, coupling lightguides with light turning edges, or coupling lightguides with collimating edges. For example, a light turning optical element may be disposed above or below a non-folded coupling lightguide such that a first portion of light from a light source substantially maintains the direction of its optical axis while passing through the non-folded coupling lightguide and the light from the source received by the light turning optical element is turned to enter into a stacked array of coupling lightguides. In another embodiment, the stacked array of coupling lightguides includes folded coupling lightguides and a non-folded coupling lightguide.

In another embodiment, the non-folded coupling lightguide is disposed near an edge of the lightguide. In one embodiment, the non-folded coupling lightguide is disposed in the middle region of the edge of the lightguide region. In a further embodiment, the non-folded coupling lightguide is disposed along a side of the lightguide region at a region between the lateral sides of the lightguide region. In one embodiment, the non-folded coupling lightguide is disposed at various regions along one edge of a lightguide region wherein a plurality of light input couplers are used to direct light into the side of a lightguide region.

In another embodiment, the folded coupling lightguides have light collimating edges, substantially linear edges, or light turning edges. In one embodiment, at least one selected from the group: array of folded coupling lightguides, light turning optical element, light collimating optical element, and light source are physically coupled to the non-folded coupling lightguide. In another embodiment, folded coupling lightguides are physically coupled to each other and to the non-folded coupling lightguide by a pressure sensitive adhesive cladding layer and the thickness of the unconstrained lightguide film including the light emitting region and the array of coupling lightguides is less than one of the following: 1.2 times, 1.5 times, 2 times, and 3 times the thickness of the array of coupling lightguides. By bonding the folded coupling lightguides only to themselves, the coupling lightguides (when un-constrained) typically bend upward and increase the thickness of the array due to the folded coupling lightguides not being physically coupled to a fixed or relatively constrained region. By physically coupling the folded coupling lightguides to a non-folded coupling lightguide, the array of coupling lightguides is physically coupled to a separate region of the film which increases the stability and thus reduces the ability of the elastic energy stored from the bend to be released.

Regions of the Coupling Lightguides Between the Folds and the Light Mixing Region.

In one embodiment, the coupling lightguides are folded such that there is an extended coupling lightguide region of the coupling lightguides where in the extended coupling lightguide region the coupling lightguides are not folded over each other between the coupling lightguide fold, fold line, or fold region (along a fold line or fold region of the coupling lightguide fold prior to the fold) and the light mixing region. The average length of the coupling lightguides in the extended coupling lightguide region in the extended direction (the direction in which the coupling lightguides are extended which is perpendicular to the thickness direction and perpendicular to the array direction of the array of coupling lightguides) may be greater than one selected from the group of 0.05, 0.1, 0.2, 0.3, 0.4, 0.5, 1, 1.5, 2, 3, 4, and 5 times the average length of the coupling lightguides between the fold, fold region, or fold line and the ends of the coupling lightguides positioned to receive light from one or more light sources. In another embodiment, the average length of the coupling lightguides in the extended coupling lightguide region in the extended direction may be greater than one selected from the group of 0.05, 0.1, 0.2, 0.3, 0.4, 0.5, 1, 1.5, 2, 3, 4, and 5 times the average length of the light mixing region between the coupling lightguides and the light emitting region. In one embodiment, the extended coupling lightguide region of the coupling lightguides comprises a region of tapered coupling lightguides wherein the lateral edges of one or more of the coupling lightguides are non-parallel or are oriented at angles greater than 0 degrees to each other such that the width or average width of the one or more coupling lightguides in the extended coupling lightguide region of the coupling lightguides is larger on the side of the extended coupling lightguide region closer to the fold line, fold, or fold region than the width or average width of the one or more coupling lightguides on the side of the extended coupling lightguide region close to the light mixing region. In one embodiment, the width of the coupling lightguide or total width of the coupling lightguides on the light source side of the fold is greater than the width of the coupling lightguide or total width of the coupling lightguides, respectively, on the light mixing region side. In one embodiment, the lateral edges of one or more of the coupling lightguides on the side of the fold, fold line, or fold region in the coupling lightguides disposed to receive light from at least one light source are parallel and the extended coupling lightguide region comprises a region of tapered coupling lightguides. In one embodiment, the film-based lightguide comprises coupling lightguides with a constant width and parallel lateral edges on the light source side of the fold, fold line, or fold region and tapered lateral edges in the extended coupling lightguide region on the light mixing region side of the fold, fold line, or fold region. In one embodiment, tapering the extended coupling lightguide region allows the coupling lightguides to have a smaller total lateral width in the width direction than the light mixing region and/or light emitting region such that optics, and or light sources or mounts may be positioned along one or both sides of the folded and stacked coupling lightguides in the width direction such that do not extend (or extend less) past the lateral edges of the light mixing region and/or light emitting region of the film-based lightguide. Furthermore, in some embodiments, the taper added to one or more coupling lightguides (on the light source side and/or the light mixing region side of the fold, fold region, or fold line in the coupling lightguides) reduces the angular width in the plane comprising the width direction and the extended direction (or direction comprising the optical axis). In one embodiment, the difference between the coupling lightguide orientation angle in the extended coupling lightguide region for two or more coupling lightguides is greater than 0 degrees such that they are not parallel. In one embodiment, the orientation angle for one or more coupling lightguides in the extended coupling lightguide region or in a sub-region of the extended coupling lightguide region is greater than one selected from the group 3, 5, 10, 15, 20, and 25 degrees. In one embodiment, the orientation angles for one or more first coupling lightguides in the extended coupling lightguide region or in a sub-region of the extended coupling lightguide region is greater than one selected from the group 3, 5, 10, 15, 20, and 25 degrees (such as rotated in a clockwise direction from a top view) and the orientation angles for one or more second coupling lightguides different than the first coupling lightguides in the extended coupling lightguide region or in a sub-region of the extended coupling lightguide region is less than one selected from the group $-3, -5, -10, -15, -20$, and $-25$ degrees (such as rotated in a counter-clockwise direction from a top view). In one embodiment, one or more coupling lightguides comprise a first orientation angle in a first sub-region of the extended coupling lightguide region and a second orientation angle different from the first orientation angle in a second sub-region of the extended coupling lightguide region. In one embodiment, the difference between the first orientation angle and the second orientation angle is greater than one selected from the group of 5, 10, 15, 20, 25, 30, 35, 40, 45, and 50 degrees. In one embodiment, one or more coupling lightguides in the extended coupling lightguide region comprises one or more interior light directing edges within the one or more coupling lightguides that are straight, curved, or comprise curved regions and straight regions and/or comprises one or more lateral edges of the one or more coupling lightguides in the extended coupling lightguide region that are straight, curved, or comprise curved regions and straight regions. For example, in one embodiment a film-based lightguide comprises 4 coupling lightguides extending from a light mixing region wherein the coupling lightguides have straight, parallel lateral edges (in unfolded form) on the light source side of the fold, fold line, or fold region (where the coupling lightguides will be folded over to form a stack to receive light from one or more light sources) and lateral edges tapering outward in the width direction in the extended coupling lightguide region on the opposite side of the fold, fold line, or fold region. The shape (such as straight, curved, or tapered) of the coupling lightguides or lateral edges of the coupling lightguides, orientation angles, width direction, and fold, fold line, or fold region may be referenced for the film-based lightguides disclosed herein when the coupling lightguides, light mixing, region and/or light emitting region are in un-folded form, such as for example, the film in a flat or planar form prior to folding, bending, wrapping, etc.

Coupling Light Guide Stack

In one embodiment, coupling lightguides extending from a lightguide region in a film-based lightguide are folded at a 90-degree fold angle with their ends stacked. In this embodiment, the radius of curvature for each of the coupling lightguides is different due to the thickness of each of the coupling lightguides. In this embodiment, the radius of curvature for the nth coupling lightguide is determined by the equation:

$$R_n = R_1 + \frac{(n-1)}{2}t,$$

where $R_1$ is an initial (smallest radius) coupling lightguide radius, and t is a thickness of the coupling lightguides.

The coupling lightguide stack can be configured in numerous ways to compensate for the different radii of curvature. In one embodiment, the coupling lightguides have one or more compensation features selected from the group: staggered light input surfaces; coupling lightguides oriented at an angle with respect to each other; varying lateral fold locations; coupling lightguides angled in an oriented stack; non-uniform tension or torsion; a constant fold radius of curvature stack; and other compensation techniques or features.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an interior light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an interior light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames. The housing or holding device may include a plurality of components or any combination of the aforementioned components. The housing or holding device may serve one or more of functions selected from the group: protect from dust and debris contamination, provide air-tight seal, provide a water-tight seal, house or contain components, provide a safety housing for electrical or optical components, assist with the folding or bending of the coupling lightguides, assist in the alignment or holding of the lightguide, coupling lightguide, light source or light input coupler relative to another component, maintain the arrangement of the coupling lightguides, recycle light (such as with reflecting inner walls), provide attachment mechanisms for attaching the light emitting device to an external object or surface, provide an opaque container such that stray light does not escape through specific regions, provide a translucent surface for displaying indicia or providing illumination to an object external to the light emitting device, include a connector for release and interchangeability of components, and provide a latch or connector to connect with other holding devices or housings.

In one embodiment, the housing or holding device includes at least one selected from the group: connector, pin, clip, latch, adhesive region, clamp, joining mechanism, and other connecting element or mechanical means to connect or hold the housing or holding device to another housing or holding device, lightguide, coupling lightguide, film, strip, cartridge, removable component or components, an exterior surface such as a window or automobile, light source, electronics or electrical component, circuit board for the electronics or light source such as an LED, heat sink or other thermal control element, frame of the light emitting device, and other component of the light emitting device.

In another embodiment, the input ends and output ends of the coupling lightguides are held in physical contact with the relative position maintaining elements by at least one selected from the group: magnetic grips, mechanical grips, clamps, screws, mechanical adhesion, chemical adhesion, dispersive adhesion, diffusive adhesion, electrostatic adhesion, vacuum holding, or an adhesive.

Curved or Flexible Housing

In another embodiment, the housing includes at least one curved surface. A curved surface can permit non-linear shapes or devices or facilitate incorporating non-planer or bent lightguides or coupling lightguides. In one embodiment, a light emitting device includes a housing with at least one curved surface wherein the housing includes curved or bent coupling lightguides. In another embodiment, the housing is flexible such that it may be bent temporarily, permanently or semi-permanently. By using a flexible housing, for example, the light emitting device may be able to be bent such that the light emitting surface is curved along with the housing, the light emitting area may curve around a bend in a wall or corner, for example. In one embodiment, the housing or lightguide may be bent temporarily such that the initial shape is substantially restored (bending a long housing to get it through a door for example). In another embodiment, the housing or lightguide may be bent permanently or semi-permanently such that the bent shape is substantially sustained after release (such as when it is desired to have a curved light emitting device to provide a curved sign or display, for example).

Housing Including a Thermal Transfer Element

In one embodiment, the housing includes a thermal transfer element disposed to transfer heat from a component within the housing to an outer surface of the housing. In another embodiment, the thermal transfer element is one selected from the group: heat sink, metallic or ceramic element, fan, heat pipe, synthetic jet, air jet producing actuator, active cooling element, passive cooling element, rear portion of a metal core or other conductive circuit board, thermally conductive adhesive, or other component known to thermally conduct heat. In one embodiment, the thermal transfer element has a thermal conductivity (W/(m·K)) greater than one selected from the group: 0.2, 0.5, 0.7, 1, 3, 5, 50, 100, 120, 180, 237, 300, and 400. In another embodiment, a frame supporting the film-based lightguide (such as one that holds tension in the film to maintain flatness) is a thermal transfer element. In one embodiment, the light source is an LED and the LED is thermally coupled to the ballast or frame that is a thermal transfer element. In a further embodiment, a frame or ballast used to thermally transfer heat away from the light source and is also a housing for the light emitting device.

Low Contact Area Cover

In one embodiment, a low contact area cover is disposed between at least one coupling lightguide and the exterior to the light emitting device. The low contact area cover or wrap provides a low surface area of contact with a region of the lightguide or a coupling lightguide and may further provide at least one selected from the group: protection from fingerprints, protection from dust or air contaminants, protection from moisture, protection from internal or external objects that would decouple or absorb more light than the low contact area cover when in contact in one or more regions with one or more coupling lightguides, provide a means for holding or including at least one coupling lightguide, hold the relative position of one or more coupling lightguides, reflect light back through the lightguide, and prevent the coupling lightguides from unfolding into a larger volume or contact with a surface that could de-couple or absorb light. In one embodiment, the low contact area cover is disposed substantially around one or more coupling lightguide stacks or arrays and provides one or more of the functions selected from the group: reducing the dust buildup on the coupling lightguides, protecting one or more coupling lightguides from frustrated total internal reflection or absorption by contact with another light transmitting or absorbing material, and preventing or limiting scratches, cuts, dents, or deformities from physical contact with other components or assemblers and/or users of the device.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, nm, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-Ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide, and the cladding material is not disposed on one or more coupling lightguides. In one embodiment, the coupling lightguides do not include a cladding layer between the core regions in the region near the light input surface or light source. In another embodiment, the core regions may be pressed or held together, and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides.

Layers or Regions on Opposite Sides of the Lightguide of Materials with Higher and Lower Refractive Indexes In one embodiment, a light emitting region of the film-based lightguide comprises: a first layer or coating of a first material with a first refractive index optically coupled to a first surface of the film-based lightguide in the light emitting region, a second layer or coating of a second material with a second refractive index optically coupled to the opposite surface of the film-based lightguide in the light emitting region, the second refractive index higher than the first refractive index, the second refractive index and the first refractive index less than the refractive index of the material in the core region of the lightguide. In this embodiment, light propagating within the core layer or region of the film-based lightguide in the light emitting region that undergoes a low angle light redirection, such as by a low angle directing feature, will preferentially leak or exit the lightguide on the side with the second refractive index since it is higher than the first refractive index and the critical angle is higher. In this embodiment, light deviating from angles higher than the critical angle to smaller angles from the thickness direction of the film will first pass the total internal reflection interface on the side of the core layer or region optically coupled to the cladding layer or region with the higher refractive index.

Lightguide Configuration and Properties

In one embodiment, the thickness of the film, lightguide and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Edges of the Lightguide

In one embodiment, the edges of the lightguide or lightguide region are coated, bonded to or disposed adjacent to a specularly reflecting material, partially diffusely reflecting material, or diffuse reflecting material. In one embodiment, the lightguide edges are coated with a specularly reflecting ink including nano-sized or micron-sized particles or flakes which reflect the light substantially specularly. In another embodiment, a light reflecting element (such as a specularly reflecting multi-layer polymer film with high reflectivity) is disposed near the lightguide edge and is disposed to receive light from the edge and reflect it and direct it back into the lightguide. In another embodiment, the lightguide edges are rounded and the percentage of light diffracted from the edge is reduced. One method of achieving rounded edges is by using a laser to cut the lightguide from a film and achieve edge rounding through control of the processing parameters (speed of cut, frequency of cut, laser power, etc.). In another embodiment, the edges of the lightguide are tapered, angled serrated, or otherwise cut or formed such that light from a light source propagating within the coupling lightguide reflects from the edge such that it is directed into an angle closer to the optical axis of the light source, toward a folded region, toward a bent region, toward a lightguide, toward a lightguide region, or toward the optical axis of the light emitting device. In a further embodiment, two or more light sources are disposed to each couple light into two or more coupling lightguides including light redirecting regions for each of the two or more light sources that include first and second reflective surfaces which direct a portion of light from the light source into an angle closer to the optical axis of the light source, toward a folded or bent region, toward a lightguide region, toward a lightguide region, or toward the optical axis of the light emitting device. In one embodiment, one or more edges of the coupling lightguides, the lightguide, the light mixing region, or the lightguide region include a curve or arcuate profile in the region of intersection between two or more surfaces of the film in a region.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides, and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Lightguide Material with Adhesive Properties

In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material. In a further embodiment, at least one selected from the group: core material, cladding material, and a material disposed on a cladding material of the lightguide is at least one selected from the group: a pressure sensitive adhesive, a contact adhesive, a hot adhesive, a drying adhesive, a multi-part reactive adhesive, a one-part reactive adhesive, a natural adhesive, and a synthetic adhesive. In a further embodiment, the first core material of a first coupling lightguide is adhered to the second core material of a second coupling lightguide due to the adhesion properties of the first core material, second core material, or a combination thereof. In another embodiment, the cladding material of a first coupling lightguide is adhered to the core material of a second coupling lightguide due to the adhesion properties of the cladding material. In another embodiment, the first cladding material of a first coupling lightguide is adhered to the second cladding material of a second coupling lightguide due to the adhesion properties of the first cladding material, second cladding material, or a combination thereof. In one embodiment, the core layer is an adhesive and is coated onto at least one selected from the group: cladding layer, removable support layer, protective film, second adhesive layer, polymer film, metal film, second core layer, low contact area cover, and planarization layer. In another embodiment, the cladding material or core material has adhesive properties and has an ASTM D3330 Peel strength greater than one selected from the group: 8.929, 17.858, 35.716, 53.574, 71.432, 89.29, 107.148, 125.006, 142.864, 160.722, 178.580 kilograms per meter of bond width when adhered to an element of the light emitting device, such as for example without limitation, a cladding layer, a core layer, a low contact area cover, a circuit board, or a housing.

In another embodiment, a tie layer, primer, or coating is used to promote adhesion between at least one selected from the group: core material and cladding material, lightguide and housing, core material and element of the light emitting device, cladding material and element of the light emitting device. In one embodiment, the tie layer or coating includes a dimethyl silicone or variant thereof and a solvent. In another embodiment, the tie layer includes a phenyl-based primer such as those used to bridge phenylsiloxane-based silicones with substrate materials. In another embodiment, the tie layer includes a platinum-catalyzed, addition-cure silicone primer such as those used to bond plastic film substrates and silicone pressure sensitive adhesives.

In a further embodiment, at least one region of the core material or cladding material has adhesive properties and is optical coupled to a second region of the core or cladding material such that the ASTM D1003 luminous transmittance through the interface is at least one selected from the group: 1%, 2%, 3%, and 4% greater than the transmission through the same two material at the same region with an air gap disposed between them.

In one embodiment, the core material of the lightguide includes a material with a critical surface tension less than one selected from the group: 33, 32, 30, 27, 25, 24 and 20 mN/m. In another embodiment, the core material has a critical surface tension less than one selected from the group: 33, 30, 27, 25, 24 and 20 mN/m and is surface treated to increase the critical surface tension to greater than one selected from the group: 27, 30, 33, 35, 37, 40, and 50. In one embodiment, the surface treatment includes exposing the surface to at least one selected from the group: a plasma, a flame, and a tie layer material. In one embodiment, the surface tension of the core material of the lightguide is reduced to reduce light extraction from a surface in contact due to "wet-out" and optical coupling. In another embodiment, the surface tension of the surface of the lightguide Multilayer Lightguide In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer. In a further embodiment, at least one layer or coating includes a microstructure, surface relief pattern, light extraction features, lenses, or other non-flat surface features which redirect a portion of incident light from within the lightguide to an angle whereupon it escapes the lightguide in the region near the feature. For example, the carrier film may be a silicone film with embossed light extraction features disposed to receive a thermoset polycarbonate resin core region including a thermoset material.

In one embodiment, a thermoset material is coated onto a thermoplastic film wherein the thermoset material is the core material, and the cladding material is the thermoplastic film or material. In another embodiment, a first thermoset material is coated onto a film including a second thermoset material wherein the first thermoset material is the core material, and the cladding material is the second thermoset plastic.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45-degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove), or the light extraction feature may be a substantially diffusely reflective ink such as an ink including titanium dioxide particles within a methacrylate-based binder.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting element using an adhesive that functions as a cladding with a refractive index of about 1.42.

In one embodiment, a light emitting device comprises a film-based lightguide comprising a core layer having opposing surfaces with a thickness not greater than about 0.5 millimeters therebetween wherein light propagates by total internal reflection between the opposing surfaces; a first cladding layer having a first side optically coupled to the core layer and an opposing second side; an array of coupling lightguides continuous with a lightguide region of the lightguide, each coupling lightguide of the array of coupling lightguides terminates in a bounding edge, and each coupling lightguide is folded in a fold region such that the bounding edges of the array of coupling lightguides are stacked; a light emitting region comprising a plurality of light extraction features arranged in a pattern that varies spatially in the light emitting region, the plurality of light extraction features frustrate totally internally reflected light propagating within the core layer such that light exits the core layer in the light emitting region into the first cladding layer; a light source positioned to emit light into the stacked bounding edges, the light propagating within the array of coupling lightguides to the lightguide region, with light from each coupling lightguide combining and totally internally reflecting within the lightguide region; a light redirecting optical element optically coupled to the second side of the first cladding layer, the light redirecting optical element comprising light redirecting features that direct frustrated totally internally reflected light from the light extraction features toward the reflective spatial light modulator, the light redirecting features occupy less than 50% of a surface of the light redirecting optical element in the light emitting region, and wherein the core layer has an average thickness in the light emitting region, the light emitting region has a largest dimension in a plane of the light emitting region orthogonal to the thickness direction of the core layer, the largest dimension of the light emitting region divided by the average thickness of the core layer in the light emitting region is greater than 100, the light extraction features are low angle directing features, the light exiting the light source has a first full angular width at half maximum intensity in a plane orthogonal to the thickness direction of the film, the light exiting the light emitting device has second full angular width at half maximum intensity in a second plane parallel to the thickness direction and a third full angular width at half maximum intensity in a third plane parallel to the thickness direction of the film and orthogonal to the second plane. In one embodiment, the first full angular width is less than one selected from the group: 1, 2, 5, 7, 10, 15, 20, 25, 30, 35, 40, 45, and 50 degrees. In another embodiment, the second full angular width is less than one selected from the group: 1, 2, 5, 7, 10, 15, 20, 25, 30, 35, 40, 45, and 50 degrees. In another embodiment, the third full angular width is less than one selected from the group: 1, 2, 5, 7, 10, 15, 20, 25, 30, 35, 40, 45, and 50 degrees. In another embodiment, the first, second, and third full angular widths are each less than one selected from the group 1, 2, 5, 7, 10, 15, 20, 25, 30, 35, 40, 45, and 50 degrees. In one embodiment, the light exiting the light source has a full angular width at half maximum intensity in a plane parallel to the thickness direction of the film greater than the first full angular width. For example, in one embodiment, a light source is substantially collimated in a plane perpendicular to the thickness direction of the lightguide, film, or stack of coupling lightguides, in the light emitting region (or has a first angular width at half maximum intensity less than 10 degrees) and is not collimated or has a larger full angular width at half maximum intensity in the plane parallel to the thickness direction of the film or stack of coupling lightguides. In one embodiment, light from the light sources passes through the coupling lightguides and into the lightguide region, it is redirected by the low angle directing features, passes through the first cladding layer, is redirected by the light redirecting optical element and exits the light emitting device with second angular full width at half maximum intensity that can be low (such as less than 10 degrees) due to the collimation of the light source output (such as by a primary and/or secondary lens or reflector) and a third angular full width at half maximum intensity that can be low (such as less than 10 degrees) due to the collimation from the combination of the low angle directing features, the difference in refractive index between the two cladding layers, and the light redirecting features of the light redirecting optical element.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region. The light turning feature may be formed on a surface or within a volume of material and the material may be thermoplastic, thermoset, or adhesive material. In one embodiment, the light turning features are embossed (UV cured or thermomechanically embossed) surface features in a light turning film that is optically coupled (such as by using a pressure sensitive adhesive) to the film-based lightguide in the light emitting region. In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film and the air within the recessed region or grooves increases the percentage of totally internally reflected light at the interface over that of an adhesive that effectively planarizes the surface by filing in the recessed regions or grooves with the adhesive. In another embodiment, the light turning film or region or layer comprising the light turning features extends into less than one selected from the group of 30%, 20%, 10%, and 5% of the light mixing region of the film-based lightguide.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

In one embodiment, a plurality of film-based lightguides are stacked and positioned to receive light from one or more light sources and propagate the light to one or more light emitting regions. In one embodiment, the light emitting regions from a plurality of film-based lightguides overlap in the thickness direction of the film and are stacked in the thickness direction of the film-based lightguides.

Multiple Lightguides to Provide Pixelated Color

In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides).

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or another region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In a further embodiment, the lightguide region, light mixing region or body of the lightguide extends across a first side and a second side of the array of coupling lightguides. For example, in one embodiment, the body of a film-based lightguide extends across two sides of a stack of coupling lightguides with a substantially rectangular cross section. In one embodiment, the stacked array of coupling lightguides is oriented in a first orientation direction substantially parallel to their stacked surfaces toward the direction of light propagation within the coupling lightguides, and the light emitting region is oriented in a second direction parallel to the optical axis of light propagating within the light emitting region where the orientation difference angle is the angular difference between the first orientation direction and the second orientation direction. In one embodiment, the orientation difference angle is selected from the group: 0 degrees, greater than 0 degrees, greater than 0 degrees and less than 90 degrees, between 70 degrees and 110 degrees, between 80 degrees and 100 degrees, greater than 0 degrees and less than 180 degrees, between 160 degrees and 200 degrees, between 170 degrees and 190 degrees, and greater than 0 degrees and less than 360 degrees.

In one embodiment, at least one selected from the group: lightguide, lightguide region, light mixing region, plurality of lightguides, coupling lightguides, and light input coupler bends or folds such that it wraps around a component of the light emitting device more than once. For example, in one embodiment, a lightguide wraps around the coupling lightguides two times, three times, four times, five times, or more than five times. In another embodiment, the lightguide, lightguide region, light mixing region, plurality of lightguides, coupling lightguides, or light input coupler may bend or fold such that it wraps completely around a component of the light emitting device and partially wraps again around. For example, a lightguide may wrap around a relative position maintaining element 1.5 times (one time around and halfway around again). In another embodiment, the lightguide region, light mixing region or body of the lightguide further extends across a third, fourth, fifth, or sixth side of the array of coupling lightguides or light emitting device component. For example, in one embodiment, the light mixing region of a film-based lightguide extends completely around four sides of the relative position maintaining element plus across a side again (fifth side). In another example, the light mixing region wraps around a stack of coupling lightguides and relative position maintaining element more than three times.

In one embodiment, wrapping the lightguide, lightguide region, light mixing region, plurality of lightguides, coupling lightguides, or light input coupler around a component provides a compact method for extending the length of a region of the lightguide. For example, in one embodiment, the light mixing region is wrapped around the stack of coupling lightguides to increase the light mixing distance within the light mixing region such that the spatial color or the light flux uniformity of the light entering the light emitting region is improved.

In one embodiment, the wrapped or extended region of the lightguide is operatively coupled to the stack of coupling lightguides or a component of the light emitting device. In one embodiment, the wrapped or extended region of the lightguide is held with adhesive to the stack of coupling lightguides or the component of the light emitting device. For example, in one embodiment, the light mixing region includes a pressure sensitive adhesive cladding layer that extends or wraps and adheres to one or more surfaces of one or more coupling lightguides or to the component of the light emitting device. In another embodiment, the light mixing region includes a pressure sensitive adhesive layer that adheres to at least one surface of a relative position maintaining element. In another embodiment, a portion of the film-based lightguide includes a layer that extends or wraps to one or more surfaces of one or more coupling lightguides or a component of the light emitting device. In another embodiment, the wrapped or extended region of the lightguide extends across one or more surfaces or sides or wraps around one or more light sources. The wrapping or extending of a lightguide or lightguide region across one or more sides or surfaces of the stack of coupling lightguides or the component of the light emitting device, may occur by physically translating or rotating the lightguide or the lightguide region, or may occur by rotating the stack of coupling lightguides or the component. Thus, the physical configuration does not require a particular method of achieving the wrapping or extending.

Multiple Bends in the Lightguide

In one embodiment, a film-based lightguide includes two bends in the film. In another embodiment, the two bends in the film-based lightguide are within the same plane and in the light mixing region of the film. For example, in one embodiment, a film-based lightguide operatively coupled to the top of a frame includes a first bend to fold a light mixing region behind the frame to position at least one of a light source, a light input coupler, and a relative position maintaining element behind the light emitting region of the lightguide. In this embodiment, the lightguide includes a second bend that positions at least one of the light source, light input coupler, and relative position maintaining element at a distance from the light emitting region of the lightguide in the thickness direction less than the diameter of the first bend. In this embodiment, the second bend can bring the component(s) closer to the light emitting region than the single bend for long light mixing regions. Similarly, a large first bend (such as a first bend with a first bend angle greater than 180 degrees) can position at least one of a light source, light input coupler, and relative position maintaining element closer to the light emitting region and behind the light emitting region of the lightguide. In one embodiment, a method of manufacturing a light emitting device includes bending a film-based lightguide at a first bend with a first bend diameter such that a portion of the light mixing region is disposed behind the light emitting region of the lightguide and the distance between the light emitting region of the lightguide and the portion of the light mixing region behind the light emitting region is less than the first bend diameter. In another embodiment, a method of manufacturing a light emitting device includes bending a film-based lightguide at a first bend with a first bend diameter that positions a first portion of the light mixing region behind the light emitting region of the lightguide, and bending the lightguide at a second bend that positions a second portion of the light mixing region of the lightguide such that the distance between the light emitting region of the lightguide and the second portion of the light mixing region behind the light emitting region is less than the first bend diameter of the first bend.

In another embodiment, the lightguide further includes a planar region between the second bend and at least one of the light source, the light input coupler, and the relative position maintaining element. For example, in one embodiment, the length of the light mixing region of a film based lightguide is greater than 50% of the length of the light emitting region and the lightguide includes a first bend to position the light source and the light mixing region of the lightguide behind the light emitting region. The volume of the device can be reduced by including a second bend in the lightguide that brings the light mixing region closer to the light emitting region. In this embodiment, the lightguide can be operatively coupled to a frame on the top and bottom surfaces of the frame and the diameter of the first bend (or the maximum separation between the inner surfaces of the film) is greater than the average separation between the lower surface of the light emitting region of the lightguide and the upper surface of the light mixing region positioned underneath the light emitting region. In another embodiment, the light source and/or at least one coupling lightguide is positioned at a distance from the light emitting region of the lightguide less than the diameter of the first bend or the maximum separation between the inner surfaces of the film. In another embodiment, shape of the lightguide further includes an inflection point in a plane including the first bend. In one embodiment, the lightguide extends from the relative position maintaining element (or the housing comprising the relative position maintaining element) at the top side or the bottom side wherein the top side of the relative position maintaining element is closer to the light mixing region when the lightguide is folded such that the relative position maintaining element is below the light emitting region of the lightguide.

In another embodiment, the tapered edge of the tapered light mixing region has an extended direction length, $L_t$, and a displacement, $D_t$, from the lateral edge of the lightguide in the light emitting region. In one embodiment, $L_t/D_t$ is greater than or equal to one selected from the group: 0.2, 0.5, 1, 2, 3, 4, 5, 8, 10, and 20. In another embodiment, $D_t$ is greater than one selected from the group: 2, 4, 6, 8, 10, 20, 50, 75, 100, and 200 millimeters. In a further embodiment, $L_t$ is greater than one selected from the group: 2, 4, 6, 8, 10, 20, 50, 75, 100, and 200 millimeters. In another embodiment, $L_t$ is greater than the thickness of a light collimating optical element parallel to its optical axis positioned to receive light from the light source and direct it toward the input surface of coupling lightguides extended from the film-based lightguide with a tapered light mixing region. In a further embodiment, $L_t$ is greater than the thickness of a light source plus the thickness of the light collimating optical element parallel to the optical axis of the light collimating optical element positioned to receive light from the light source and direct it toward the input surface of coupling lightguides extended from the film-based lightguide with the tapered light mixing region. In one embodiment the length of the light mixing region of the lightguide is larger than the length of the light emitting region and the light source and/or the coupling lightguides do not extend past the light emitting area of the lightguide in the length direction.

In another embodiment, the lightguide further includes a third bend in the same plane as the first bend and the second bend. In this embodiment, the light mixing region of the film based lightguide can be folded behind the light emitting region, bent closer to the light emitting region and be folded again onto itself to accommodate a long light mixing region. In one embodiment, the lightguide includes one or more bends or folds wherein each bend may position the lightguide closer to another region of the lightguide and/or fold one region of the lightguide upon (or behind or above) another region of the lightguide. In one embodiment, the diameter of the bend that folds the first region of the lightguide behind the second region of the lightguide is the same as or greater than the average distance of the second region to the first region beneath, behind, or above the light emitting region of the lightguide. In one embodiment, the light mixing region of the lightguide includes the first region of the lightguide and the second region of the lightguide on opposite sides of the fold in the lightguide. In one embodiment, the first region of the lightguide is the light emitting region and the light mixing region includes the second region on the opposite side of the fold as the first region. In one embodiment, the ratio of the length of the light mixing region to the length of the light emitting region is greater than one selected from the group: 0.1, 0.2, 0.4, 0.6, 0.8, 1, 1.2, 1.4, 1.6, 1.8, 2, 3, and 4.

In one embodiment, one or more bends of a lightguide has a bend angle, the average angle formed between two substantially planar regions on both sides of a bend or the angle proceeding or following an inflection point in the lightguide, selected from the group: greater than 5, greater than 10, 20-70, 30-50, 45, 60-120, 70-110, 80-100, 90, 115-155, 120-150, 135, 150-210, 160-200, 170-190, 175-185, 180, greater than 180, 195-255, 205-245, 215-235, 220-230, 225, 240-300, 250-290, 260-250, 265-275, 270, 285-345, 295-335, 305-325, 310-320, 315, 330-390, 340-380, 350-370, 355-365, 360, and greater than 0 and less than 360 degrees. For example, in one embodiment, a lightguide includes a first bend with a first bend angle of 180 degrees that bends the lightguide back under itself, and a second bend with a bend angle of 45 degrees that bends the lightguide closer to the light emitting region of the lightguide before the first bend. The lightguide in this example, could further include a third bend with a bend angle of 45 degrees that bends the light mixing region of the lightguide back to parallel to (and beneath) the light emitting region.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region.

Light Redirecting Element

As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In a further embodiment, the light redirecting element includes a plurality of the aforementioned elements. The plurality of elements may be in the form of a 2-D array (such as a grid of microlenses or close-packed array of microlenses), a one-dimensional array (such as a lenticular lens array), random arrangement, predetermined non-regular spacing, semi-random arrangement, or other predetermined arrangement. The elements may include different features, with different surface or volumetric features or interfaces and may be disposed at different thicknesses within the volume of the light redirecting element, lightguide, or lightguide region. The individual elements may vary in the x, y, or z direction by at least one selected from the group: height, width, thickness, position, angle, radius of curvature, pitch, orientation, spacing, cross-sectional profile, and location in the x, y, or z axis.

Plurality of Reflecting Surfaces Between Lateral Edges

In one embodiment, the film-based lightguide comprise a plurality of reflecting surfaces (such as linear reflecting surfaces) in at least a portion of the light mixing region of the film-based lightguide of the light emitting device between the lateral edges of the film. In one embodiment, one or more of these plurality of reflecting surfaces guide light by total internal reflection toward one or more of the lateral edges of the film and may provide additional spatial mixing of light and/or redirection of light from the coupling lightguides in the light mixing region in a direction parallel to the array direction of the array of coupling lightguides. The reflecting surfaces may be disposed on or within a film-based lightguide, such as a film with an average thickness less than 250 micrometers. The plurality of reflecting surfaces may be formed, for example, by printing or depositing a light transmitting material on one or more surfaces of the film-based lightguide, scribing or cutting the film to form a cut with a component in the thickness direction of the film where the cut may or may not pass through the film, or embossing or forming a film with reflective surfaces that form plurality of reflecting surfaces.

In one embodiment, the plurality of reflective surfaces increase the spatial luminance uniformity in the light mixing region and thus the light emitting region in a direction parallel to the array direction of the array of coupling lightguides due to propagation of the light from the light mixing region to the light emitting region. The plurality of reflecting surfaces may increase this uniformity by creating additional reflective surfaces with components in the thickness direction and a direction orthogonal to the array direction of the array of coupling lightguides with a pitch higher than that of the pitch of the array of coupling lightguides. In one embodiment, one or more regions where adjacent coupling lightguides connect to the light mixing region (when the coupling lightguides are laid out flat and un-folded or prior to folding) comprises a radius of curvature larger than one selected from the group: 30, 50, 100, 200, 500, 1,000, and 2,000 micrometers; and/or they comprise a facet with an angled portion greater than one selected from the group: 5, 10, 15, 20, 30, and 45 degrees from a direction perpendicular to the array direction of the array of coupling lightguides or from a direction parallel to a lateral edge of a coupling lightguide of the two adjacent coupling lightguides. In one embodiment, the radius of curvature and/or angular facets contribute to bright and/or dark regions in the light emitting region with the same pitch as the coupling lightguides in the direction parallel to the array direction of the array of coupling lightguides and the reflective surfaces reflect and mix the light from the coupling lightguides in the light mixing region in the direction parallel to the array direction of the array of coupling lightguides and increase the uniformity (such as luminance uniformity) in that direction.

In one embodiment, the film-based lightguide comprises a plurality of reflecting surfaces in the light mixing region wherein the plurality of reflecting surfaces are positioned between a core layer of the film-based lightguide and a cladding layer, such as by printing plurality of reflecting surfaces on the surface of the film in the light mixing region and laminating a pressure-sensitive adhesive cladding layer on the plurality of reflecting surfaces. In one embodiment, the light emitting device comprising the film-based lightguide with a plurality of reflecting surfaces in the light mixing region is a front light for a reflective spatial light modulator, such as a reflective LCD.

Light Transmitting Regions Added to Surface of Film in Lightguide Mixing Region to Form Plurality of Reflecting Surfaces In one embodiment, a plurality of reflecting surfaces are disposed on at least one surface of a film in a light mixing region of the lightguide by adding a light transmitting material to the surface of the film or core layer to create additional reflecting surfaces (such as total internal reflection surfaces) with a component in the thickness direction of the film that reflect light from the coupling lightguides in direction parallel to the array direction of the array of coupling, toward a lateral edge of the lightguide in the light mixing region, and/or toward an excess width region of the light mixing region or light emitting region. The plurality of reflecting surfaces may be in the form of printed stripes, ribs, linear regions, sub-regions, gratings, thick lines, curved lines, dot patterns, constant width or expanding or reducing in width toward the light emitting region, parallel areas such as lines, lines or features at an angle to each other, or lines or areas that direct more light toward the excess width region and/or lateral edges of the film in the light mixing region. In one embodiment, the light transmitting material added to the film forming the plurality of reflecting surfaces in the light mixing region has a wetting contact angle (or average wetting contact angle) on the surface of the film in the light mixing region in a plane parallel to the array direction of the array of coupling lightguides measured using a contact angle goniometer less than one selected from the group 50, 40, 30, 20, 10, 8, and 5 degrees when the light transmitting material is hardened, cured, solidified, or otherwise fixed in form or as used in the light emitting device.

In one embodiment, the refractive index difference between the light transmitting material added to the film to define the plurality of reflecting surfaces and the film material (such as the core layer material of the film) positioned in contact with the light transmitting material is less than one selected from the group: 0.001, 0.002, 0.005, 0.008, 0.01, 0.02, 0.05, and 0.1 at the sodium wavelength. In one embodiment, the refractive index of the light transmitting material added to the film is greater than the refractive index of the film material positioned in contact with the light transmitting material by less than 0.001, 0.002, or 0.005, and/or the refractive index of the light transmitting material added to the film is less than the refractive index of the film material positioned in contact with the light transiting material by less than 0.01, 0.001, 0.002, or 0.005. In one embodiment, the light transmitting material added to the film is substantially refractive index matched to the film material positioned in contact with the light transmitting material.

Interior Light Directing Edges Forming a Plurality of Reflecting Surfaces

In one embodiment, the plurality of reflecting surfaces are formed in the interior region of the film in the light mixing region of the lightguide by slicing, cutting, etching, ablating, removing material, embossing, or molding (such as injection molding) the film to form reflecting surfaces (such as total internal reflection surfaces) with a component in the thickness direction of the film that reflect light from the coupling lightguides in direction parallel to the array direction of the array of coupling lightguides, toward a lateral edge of the lightguide in the light mixing region, and/or toward an excess width region of the light mixing region or light emitting region. In one embodiment, the interior light reflecting surfaces extend through the thickness of the core region of the film, extend through an average portion of the film thickness greater than one selected from the group 5, 10, 15, 20, 30, 40, 50, 60, 70, 80, and 90 percent of the film thickness, or extend through an average portion of the film thickness less than one selected from the group 5, 10, 15, 20, 30, 40, 50, 60, 70, 80, and 90 percent of the film thickness at the interior reflecting surface. In one embodiment, the plurality of reflecting surfaces in the interior region of the film (such as within the core layer or region) form laterally reflecting edges (that reflect light toward the lateral edges of the film in the light mixing region) that increase the uniformity of the light emitted from the film in the light emitting region in the direction parallel to the array direction of the array of coupling lightguides.

Location of the Plurality of Reflecting Surfaces

In one embodiment, the plurality of reflecting surfaces are positioned at least in a portion of the light mixing region of the film-based lightguide. In one embodiment, all or a portion of the plurality of reflecting surfaces extend into the light emitting region. In one embodiment, at least a portion of the plurality of reflecting surfaces are positioned along the film between the coupling lightguides and the light emitting region of the film. In another embodiment, at least a portion of the plurality of reflecting surfaces extend into regions of the light mixing region of the film that extend beyond the lateral edges of the film in the light emitting region of the film. In a further embodiment, at least a portion of the plurality of reflecting surfaces are positioned on a first surface of the film-based lightguide closer to a reflective spatial light modulator, a second surface of the film-based lightguide further away from the reflective spatial light modulator, and/or on two opposing extended surfaces of the film-based lightguides. In embodiments with groups of pluralities of reflecting surfaces in different locations, regions, or on opposite surfaces, the different groups may have different reflecting surface features, such as light transmitting material added type, interior light directing edge type, pitches, heights, depths, widths, cross-sectional shape, orientation, or curvature. In one embodiment, all or a portion of the plurality of reflecting surfaces are positioned on a first portion of the light mixing region that is folded behind a second portion of the light mixing region different from the first portion or folded behind the light emitting region (or reflective spatial light modulator) in a thickness direction of the film of the second portion of the light mixing region.

Orientation of the Plurality of Reflecting Surfaces

In one embodiment, the plurality of reflecting surfaces are oriented substantially in the same plane parallel to the surface of the film in the light mixing region. In one embodiment, the plurality of reflecting surfaces are oriented with a portion of the plurality of reflecting surfaces having a component parallel to a thickness direction of the film. In another embodiment, all or a portion of the plurality of reflecting surfaces are oriented in a plane perpendicular to the thickness direction of the film at a first reflecting surface orientation angle from a direction perpendicular to the array direction of the array of coupling lightguides selected from the group: 0 degrees, less than 5 degrees, less than 10 degrees, less than 20 degrees, greater than 5 degrees, greater than 10 degrees, greater than 20 degrees, greater than 30 degrees, and greater than 45 degrees. For example, in one embodiment, the plurality of reflecting surfaces are printed lines of a light transmitting material on the surface of the film-based lightguide in the light mixing region oriented parallel to a direction perpendicular to the array direction of the coupling lightguides with a first reflecting surface orientation angle of 0 degrees. In another embodiment, all or a portion of the plurality of reflecting surfaces are oriented in a plane parallel to the thickness direction of the film at a second reflecting surface orientation angle from a direction perpendicular to the surface normal of the core layer of the film-based lightguide or film selected from the group: 0 degrees, less than 5 degrees, less than 10 degrees, less than 20 degrees, greater than 5 degrees, greater than 10 degrees, greater than 20 degrees, greater than 30 degrees, and greater than 45 degrees. For example, in one embodiment, the plurality of reflecting surfaces are interior light directing edges formed by cutting into the surface of the core layer of the film-based lightguide in the light mixing region where the cuts are oriented parallel to a direction perpendicular to the surface of the core layer of the film-based lightguide with a second reflecting surface orientation angle of 0 degrees. In one embodiment, the plurality of reflecting surfaces are linear and comprise curved or angled regions such that two or more sections of the linear reflecting surfaces are oriented at different orientation angles.

Plurality of Interior Light Directing Edges Form Angle Redirectors

In one embodiment, the light mixing region comprises a plurality of interior light directing edges (such as an array of interior light directing edges) that form angle redirectors. Angle redirectors are interior light directing edges separated spatially in the direction parallel to the array direction of the array of coupling lightguides (or in a direction perpendicular to an average direction from the light mixing region to the light emitting region of the lightguide) and perpendicular to the thickness direction of a film lightguide that redirect the axis (or the average angle of the light propagating between two neighboring interior light directing edges forming a channel) of incident light from a first angle to a different second angle. In one embodiment, the second angle corresponding to the axis or average angle for light reflecting from a plurality of light directing edges is less than one selected from the group 2, 5, 7, 10, 12, 15, 18, 20 and 25 degrees from a direction orthogonal to the array direction of an array of coupling lightguides (or an average direction from the light mixing region to the light emitting region of the lightguide) and a direction orthogonal to the thickness direction of the film-based lightguide. In one embodiment, a plurality of angle redirectors comprise linear sections and curved sections. In one embodiment, the curved section of the interior light directing edges forming angle redirectors comprise edges that curve outward toward lateral edges of the light mixing region in the form of an arc with a radius greater than one selected from the group of: 2, 4, 5, 8, and 10 times the average width of the plurality of coupling lightguides in the array direction of the array of coupling lightguides. In one embodiment, the curved sections of two or more angle redirectors of a plurality of angle redirectors comprise arc sections of concentric circles when viewed from above (in the thickness direction) with a common center. In another embodiment, the curved sections of two or more angle redirectors of the plurality of angle redirectors comprise arc sections of circles when viewed from above (in the thickness direction) where the difference between the radii of curvature of neighboring radii is within one selected from the group of 5, 10, 15, and 20% of the average distance between the arc sections.

In one embodiment, the angle redirectors comprise linear sections in the form of facets (such as stepped facets) which collectively steer light as a curved section similarly as a faceted reflector can reflect light similarly to a continuously curved surface. In another embodiment, the angle redirectors comprises linear sections on a side of the film nearest the light emitting region and curved sections on the opposite side along the film toward the source of light or an array of coupling lightguides. In one embodiment, the interior light directing edges in the form of angle redirectors form channels defined by two adjacent interior light directing edges. In one embodiment, the angle redirectors are positioned in the mixing region with portions of the light mixing region without angle redirectors on either side of the angle redirectors. In one embodiment, the angle redirectors extend from within a tapered portion of a light mixing region to a portion of the light mixing region adjacent the light emitting region. In another embodiment, the angle redirectors extend from within a tapered portion of a light mixing region to a non-tapered portion of the light mixing region adjacent the light emitting region. In one embodiment the angle redirectors receive light from a plurality of coupling lightguides with spatially distributing end portions. In one embodiment, a plurality of coupling lightguides emit light into a light mixing region where the light output from the plurality of coupling lightguides mixes and propagates through the light mixing region to the angle redirectors. In one embodiment, a reflective display comprises a film based lightguide with angle redirectors and diffusely scatters light at least in an axis parallel to the array direction of the array of coupling lightguides or in an array direction of the array of interior light directed edges in the form of angle redirectors. In one embodiment, the average distance along the film between where the plurality of coupling lightguides meet the light mixing region and the beginning of the angle redirectors is at least one selected from the group of 10%, 15%, 20%, 25%, 30% and 40% of the average total length of the light mixing region from where the plurality of coupling lightguides meet the light mixing region and the light emitting region of the film-based lightguide. In one embodiment, the average distance along the film between where the light from one or more light sources enters the film-based lightguide and the beginning of the angle redirectors is at least one selected from the group of 10%, 15%, 20%, 25%, 30% and 40% of the average total length of the light mixing region from where the light from one or more light sources enters the film-based lightguide and the light emitting region of the film-based lightguide. The angle redirectors may be interior light directing edges in a film that does not have an array of coupling lightguides extending to a light mixing region. In one embodiment, the angle redirectors redirect the axis (or an average angle of the light propagating between two neighboring interior light directing edges forming a channel) of light propagating in a film based lightguide from a first angle to a different second angle. In another embodiment, the average distance along the film in the light mixing region between the ends of the angle redirectors and the light emitting region is at least one selected from the group of 3%, 5%, 10%, 15%, 20%, and 30% of the average total length of the light mixing region from where the plurality of coupling lightguides meet the light mixing region and the light emitting region of the film-based lightguide. In another embodiment, the average distance along the film in the light mixing region between the ends of the angle redirectors and the light emitting region is at least one selected from the group of 3%, 5%, 10%, 15%, 20%, and 30% of the average total length of the light mixing region from where the light from one or more light sources enters the film-based lightguide and the light emitting region of the film-based lightguide. In another embodiment, the average distance along the film in the light mixing region between the ends of the angle redirectors and the light emitting region is less than one selected from the group of 10%, 20%, 30%, and 40% of the average total length of the light mixing region from where the light from one or more light sources enters the film-based lightguide and the light emitting region of the film-based lightguide. In one embodiment, the curved section of a plurality of the interior light directing edges forming angle redirectors comprises edges that curve outward in the form of arcs with a radius greater than one selected from the group of: 2, 4, 5, 8, and 10 times the average width of the plurality of coupling lightguides in the array direction of the array of the plurality of coupling lightguides. In one embodiment, the curved section of a plurality of interior light directing edges forming angle redirectors comprise edges that curve outward in the form of an arc with a radius greater than one selected from the group of: 2, 4, 5, 8, and 10 times the average width of the channels formed by the angle redirectors. In one embodiment, the width of the channels formed by the angle redirectors, the radius of curvature of the curved sections of the angle redirectors, the length of the linear section and/or the length of the curved section vary across the width of the film (such as in a direction orthogonal to the thickness direction and parallel to the array direction of the array of coupling lightguides or in a direction orthogonal to the thickness direction and orthogonal to a direction from the angle redirectors toward the light emitting region). In one embodiment, the plurality of interior light directing edges forming angle redirectors are symmetric about the center of the film in the width direction. In one embodiment, the plurality of interior light directing edges forming angle redirectors are asymmetric about the center of the film in the width direction. In one embodiment, an asymmetric distribution of angle redirectors or angle redirectors with varying characteristics disclosed above along the width direction can compensate for varying placement of light sources, or varying coupling lightguide configurations disclosed herein.

Number of the Plurality of Reflecting Surfaces

In one embodiment, the film-based lightguide comprises a plurality of reflecting surfaces in the light mixing region between the lateral edges of the film greater than one selected from the group: 1, 2, 5, 10, 20, 50, 75, 100, 150, 200, 500, 1,000, and 5000. In one embodiment, the number of the plurality of reflecting surfaces divided by the number of coupling lightguides is greater than one selected from the group: 5, 10, 20, 50, 100, and 500. In one embodiment, the number of interior light directing edges forming angle redirectors greater than one selected from the group: 2, 5, 10, 20, 30, and 40. In Pitch of the Plurality of Reflecting Surfaces In one embodiment, the plurality of reflecting surfaces have a pitch less than one or more selected from the group: less than the pitch of the array of coupling lightguides, less than one-fifth of the pitch of the array of coupling lightguides, less than 5 millimeters, less than 3 millimeters, less than 1 millimeter, less than 0.5 millimeter, less than 0.3 millimeter, less than 0.1 millimeter, less than 75 micrometers, less than 50 micrometers, less than 40 micrometers, and less than 30 micrometers in a direction parallel to the array direction of the array of coupling lightguides and perpendicular to the thickness direction of the core layer in the light mixing region of the film-based lightguide.

Width of Plurality of Reflecting Surfaces

As used herein, the average width or width of each of the plurality of reflecting surfaces is defined in a direction parallel to the array direction of the array of coupling lightguides and perpendicular to the thickness direction of the core layer. In one embodiment, the average width or width of each of the plurality of reflecting surfaces is constant in a direction orthogonal to the array direction of the array of coupling lightguides across the plurality of reflecting surfaces in the light mixing region of the film-based lightguide. In one embodiment, in all or at least a portion of the light mixing region, the average width or width of each of the plurality of reflecting surfaces is less than the pitch of the array of coupling lightguides, less than one-fifth of the pitch of the array of coupling lightguides, less than 5 millimeters, less than 3 millimeters, less than 1 millimeter, less than 0.5 millimeter, less than 0.3 millimeter, less than 0.1 millimeter, less than 75 micrometers, less than 50 micrometers, less than 40 micrometers, and less than 30 micrometers. In one embodiment, in all or a portion of the light mixing region, the average width or width of each of plurality of reflecting surfaces is less than one selected from the group: 1, 0.5, 0.4, 0.3, 0.2, 0.1, 0.05, 0.01, 0.005, 0.001 times the width of the light mixing region in a direction parallel to the array direction of the array of coupling lightguides and perpendicular to the thickness direction of the core layer in the light mixing region of the film-based lightguide. In another embodiment, in all or a portion of the light mixing region, the average width or width of each of the plurality of reflecting surfaces is less than one selected from the group: 1, 0.5, 0.4, 0.3, 0.2, 0.1, 0.05, 0.01, 0.005, 0.001 times the average width of the coupling lightguides in a direction parallel to the array direction of the array of coupling lightguides and perpendicular to the thickness direction of the core layer in the light mixing region of the film-based lightguide. In another embodiment, in all or a portion of the light mixing region, the average width of each of the plurality of reflecting surfaces, w0, and the average pitch of the plurality of reflecting surfaces, p0, are such that w0 divided by p0 is less than one selected from the group: 1, 0.7, 0.5, 0.4, 0.3, 0.2, 0.1, and 0.05. In one embodiment, the plurality of reflecting surfaces are printed lines of a light transmitting material on the core layer of the film-based lightguide wherein the printed lines have an average width, w0, and an average pitch, p0, in a direction parallel to the array direction of the array of coupling lightguides and perpendicular to the thickness direction of the core layer in the light mixing region of the film-based lightguide such that the duty cycle for the lines, dc, is w0 divided by p0. In one embodiment, the duty cycle of the lines is less than one selected from the group: 1, 0.7, 0.5, 0.4, 0.3, 0.2, 0.1, and 0.05.

Length of the Plurality of Reflecting Surfaces

As used herein, the average length or length of each of the plurality of reflecting surfaces is defined in a direction perpendicular to the array direction of the array of coupling lightguides and perpendicular to the thickness direction of the core layer of the film. In one embodiment, the average length or length of each of the plurality of reflecting surfaces in the light mixing region of the film-based lightguide is confined within the light mixing region of the film-based lightguide. In one embodiment, the length of the plurality of reflecting surfaces extends into one or more coupling lightguides and/or into the light emitting region. In another embodiment, the average length or length of each of the plurality of reflecting surfaces is less than one selected from the group: 0.8, 0.7, 0.6, 0.5, 0.4, 0.3, 0.2, and 0.1 times the length of the light mixing region in a direction perpendicular to the array direction of the array of coupling lightguides and perpendicular to the thickness direction of the core layer in the light mixing region of the film-based lightguide. In another embodiment, the average length or length of each of the plurality of reflecting surfaces is greater than one selected from the group: 0.8, 0.7, 0.6, 0.5, 0.4, and 0.3 times the length of the light mixing region in a direction perpendicular to the array direction of the array of coupling lightguides and perpendicular to the thickness direction of the core layer in the light mixing region of the film-based lightguide. In one embodiment, the average length or length of each of the plurality of reflecting surfaces in the light mixing region of the film-based lightguide is greater than one selected from the group: 1, 2, 4, 5, 10, 20, 30, 40, 50, 60, 70, 80, and 90 millimeters and/or less than one selected from the group 2, 4, 5, 10, 20, 30, 40, 50, 60, 70, 100 and 200 millimeters. In another embodiment, the average length or length of each of the plurality of reflecting surfaces is greater than one selected from the group: 2, 4, 5, 8, 10, 15, 20, 30, 40, 50, and 100 times the width of the plurality of reflecting surfaces (in a direction parallel to the array direction of the array of coupling lightguides and perpendicular to the thickness direction of the core layer of the lightguide) in the light mixing region.

Height of Plurality of Reflecting Surfaces

As used herein, the average height or height of each of the plurality of reflecting surfaces is defined in a direction parallel to the thickness direction of the core layer of the lightguide. In one embodiment, the average height or height of each of the plurality of reflecting surfaces in the light mixing region of the film-based lightguide is confined within the core layer of the film-based lightguide in the light mixing region of the film-based lightguide. In another embodiment, the average height or height of each of the plurality of reflecting surfaces is less than one selected from the group: 0.6, 0.5, 0.4, 0.3, 0.2, 0.015, 0.1, 0.07, 0.05, and 0.02 times the thickness of the core layer of the film in the light mixing region in a direction parallel to the thickness direction of the core layer in the light mixing region of the film-based lightguide. In another embodiment, the average height or height of each of the plurality of reflecting surfaces is one or more selected from the group: less than 50 micrometers, less than 20 micrometers, less than 10 micrometers, less than 5 micrometers, less than 1 micrometer, greater than 0.2 micrometers, greater than 0.3 micrometers, greater than 0.5 micrometers, greater than 1 micrometer, greater than 2 micrometers, greater than 3 micrometers, and greater than 5 micrometers in the light mixing region in a direction parallel to the thickness direction of the core layer in the light mixing region of the film-based lightguide.

Cross-Sectional Shapes of Plurality of Reflecting Surfaces

In one embodiment, the cross-sectional shape of each of the plurality of reflecting surfaces in a cross-section plane parallel to the array direction of the array of coupling lightguides and parallel to the thickness direction of the core layer of the film-based lightguide in the light mixing region comprises all or a portion of one or more shapes selected from the group: circle, ellipse, square, rectangle, tringle, parallelogram, truncated triangle, isosceles trapezoid, trapezoid, acute trapezoid, quadrilateral, and polygon. In one embodiment, the lateral side-walls of the plurality of reflecting surfaces are oriented at an angle less than one selected from the group: 30, 20, 10, 8, 5, and 2 degrees from the direction normal to the surface of the core layer in the light mixing region of the film-based lightguide. In one embodiment, the plurality of reflecting surfaces are defined by a material added to a core layer or surface of the film-based lightguide and the total cross-sectional area of the plurality of reflecting surfaces (such as a plurality of linear light reflecting surfaces) is less than one selected from the group:

50, 40, 30, 20, 15, and 10 percent of a total, continuous cross-sectional area of the core layer of the film directly beneath (or above) the area defined by the plurality of reflecting surfaces in a plane comprising the thickness direction of the film and parallel to an array direction of the array of coupling lightguides. In one embodiment, the surfaces of the plurality of reflecting surfaces opposite the core layer of the film-based lightguide are parallel to the surface of the core layer at the plurality of reflecting surfaces in the light mixing region. In one embodiment, the cross-sectional shape of each of the plurality of reflecting surfaces in a cross-section plane parallel to the array direction of the array of coupling lightguides and parallel to the thickness direction of the core layer of the film-based lightguide in the light mixing region is curved and shaped as a line of material printed on a surface with a wetting contact angle less than 40 degrees.

Loss Due to Addition of Plurality of Reflecting Surfaces

In one embodiment, the total loss of light propagating in the light mixing region out of the film-based lightguide with a plurality of reflecting surfaces in the light mixing region is less than one selected from the group: 50, 40, 30, 20, and 10 percent of the light flux entering the light mixing region determined by collecting the light emitted from the surface of the film in the light mixing region in an integrating sphere compared to the light entering the light mixing region by cutting the film at the end of the coupling lightguides at the beginning of the light mixing region. In one embodiment, the loss due to the addition of the plurality of reflecting surfaces is primarily due to the end surfaces of the plurality of reflecting surfaces (as the plurality of reflecting surfaces extend from the coupling lightguides toward the light emitting region) with an orientation angle in the light mixing region with a component in the thickness direction of the core layer of the film-based lightguide and a component parallel to the array direction of the array of coupling lightguides. The angular extent of the end surface or physical extent of the end surface of the plurality of reflecting surfaces relative to the angular extent or physical extent of the light in the core layer in the film-based lightguide in the plane parallel to the array direction of the array of coupling lightguides and parallel to the thickness direction can contribute to the light loss since the end surface reflects a portion of the light back toward the coupling lightguides and/or out of the core layer (and/or the film) in the light mixing region (thus, exiting the film-based lightguide before the designed light emitting region with light extraction features and/or before the reflective spatial light modulator, for example). In general, the larger the physical and/or angular extent of the end surfaces of the plurality of reflecting surfaces, the more light is directed out of the core layer and/or film in the light mixing region of the film-based lightguide.

In one embodiment, the plurality of reflecting surfaces are total internal reflection surfaces that increase the uniformity of the light exiting in the light emitting region by reflecting a portion of the incident light from the core layer toward the lateral edges of the film in the light mixing region and the larger the end surfaces of the ends of the plurality of reflecting surfaces, the larger the light loss due to the larger angular extent reflected by the end surfaces. In some embodiments, it is desirable to increase the light mixing by increasing the area of the lateral surfaces of the plurality of light reflecting surfaces that reflect light toward the lateral edges of the film in the light mixing region and minimizing the area of the end surfaces of the plurality of light reflecting surfaces to reduce light loss. For some substantially linear plurality of reflecting surfaces, the lateral surface areas of the plurality of reflecting surfaces is the length of the plurality of reflecting surfaces multiplied by twice the height of the plurality of reflecting surfaces and the end surface area of the end surface of the plurality of reflecting surfaces is the height of the plurality of reflecting surfaces multiplied by the width of the plurality of reflecting surfaces (assuming a constant cross-section along the length direction in the light mixing region from the coupling lightguides to the light emitting region). Therefore, in this embodiment, the light mixing may be increased, and light loss minimized by increasing the length of the plurality of reflecting surfaces and reducing the width of the plurality of reflecting surfaces. In some embodiments, the height of the plurality of reflecting surfaces is reduced to reduce light loss by reducing the surface areas of the plurality of reflecting surfaces, and in order to increase the light mixing, the length of the plurality of reflecting surfaces is increased. In one embodiment, the average length of the plurality of reflecting surfaces divided by the average width of the plurality of reflecting surfaces is greater than one selected from the group: 5, 10, 20, 50, 80, 100, 500, 1,000, 5,000, 10,000, 15,000, 150,000, and 200,000.

In another embodiment, the light mixing region comprises interior light directing edges that redirect a portion of the incident light by total internal reflection to reduce the angular shadowing. These interior light directing edges may be made, for example, by laser cutting, die stamping, laser ablation, etc. and may be configured as discussed elsewhere herein. In one embodiment, the interior light directing edges reflect more light toward the excess width region or toward features (such as other interior light directing edges, lateral film edges, or light scattering materials) that reflect light such that it indirectly appears to originate from the excess width region from a particular direction and reduces the visibility of an angular shadow.

Adding a Separate Diffusion Layer or Material

In one embodiment, one or more layers of the light emitting display or light emitting device comprises a diffusion layer or film optically coupled to at least one of the light mixing region, lightguide region, and light emitting region. The diffusion layer or film may spread more light laterally into the excess angular width region where it may subsequently reflect from an edge or feature within the excess width region (such as an interior light directing edge, lateral edge, light scattering material, or light reflecting or scattering surface in the excess width region) back toward the light emitting region or it may redirect light such that it indirectly appears to originate from the excess width region from a particular angle. In this embodiment, the diffusion layer or material may direct light toward an element or feature of the light mixing region, lightguide region, or light emitting region that is outside of the excess width region (such as an interior light directing edge, a light scattering material, or light reflecting or scattering surface) where it reflects from the element or feature from a location and into a direction that corresponds to a location and direction of light propagation that would be the same for light had it originated from the excess width region and propagated toward the light emitting region. In one embodiment, one or more diffusing layers or films is positioned on or between two or more elements, films, or layers selected from the group: protective outer film with a hardcoat, touchscreen film, light turning film comprising light turning features, adhesive layer, cladding layer on the viewing side of the display, film-based lightguide, core layer of the film based lightguide, cladding layer on the display side of the core layer of the film-based lightguide, and reflective spatial light modulator. In one embodiment, the diffusion layer in-situ in the light emitting device or display has an angular full-width at half maximum intensity less than 0.5, 1, 2, 3, 4, 5, 7, 10, 15, or 20 degrees when measured using laser light at 532 nanometers (with a divergence less than or equal to 1.5 milliradians) incident normal to the surface of the diffusion film or layer with a photometer with ⅓ degree or less measurement angle such as a Chroma Meter CS-160 from Konica Minolta with a ⅓ degree measurement angle. In one embodiment, the diffusion film or layer is measured prior to combining with the display or light emitting device or after extracting from the light emitting device or display.

In one embodiment, a light turning film comprises an array of linear grooves recessed from a substantially planar surface and an overprint of a light transmitting material that forms refractive and/or reflective surface features within the groove due to the overprinted material flowing into the grooves. In one embodiment, light from a light mixing region comprises shadow areas (due to, for example, ends of interior light directing edges or ends/end regions of coupling lightguides and the scattering features formed by the light transmitting material flowing into the grooves of the light turning film diffuses the light in the light emitting region (and optionally the light mixing region if the grooves extend into the light mixing region) and reduces the visibility of shadow areas or other non-uniform spatial or angular areas of the light emitted from the light emitting region of the film as a frontlight for a reflective spatial light modulator. In one embodiment the wetting angle of the light transmitting material (such as a clear ink) on the surface of the light redirecting optical element is less than one selected from the group of 30, 20, 10, 8, 6, and 4 degrees.

Adding Additional Turning Features in Light Emitting Region with a Refractive Index Different than the Adjacent Region In one embodiment, the light emitting region of the film-based lightguide comprises light turning features in one or more cladding layers and/or the core layer the form of grooves, pits, holes, or surface relief and an adhesive is laminated, printed, coated, or otherwise applied to the light turning feature where the refractive index at the sodium wavelength between the adhesive material and the surface material of the one or more cladding layer and/or the core layer, respectively, is greater than 0.005, 0.01, 0.02, 0.03, 0.04, 0.05, 0.06, 0.07, 0.08, 0.09, and 0.1. In this embodiment by maintaining a refractive index difference between the materials at the interface, a first portion of light at higher angles will undergo total internal reflection that can be directed to the excess width region or to indirectly appear to be originating from the excess width region (as discussed in the preceding sections). A large refractive index difference, such as that between common polymer material films or substrate materials and air could result in too much scattering or backscatter that reduces the contrast of the display, for example. By using a smaller refractive index difference, the large angles of incident light may be selected out to totally internally reflect or refract to the excess width region or appear to be originating from the excess width region, such as by reflecting from an element or feature of the light mixing region, lightguide region, or light emitting region that is outside of the excess width region (such as an interior light directing edge, a light scattering material, or light reflecting or scattering surface) that corresponds to a location and direction of light that would be the same for light had it originated from the excess width region and propagated toward the light emitting region.

Interior Light Directing Edges or Guides to Direct Light in Lightguide Region or Light Emitting Region In one embodiment, the lightguide region and/or light emitting region comprises one or more interior light directing edges and/or light transmitting guides (such as printed sub-regions of a light transmitting material as disclosed above with respect to the light mixing region) to reflect light into specific spatial locations with specific angular profiles such that they reflect more light toward the excess width region (which may subsequently reflected toward the light emitting region) or toward features (such as other interior light directing edges, lateral film edges, or light scattering materials) that reflect light such that it indirectly appears to originate from the excess width region. For example, in one embodiment, cuts through the core layer (and optionally one or more cladding layers) are made in the light emitting region to direct light output near the outer coupling lightguides in the array direction of the array of coupling lightguides toward the excess width region. These cuts could form guides that direct light into the excess width region and the same cut or different cuts could be made to reflect light back toward the light emitting region from a location within the excess width region.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the film based lightguide is positioned between the color filter layer and the electro-optical layer such that the parallax effects due to high angle light are minimized (thus resulting in higher contrast, greater resolution, or increased brightness). In another embodiment, the film-based lightguide is the substrate for the color filter material or layer. In another embodiment, the film-based lightguide is the substrate for the electro-optic material or layer.

In one embodiment, the distance between the light extraction features and the color filters in a multi-color display is minimized by positioning the film-based lightguide within the display or using the film-based lightguide as a substrate for a layer or material of the display (such as, for example, the substrate for the color filter layer, transparent conductor layer, adhesive layer, or electro-optical material layer). In one embodiment, the light emitting device includes a plurality of light absorbing adhesive regions that adhere to one or more layers of the display or film-based lightguide (such as on the cladding layer of the film-based lightguide or on the electro-optical material layer).

In one embodiment, the light emitting device includes a film-based lightguide and a force sensitive touchscreen wherein the film based lightguide is sufficiently thin to permit a force sensitive touchscreen to function by finger pressure on the display.

In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices, and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, the flexible connector is a "flexible cable", "flex cable," "ribbon cable," or "flexible harness" including a rubber film, polymer film, polyimide film, polyester film or other suitable film.

In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In the aforementioned embodiment, the film-based lightguide may include volumetric light extraction features or light extraction features on one or more surfaces of the lightguide and the lightguide may include one or more lightguide regions, one or more cladding regions, or one or more adhesive regions.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, nm, a second cladding layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation, $\theta_f$, from the angle of incidence, following the equation: $\theta_f = \theta_{c2} - \theta_{c1}$, where $\theta_{c2}$ is the critical angle between the core layer or region and the second cladding layer or region and can also be expressed as $\theta_{c2} = \sin^{-1}(n_{D2}/n_{DL})$, and $\theta_{c1}$ is the critical angle between the core layer or region and the first cladding layer or region and can be expressed as $\theta_{c1} = \sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max} < 1.1 \times \theta_f$. In another embodiment, the low angle directing feature is configured to provide an average first total angle of deviation, $\theta_{fave}$, from the angle of incidence of $\theta_{fave} = \theta_{c2} - \theta_{c1}$. In another embodiment, the low angle directing feature is configured to provide an average total angle of deviation, $\theta_{ave}$ of less than 110% of the average first total angle of deviation or $\theta_{ave} < 1.1 \times \theta_{fave}$.

For example, in one embodiment, the first material has a refractive index of $n_{D1} = 1.4$, the second material has a refractive index of $n_{D2} = 1.5$, and the core layer or region material has a refractive index of $n_{DL}=1.6$. In this example, a low angle directing feature comprises an angled reflective surface wherein the angle of the surface causes a total light deviation less than $\theta_f$ such that the light preferentially escapes the core layer of the lightguide through the higher index cladding layer or region. In this example, $\theta_{c1}=61$ degree, $\theta_{c2}=70$ degrees, and thus the maximum first total angle of deviation for optimum coupling into the second cladding region is less than 9 degrees. Since light reflecting from an angled surface undergoes a total angle of deviation of twice the angle of the feature, the angle of the features is chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 microns and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle directing features and propagates to the light turning features interacts with an average of more than 1, 2, 3, 4, 5, 10, 15, or 20 low angle directing features before reaching a light turning feature.

In one embodiment, the ratio of the length of the light emitting region in the direction of light propagating from the first side to the second side of the light emitting region to the average thickness of the light emitting region is greater than one selected from the group: 300, 500, 1000, 5,000, 7,000, 10,000, 15,000, and 20,000.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMS based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

In a further embodiment, the backlight or frontlight includes a lightguide disposed to receive light from a blue or UV light emitting source and further includes a region including a wavelength conversion material such as a phosphor film. In another embodiment, the backlight includes 3 layers of film lightguides wherein each lightguide illuminates a display with substantially uniform luminance when the corresponding light source is turned on. In this embodiment, the color gamut can be increased by reducing the requirements of the color filters and the display can operate in a color sequential mode or all-colors-on simultaneously mode. In a further embodiment, the backlight or frontlight includes 3 layers of film lightguides with 3 spatially distinct light emitting regions including light extraction features wherein each light extraction region for a particular lightguide corresponds to a set of color pixels in the display. In this embodiment, by registering the light extracting features (or regions) to the corresponding red, green, and blue pixels (for example) in a display panel, the color filters are not necessarily needed, and the display is more efficient. In this embodiment, color filters may be used, however, to reduce crosstalk.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes. A different illumination mode can include one or more different light output properties selected from the group: different times in the "on" state or "off" state of illumination; different frequencies of illumination; different durations of illumination; different colors of illumination; different color gamuts; different angular light output profiles; different spatial light output profiles; different spatial luminance uniformity; and different color, luminances or luminous intensity at a specific angle. For example, in one embodiment, the light emitting device illuminates a main display and a sub-display. The main display and sub-display could be two light emitting areas defined by the same spatial light modulator or two light emitting areas defined by two separate spatial light modulators. In one embodiment, each light emitting area or display may be illuminated by the same or different lightguides and/or light sources. For example, in one embodiment, the light emitting device has a high color gamut lightguide positioned to illuminate the main display of a device with a main display and sub-display from the front in a first mode using light from monochrome red, green, and blue LEDs. In this embodiment, the sub-display can be illuminated by a second lightguide that emits only white light to reduce the power required for illuminating the sub-display (which could include icons or keys, for example) to the same luminance. In another embodiment, a first display region includes an array of color filters and a second display region does not include an array of color filters. For example, in one embodiment, the sub-display may be designed without a color filter array such that the monochrome sub-display illuminated by a white (or monochrome) light source can operate at a significantly lower power for the same luminance as the main display with color filters since light is not absorbed by a color filter array.

In one embodiment, the device includes two or more lightguides spatially separated in the plane of the active area of the light emitting device such that they can be illuminated independently. In this embodiment, for example, the edges of one or more lightguides opposite the side of the lightguide with the light input coupler may include a light reflective or absorptive coating to prevent light from exiting one lightguide and entering into an adjacent lightguide. In one embodiment, the spatially separated lightguides permit the light emitting display device to have a substantially uniform thickness.

Light Emitting Device Assembly

In one embodiment, the film-based lightguide is adhered to a display, component of a display, or other component of a light emitting device using lamination and/or one or more of the following: addition of pressure, addition of heat, laminating a coated layer or region, laminating to a relative position maintaining element, and coating an adhesive onto a substrate or component and joining one component to another.

In one embodiment, the adhesive functions as a cladding between the core region of the lightguide and another component and reduces the flux of light absorbed by the RPME due to the lightguide contacting the RPME. In another embodiment, the pressure sensitive adhesive increases the yield strength or impact strength (Izod or Charpy impact strength, for example) of the film-based lightguide, light emitting device, and/or display. In one embodiment, an adhesive is positioned between the lightguide and a reflective film, surface of the relative position maintaining element, or optical component disposed to receive light from the light source and direct it into the input surface of the stack of coupling lightguides.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In one embodiment, the carrier film permits at least one selected from the group: easy handling, fewer static problems, the ability to use traditional paper or packaging folding equipment, surface protection (scratches, dust, creases, etc.), assisting in obtaining flat edges of the lightguide during the cutting operation, UV absorption, transportation protection, and the use of winding and film equipment with a wider range of tension and flatness or alignment adjustments. In one embodiment, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation. In one embodiment, one or more additional layers are laminated in segments or regions to the core region (or layers coupled to the core region) such that there are regions of the film without the one or more additional layers. For example, in one embodiment, an optical adhesive functioning as a cladding layer is optically coupled to a touchscreen substrate; and an optical adhesive is used to optically couple the touchscreen substrate to the light emitting region of film-based lightguide, thus leaving the coupling lightguides without a cladding layer for increased input coupling efficiency.

In another embodiment, the carrier film is slit or removed across a region of the coupling lightguides. In this embodiment, the coupling lightguides can be bent or folded to a smaller radius of curvature after the carrier film is removed from the linear fold region.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed between a linear fold region and a lightguide region. The relative position maintaining element may be a polymer or metal component that is adhered or held against the surface of the coupling lightguides, light mixing region, lightguide region or film at least during one of the translational steps. In one embodiment, the relative position maintaining element is a polymeric strip with planar or saw-tooth-like teeth adhered to either side of the film near the first linear fold region, second linear fold region, or both first and second linear fold regions of the coupling lightguides. By using saw-tooth-like teeth, the teeth can promote or facilitate the bends by providing angled guides. In another embodiment, the relative position maintaining element is a mechanical device with a first clamp and a second clamp that holds the coupling lightguides in relative position in a direction parallel to the clamps parallel to the first linear fold region and translates the position of the clamps relative to each other such that the first linear fold region and the second linear fold region are translated with respect to each other to create overlapping coupling lightguides and bends in the coupling lightguides. In another embodiment, the relative position maintaining element maintains the relative position of the coupling lightguides in the first linear fold region, second linear fold region, or both the first and second linear fold regions and provides a mechanism to exert force upon the end of the coupling lightguides to translate them in at least one direction.

In another embodiment, the relative position maintaining element includes angular teeth or regions that redistribute the force at the time of bending at least one coupling lightguide or maintains an even redistribution of force after at least one coupling lightguide is bent or folded. In another embodiment, the relative position maintaining element redistributes the force from bending and pulling one or more coupling lightguides from a corner point to substantially the length of an angled guide. In another embodiment, the edge of the angled guide is rounded.

In another embodiment, the relative position maintaining element redistributes the force from bending during the bending operation and provides the resistance to maintain the force required to maintain a low profile (short dimension in the thickness direction) of the coupling lightguides. In one embodiment, the relative position maintaining element includes a low contact area region, material, or surface relief region operating as a low contact area cover, or region wherein one or more surface relief features are in physical contact with the region of the lightguide during the folding operation and/or in use of the light emitting device. In one embodiment, the low contact area surface relief features on the relative position maintaining element reduce decoupling of light from the coupling lightguides, lightguide, light mixing region, lightguide region, or light emitting region.

In a further embodiment, the relative position maintaining element is also a thermal transfer element. In one embodiment, the relative position maintaining element is an aluminum component with angled guides or teeth that is thermally coupled to an LED light source.

In another embodiment, a method of manufacturing a lightguide and light input coupler including a light transmitting film with a lightguide region continuously coupled to each coupling lightguide in an array of coupling lightguides where the array of coupling lightguides include a first linear fold region and a second linear fold region substantially parallel to the first fold region, includes the steps: (a) forming an array of coupling lightguides physically coupled to a lightguide region in a light transmitting film by physically separating at least two regions of a light transmitting film in a first direction; (b) increasing the distance between the first linear fold region and the second linear fold region of the array of coupling lightguides in a direction perpendicular to the light transmitting film surface at the first linear fold region; (c) decreasing the distance between the first linear fold region and the second linear fold region of the array of coupling lightguides in a direction substantially perpendicular to the first linear fold region and parallel to the light transmitting film surface at the first linear fold region; (d) increasing the distance between the first linear fold region and the second linear fold region of the array of coupling lightguides in a direction substantially parallel to the first linear fold region and parallel to the light transmitting film surface at the first linear fold region; and (e) decreasing the distance between the first linear fold region and the second linear fold region of the array of coupling lightguides in a direction perpendicular to the light transmitting film surface at the first linear fold region; such that the coupling lightguides are bent, disposed substantially one above another, and aligned substantially parallel to each other.

In one embodiment, the RPME includes alignment guides such as holes, ridges, openings, teeth, protrusions, or connectors, on one, two, three, or four sides of the RPME. For example, in one embodiment, the RPME is longer in a first direction than a second orthogonal direction and includes one or more alignment holes near the two ends in the longer direction. In one embodiment, one or more alignment guides is positioned on the side of the RPME opposite the teeth in the second orthogonal direction.

Perforated Areas

In one embodiment, the light emitting device includes one or more functional layers selected from the group: the film-based lightguide; cladding layer of the film based lightguide; touchscreen layer or substrate; hardcoating layer or substrate; anti-glare layer or substrate; color filter layer or substrate; electro-optic layer or substrate; reflective material, film, layer, or substrate; polarizer layer or substrate; light redirecting layer or substrate; light extraction feature film, layer or substrate; impact protection layer or substrate; internal coating or layer; conformal coating or layer; circuit board or layer; thermally conducting film, layer or substrate; sealant layer or substrate; spacer layer or substrate; electrically conducting layer (transparent or opaque) or substrate; anode layer or substrate; cathode layer or substrate; active matrix layer or substrate; and passive matrix layer or substrate. In one embodiment, at least one functional layer is perforated to allow for tearing of the functional layer or substrate before, during, or after assembly, forming the coupling lightguides, folding the coupling lightguides, stacking the ends of the coupling lightguides, or adhering the lightguide to a display.

Folding and Assembly

In one embodiment, the coupling lightguides are heated to soften the lightguides during the folding or bending step. In another embodiment, the coupling lightguides are folded while they are at a temperature above one selected from the group: 50 degrees Celsius, 70 degrees Celsius, 100 degrees Celsius, 150 degrees Celsius, 200 degrees Celsius, and 250 degrees Celsius.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

Assembly Order

In one embodiment, the film-based lightguide includes an array of coupling lightguides and the array of coupling lightguides are folded prior to physically or optically coupling the film-based lightguide to the light emitting device, display or a component thereof. In another embodiment, the array of coupling lightguides are folded after physically or optically coupling the film-based lightguide to the light emitting device, display or a component thereof. In another embodiment, the light emitting device or display includes a light input coupler including a folded, stacked array of coupling lightguides and the light input coupler is assembled before or after the film-based lightguide is laminated to the display. In one embodiment, the display functions as a relative position maintaining element and adhering the film-based lightguide to the display maintains the relative position of the coupling lightguides during the subsequent folding operation.

Guide for Bend or Fold

In one embodiment, a lightguide or light emitting device comprises a guide for one or more bends or folds. In this embodiment, the guide is an element with at least one curved surface adjacent a curved inner surface of the film at the bend. In one embodiment, the guide limits the radius of curvature of the bend or fold such that the film does not crease, tear, craze, or crack in the fold or bend region. In one embodiment, the curved surface of the guide is in contact with the inner surface of the film and when tension is applied to the film (such as when a film is pulled behind itself), the guide surface ensures a minimum radius of curvature for the film. In one embodiment, the guide can help protect against crushing, creasing, or wrinkling of the film during handling, device assembly, or during the folding or bending step. In one embodiment, a lightguide comprises a film with a light emitting region and an array of coupling lightguides extending from a body of the film and the film is folded behind itself at a first fold; and a guide comprising a first curved surface adjacent an inner surface of the film at the first fold. In one embodiment, a lightguide comprises a film with a light mixing region disposed along the film between the light emitting region and an array of coupling lightguides extending from the film, the light mixing region is folded at a first fold such that a portion of the light mixing region is behind the light emitting region; and a first guide with a first curved surface adjacent an inner surface of the light mixing region of the film. In another embodiment, the light emitting region of the film folds behind itself at a first fold and the guide is positioned adjacent the light emitting region at the fold.

The guide may be formed from a metal, polymer, plastic, rubber, foam rubber, glass, inorganic material, organic material, or a combination thereof. In one embodiment, the guide is a component located within the fold or bend of the film and may be free-standing, physically coupled, operatively coupled, or mechanically coupled to a component of the device. The guide may be solid or hollow. In one embodiment the guide is a surface of a device element such as the film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, component of the light emitting device, thermal transfer element (such as a heat sink), or rolled-up portion of the film (such as a light mixing region wrapped around the coupling lightguides to form a shape with a curved surface that is used for the guide). In another embodiment, the guide is a separate component comprising a curved surface adjacent the inner surface of the film at the fold or bend wherein the guide is operatively coupled, physically coupled, adhered, or glued to one or more components selected from the group: film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, thermal transfer element, component of the light emitting device, and an intermediate component operatively coupled to one or more of the aforementioned components.

Guide Surface

In one embodiment, the surface of the guide adjacent the inner surface of the film at the fold or bend is curved in a first plane comprising the fold or bend of the film. In one embodiment, the curved surface of the guide or a portion of the curved surface of the guide adjacent the inner surface of the film at the fold or bend in a plane comprising the fold or bend of the film comprises a subtended angle from a point at the midpoint of the line between a point on the inner surface of the film at the start of the fold or bend and the point on the inner surface of the film at the end of the fold or bend, and the subtended angle is one or more selected from the group: greater than 45 degrees, greater than 80 degrees, 90 degrees, greater than 90 degrees, greater than 135 degrees, 180 degrees, greater than 180 degrees, greater than 270 degrees, between 45 degrees and 360 degrees, between 80 degrees and 360 degrees, between 80 degrees and 270 degrees.

In one embodiment, the cross-sectional shape of the surface of the guide adjacent the inner surface of the film in the fold or bend region comprises all, a portion, or a combination of a circle, semicircle, oval, ellipse, parabola, or hyperbola.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 1, 2, 4, 8, 10, 20, 30, 50, 100, 200 and 400 millimeters. In embodiments where the radius of curvature of the surface of the guide is not uniform, the average radius of curvature is the average radius of curvature of the surface in the region of the surface of the guide adjacent the inner surface of the film. In another embodiment the curved surface of the guide or the portion of the curved surface of the guide adjacent the inner surface of the film at the fold or bend has a radius of curvatures or average radius of curvature greater than one selected from the group: 1, 2, 4, 8, 10, 20, 30, 50, 100, 200 and 400 millimeters. In this embodiment, the guide can maintain the minimum radius of curvature for the film at the fold to 4 millimeters, for example.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 2, 4, 8, 10, 20, 30, and 50 times the average thickness of the film at the fold or bend. In another embodiment the curved surface of the guide or the portion of the curved surface of the guide adjacent the inner surface of the film at the fold or bend has a radius of curvatures or average radius of curvature greater than one selected from the group: 0.5, 1, 2, 3, 4, 8, 10, 20, and 30 times the average thickness of the film at the fold or bend. In this embodiment, the guide can maintain the minimum radius of curvature for the film at the fold to greater than 2 times the average thickness of the film at the fold or bend, for example.

In one embodiment, a reflective display comprises reflective spatial light modulator (SLM), a frontlight comprising a film with a light emitting region positioned adjacent a top surface of the reflective SLM on the viewing side of the reflective SLM and configured to extract light toward the reflective SLM, wherein the film is folded behind and adjacent a bottom surface of the reflective SLM at a first fold and the ratio of the radius of curvature or average radius of curvature of a surface of the guide adjacent the inner surface of the film at the fold in a plane comprising the fold to the thickness of the reflective SLM from the top surface to the bottom surface in a plane comprising the fold is greater than one selected from the group: 0.5, 0.75, 1, 1.25, 1.5, 1.75, 2, 2.5, 3, 3.5, 4, 4.5, 5, 6, 7, 8, 9, and 10.

In one embodiment, the inner surface of the film is in contact with the outer surface of the guide at the fold or bend and, in a plane comprising the fold or bend, the radius of curvature or average radius of curvature of the film at the fold or bend along the inner film surface in contact with the outer surface of the guide is substantially the same as the radius of curvature or average radius of curvature of the outer guide surface in contact with the inner surface of the film at the fold or bend.

In one embodiment, the surface of the guide adjacent the film at the fold or bend is smooth, rough, comprises surface undulations, surface grooves, surface pits, or raised surface relief structures. In one embodiment, the non-smooth surface reduces the surface area of the guide in contact with the film and can reduce the friction when the film is pulled or folded behind itself while maintaining a minimum radius of curvature for the fold or bend.

In one embodiment, the cross-section of the guide at the surface of the guide adjacent the inner surface of the film at the fold or bend in a plane comprising the fold or bend is substantially constant in a direction perpendicular to the plane comprising the fold or bend. For example, in one embodiment, the guide has a shape of substantially half of a rod with a semicircular cross-section, with a length more than three times it's width in a plane comprising the fold of the film, and a surface adjacent the inner surface of the film with a cross-section comprising an arc subtending 180 degrees in the plane comprising the fold.

Frame

In one embodiment, one or more relative position maintaining elements are operatively coupled to a frame. In one embodiment, the frame includes a perimeter region and an interior opening. The interior opening can reduce the weight and material costs of the frame, relative to a sheet, for example. In one embodiment, the frame is thermally coupled to a light source such that the frame transfers heat away from the light source through conduction. For example, in one embodiment, the light source is an LED and is thermally coupled to a metal core circuit board that is thermally coupled to the frame. In another embodiment, a light emitting device includes a film-based lightguide that is operatively coupled to the frame. For example, in one embodiment, the film-based lightguide is adhered along one or more sides of a frame. In another embodiment, the length and width of the frame are greater than 5 times the average thickness of the frame. In another embodiment, the frame has a top surface opposite the bottom surface in the thickness direction and the film-based lightguide is operatively coupled to the frame on the top surface, the bottom surface, or both the top and bottom surfaces. In another embodiment, the film-based lightguide is operatively coupled to the top surface and the bottom surface of the frame along the same surface of the lightguide. In one embodiment, the film is operatively coupled to the frame through an intermediate material or component, such as film, optical film, reflective film, frame clamp, fastener, adhesive, housing or housing component, or other element of the light emitting device. In another embodiment, the lightguide is operatively coupled to the frame such that the frame prevents the lightguide from unfolding due to residual stress remaining in the lightguide. In another embodiment, the frame includes one or more curved surfaces or edges along one or more sides to increase the contact surface of the frame with the film-based lightguide and reduce the likelihood of a tear. In one embodiment, a frame includes a curved region with a radius of curvature less than one selected from the group: 1, 2, 4, 8, 10, 20, 30, 50, 100, 200 and 400 millimeters. In one embodiment, the width and/or the length dimension of the frame is greater than the corresponding length or width dimension of the light emitting area of the film-based lightguide. In another embodiment, the width and/or the length of the frame is equal to the corresponding length or width dimension of the light emitting area of the film-based lightguide. In one embodiment, the width and/or the length dimension of the frame is less than the corresponding length or width dimension of the light emitting area of the film-based lightguide. In another embodiment, the width and/or the length dimension of the frame is less than the corresponding length or width dimension of the light emitting area of the film-based lightguide corresponding to the area illuminating a display. In another embodiment, the length or width dimension of the relative position maintaining element is less than the distance between two attachment mechanisms operatively configured to couple to the relative position maintaining element along opposite sides of the frame.

Attachment Mechanisms for Securing Components to the Frame

In one embodiment, the frame includes a plurality of attachment mechanisms on one or more sides or internal regions that facilitate the coupling of the frame to one or more components selected from the group: one or more relative position maintaining elements, one or more light sources, one or more printed circuit boards, a housing, one or more films, one or more optical films, one or more reflective films, one or more film-based lightguides, one or more reflective displays, one or more transmissive displays, one or more transflective displays, a flexible electrical connector, one or more heat sinks, one or more thermal conducting elements, one or more optical elements, one or more batteries, one or more touch sensors (including switches or capacitive touch sensors), a touch screen, and a ground connector. In one embodiment, the attachment mechanism includes one or more fasteners selected from the group: holes, cavities, recessed regions, protrusions, pins, threaded fasteners, screws, bolts, nuts, screw holes, fixed or bendable tabs operatively configured to attach components, adhesive, clamps, clasps, flanges, latches, retainers, rivets, and stitches.

In one embodiment, the frame includes a plurality of attachment mechanisms that facilitate the coupling of the relative position maintaining element to the frame. For example, in one embodiment, the attachment mechanisms are tabs including one or more holes or protrusions. In this example, protrusions in the relative position maintaining element may operatively couple with holes in the tabs or holes in the relative position maintaining element may operatively couple with pins in the tabs on opposite sides of a frame. In one embodiment, attachment mechanisms on the frame are inset from the outer edges of the frame such that the corresponding attachment mechanisms on the component to which it is attached do not extend past the outer edges of the frame along one or more sides. For example, in one embodiment, an aluminum frame includes two attachment tabs on opposite sides in the width direction. In this embodiment, the frame tabs are set inwards from outer edge of the frame, by 3 millimeters for example, such that the pins protruding from opposite ends of a relative position maintaining element, protruding by 3 millimeters for example, do not extend past the edge of the frame when they are engaged into holes in the frame tabs. In another embodiment, a frame for a light emitting device includes one or more tabs configurable to operatively couple a relative position maintaining element to the frame wherein the tabs have an inset distance from the closest length or width edge of the frame greater than one selected from the group: 1, 2, 4, 8, 10, 20, 30, 50, 100, 200 and 400 millimeters.

In this embodiment, the width of the frame can be less than or equal to the width of the light emitting area of the light emitting device or display to enable a minimal frame (or border or bezel) around the light emitting area of the light emitting device or display. In another embodiment, the relative position maintaining element or housing including the relative position maintaining element or light source includes a recessed cavity or notch into which tabs on a frame can be inserted. For example, in one embodiment, tabs on an aluminum frame are inserted into an opening in a relative position maintaining element (or housing or other element operatively coupled to the relative position maintaining element) such that a mechanical force, such as from a spring or a restoring force from the elastic modulus in the tabs when inserted into the opening, forces contact between the tabs and a thermal conducting element. In this embodiment, the thermal conducting element is thermally coupled to a light emitting diode such that a conductive heat path is created between the light source and the frame. In another embodiment, the thermal conducting element includes one or more selected from the group: heat sink, metal core circuit board, thermally conductive adhesive or epoxy, thermally conductive pad, thermally conductive grease or gel, solder, component including copper, component including aluminum, component including a ceramic material, metal component, heat sink, and heat pipe. In one embodiment, the frame is a heat sink for the light source and is thermally coupled to the light source using a thermally conductive element. For example, in one embodiment, one or more LEDs are thermally coupled to an aluminum frame (such by thermally coupling to the frame through the frame's attachment mechanisms or directly thermally coupled to the frame) using a thermally conductive adhesive.

In another embodiment, the frame includes one or more attachment mechanisms in an interior region of the frame that is continuous with more than one side of the frame. For example, in one embodiment, the frame includes an opening that only extends across half of the length of the frame and the frame includes attachment one or more attachment mechanisms in the interior region outside the opening.

In one embodiment, the frame includes one or more tabs that are bent or include a curve or turn that operatively couples one or more optical films to the frame. For example, in one embodiment, an aluminum frame includes bent tabs (or regions with an angled or curved surface) creating openings along two sides and bendable tabs along opposite sides that enable optical films to be positioned on the frame, into the openings, and operatively coupled to the frame after bending the bendable tabs. In another embodiment, the frame includes one or more registration pins positioned outside the region corresponding to the light emitting area of the film-based lightguide when it is operatively coupled to the frame. For example, in one embodiment, a frame includes registration pins extending from the top surface of the frame along its periphery and one or more optical films include holes (or grooves that allow for film thermal expansion) that align with the pins when the films are operatively coupled to the frame.

In another embodiment, the frame includes two or more components, such as a top section and a bottom section that can be operatively coupled to each other. For example, in one embodiment, a frame includes a bottom section operatively coupled to a relative position maintaining element and a top section. In this embodiment, one or more optical films and/or lightguides can be operatively coupled to the top section of the frame and when the top section is operatively coupled to the bottom section the frame, the frame operatively couples one or more optical films and/or lightguides to the relative position maintaining element.

In one embodiment, the one or more pairs of tabs on opposite sides of a frame (along the width direction, for example) operatively couple a relative position maintaining element to a frame and are positioned on the frame such that a line between the tabs is not parallel with the edge of the frame joining the two sides (the length edge, for example). In this embodiment, the relative position maintaining element is not parallel to one or more sides of the frame.

In one embodiment, the frame includes at least one support arm extending from a frame side into the interior region or opening of the frame or outward from the interior region of the frame. In one embodiment, the support arm extends into the interior region of the frame and includes one or more tabs operatively coupled to one or more relative position maintaining elements. In one embodiment, the length of the support arm is less than the length of the opening in one direction. In another embodiment, the support arm extends across the length of the opening in one direction and is operatively coupled to two sides of the frame.

The following are more detailed descriptions of various embodiments illustrated in the FIGURES.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown). In this embodiment, the light mixing region 105 includes a tapered lateral edge 111 that tapers outward from the coupling lightguides 104 to the light emitting region 108. In this embodiment, the tapered edge 111 has an extended direction length 110 and a displacement 109 from the lateral edge 112 of the lightguide 107 in the light emitting region 108. When the light input coupler 101 and at least a portion of the light mixing region 105 of the lightguide 107 are folded behind the light emitting region 108 of the lightguide 107, the light source 102 does not extend past the lateral edge 112 of the lightguide 107 in the light emitting region 108.

Figure 2:
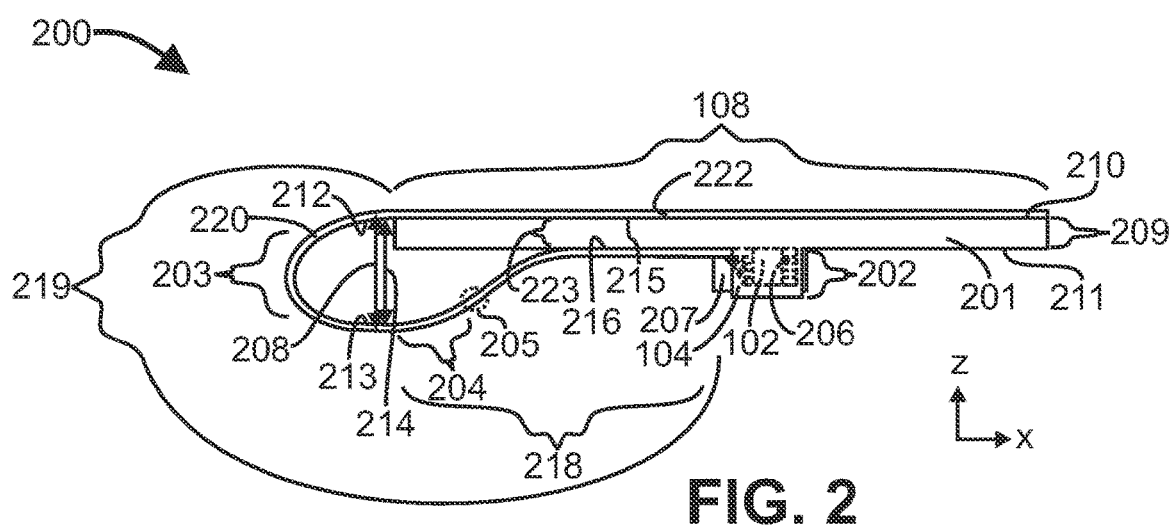
FIG. 2 is a side view of one embodiment of a light emitting device including a film-based lightguide operatively coupled to a frame.
Figure 3:
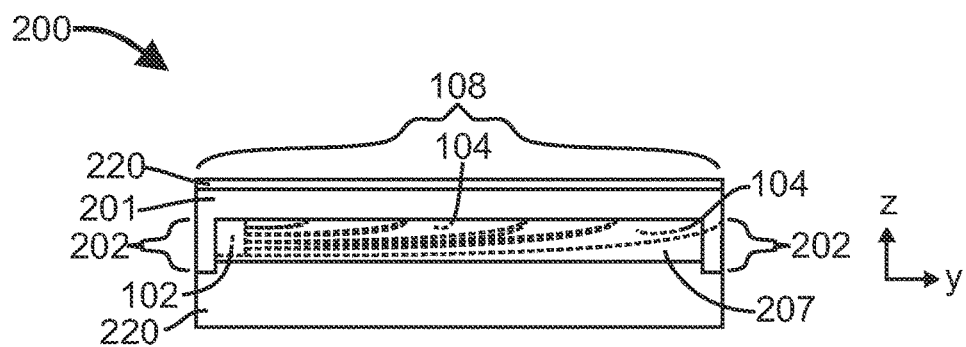
FIG. 3 is a side view of the light emitting device of FIG. 2 illustrating the relative position maintaining element between the two tabs of the frame.

FIGS. 2 and 3 are side views of one embodiment of a light emitting device 200 including a film-based lightguide 220 operatively coupled to a frame 201. In FIGS. 2 and 3 dotted lines are used to reference components behind other components. A plurality of coupling lightguides 104 extend from the lightguide 220 and are folded and stacked such that their ends 206 are positioned to receive light from the light source 102. A relative position maintaining element 207 substantially maintains the relative position of the coupling lightguides 104. The relative position maintaining element 207 is physically coupled to two tabs 202 of the frame 201. The lightguide 220 includes a taper (not shown) in the light mixing region 219 between the coupling lightguides 104 and the light emitting region 108 that permits the light source 102 and the relative position maintaining element 207 to remain between the tabs 202 of the frame 201 and not extend past the lateral edges 222 of the lightguide 220 in the light emitting region 108 in the y direction. In this embodiment, the frame 201 does not extend past the light emitting region 108 of the lightguide 220 in the y direction (shown in FIG. 3). The lightguide 220 includes a first bend 203 in the light mixing region 219 to position the light source 102 and the coupling lightguides 104 behind the light emitting region 108 and a second bend 204 in the light mixing region 219 to position the light source 102 and at least one coupling lightguide of the coupling lightguides 104 at a distance 209 from the light emitting region 108 of the lightguide 220 in the z direction less than the diameter 208 of the first bend 203. In this embodiment, the lightguide 220 is operatively coupled to the frame 201 on the top surface 210 and bottom surface 211 of the frame 201 and the maximum separation distance 214 between inner surface regions 212, 213 of the folded lightguide 220 is greater than the average separation distance 223 between the lower surface 215 of the light emitting region 108 of the lightguide 220 and the upper surface 216 of the portion 218 of the light mixing region 219 positioned below the light emitting region 108 (in the −z direction). The shape of the lightguide 220 further includes an inflection point 205 in the plane (x-z plane) including the first bend 203.

FIG. 3 is a side view of the light emitting device 200 of FIG. 2 illustrating the relative position maintaining element 207 between the two tabs 202 of the frame 201. In this embodiment, the light source 102 is thermally coupled to the frame 201 to transfer heat through the frame 201 and away from the light source 102 (such as an LED, for example).

Figure 4:
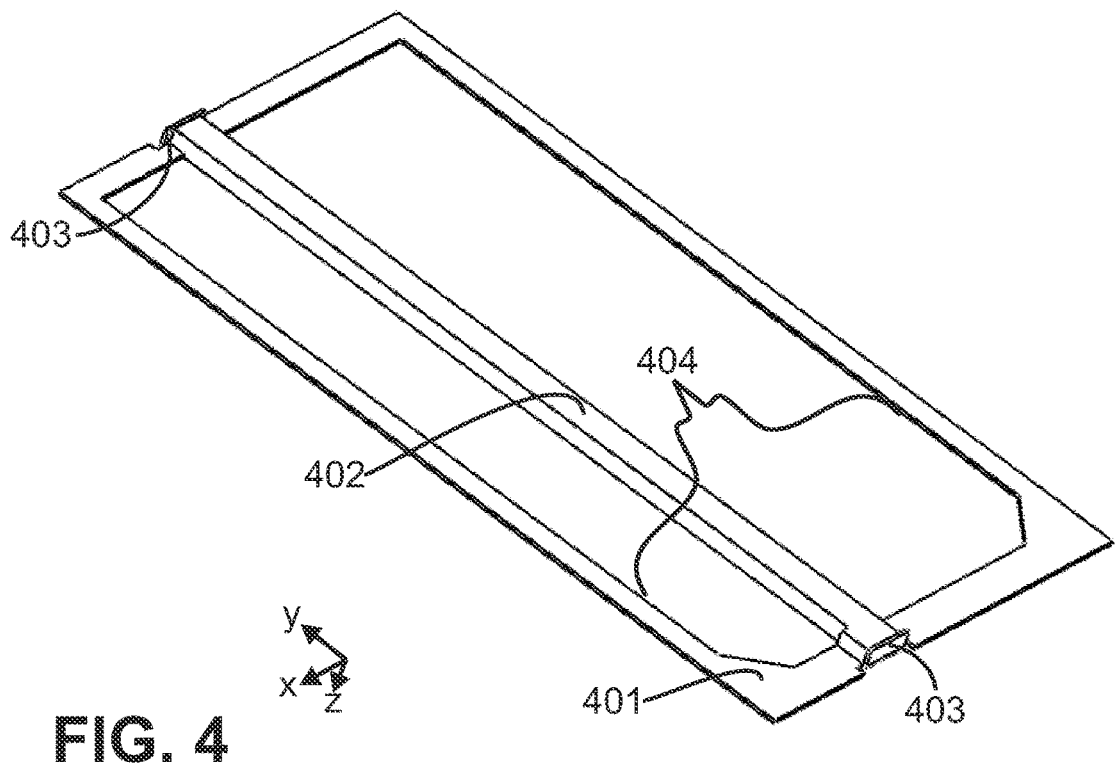
FIG. 4 is a bottom perspective view of one embodiment of a frame and a relative position maintaining element suitable for use in an embodiment of a light emitting device.

FIG. 4 is a bottom perspective view of one embodiment of a frame 401 and a relative position maintaining element 402 suitable for use in an embodiment of a light emitting device. The relative position maintaining element 402 is operatively coupled to the frame 401 using two tabs 403 of the frame 401 on opposite sides of the frame 401. The frame 401 further includes an opening 404 to reduce the weight of the frame 401 while maintaining structural integrity.

Figure 5:
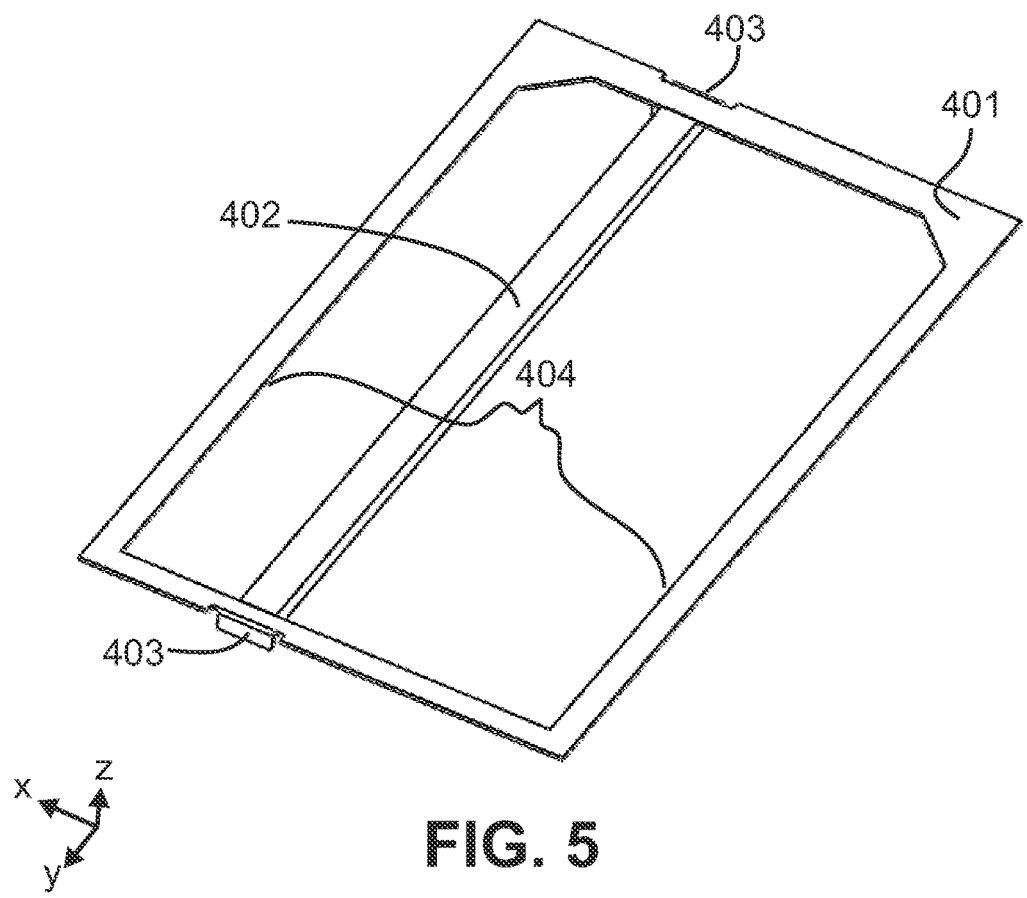
FIG. 5 is a top perspective view of the frame of FIG. 4.

FIG. 5 is a top perspective view of the frame 401 of FIG. 4.

Figure 6:
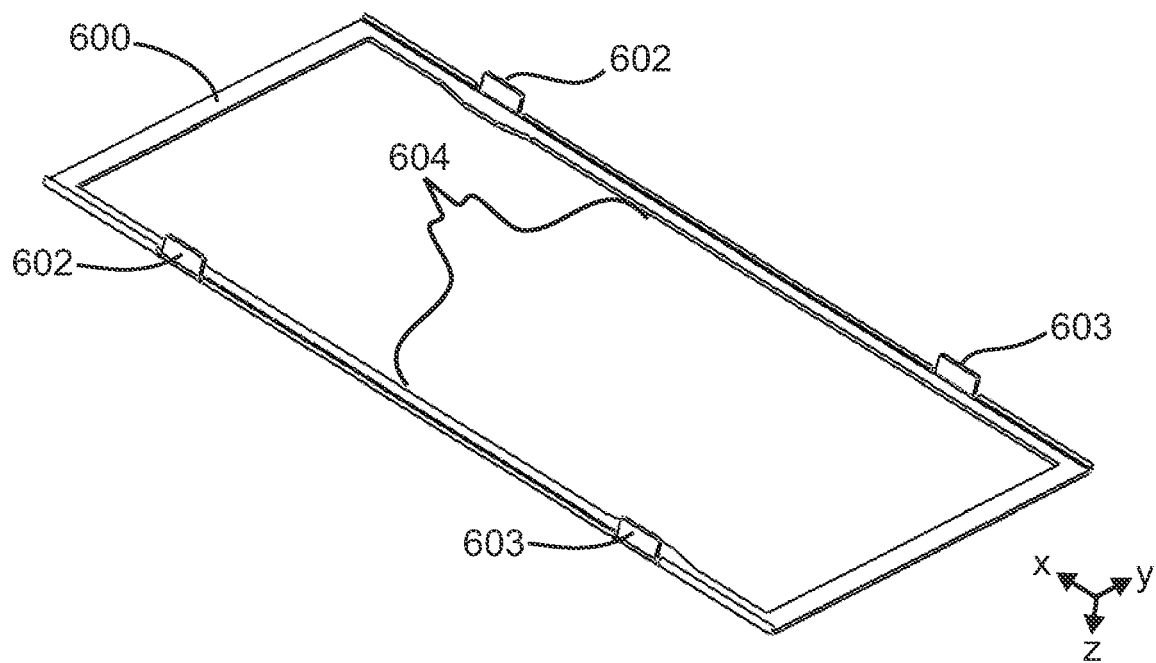
FIG. 6 is a perspective view of one embodiment of a frame including openings suitable for use in a light emitting device.

FIG. 6 is a perspective view of one embodiment of a frame 600 suitable for use in a light emitting device. The frame 600 includes first tabs 602 on opposite sides of the frame 600 and second tabs 603 on opposite sides of the frame 600. The frame 600 further includes an opening 604 to reduce the weight of the frame 600 while maintaining structural integrity.

Figure 7:
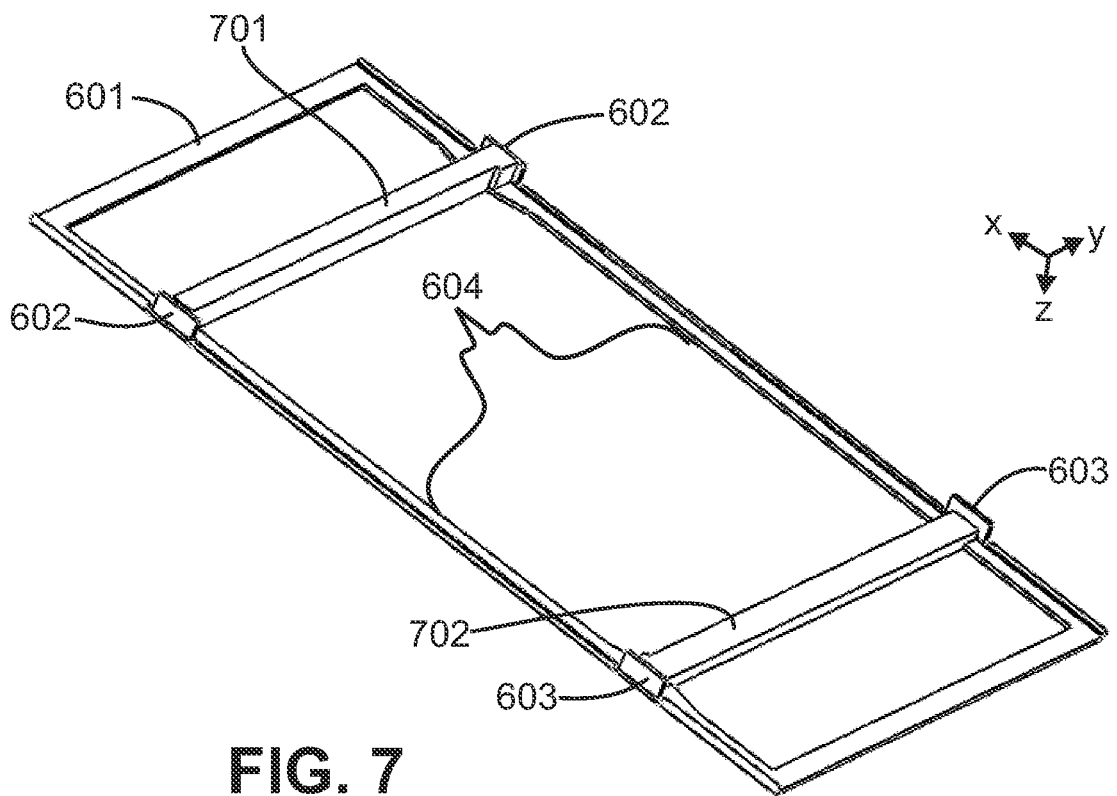
FIG. 7 is a perspective view of the frame of FIG. 6, a first relative position maintaining element, and a second relative position maintaining element.

FIG. 7 is a perspective view of the frame 600 of FIG. 6, a first relative position maintaining element 701, and a second relative position maintaining element 702. The first relative position maintaining element 701 is operatively coupled to the first tabs 602. The second relative position maintaining element 702 is operatively coupled to the second tabs 603. In this embodiment, for example, the frame 600 can be utilized in a light emitting device with two light input couplers for coupling light into two sides of a single lightguide or into two or more lightguides.

Figure 8:
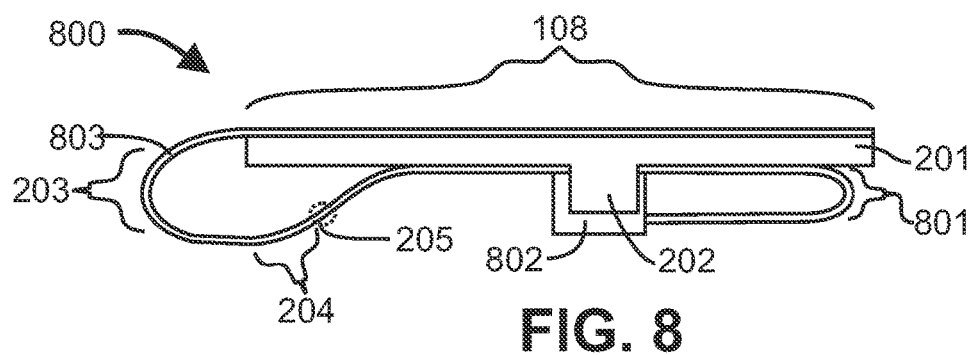
FIG. 8 is a side view of one embodiment of a light emitting device including a film-based lightguide including a plurality of bends operatively coupled to a frame.

FIG. 8 is a side view of one embodiment of a light emitting device 800 including a lightguide 803 operatively coupled to a frame 201. In this embodiment, the housing 802 includes a relative position maintaining element (not shown), a plurality of coupling lightguides (not shown), and a light source (not shown). The housing 802 is physically coupled to two tabs 202 of the frame 201. The lightguide 803 includes a first bend 203 in the light mixing region 904 (shown in FIG. 9) of the lightguide 803 between the light emitting region 108 and the housing 802 that positions the housing 802 and its components behind the light emitting region 108 and a second bend 204 in the light mixing region 219 that positions the housing 802 and its components closer to the light emitting region 108 of the lightguide 803 in the z direction. In this embodiment, the lightguide 803 further includes a third bend 801 in the light mixing region 904 of the lightguide 803 to accommodate the long length of the lightguide 803 (in the x-z plane including the first bend 203, the second bend 204, and the third bend 801). In this example, the ratio of the length of the light mixing region 904 to the length of the light emitting region 108 in the x-z plane is greater than 1.

Figure 9:
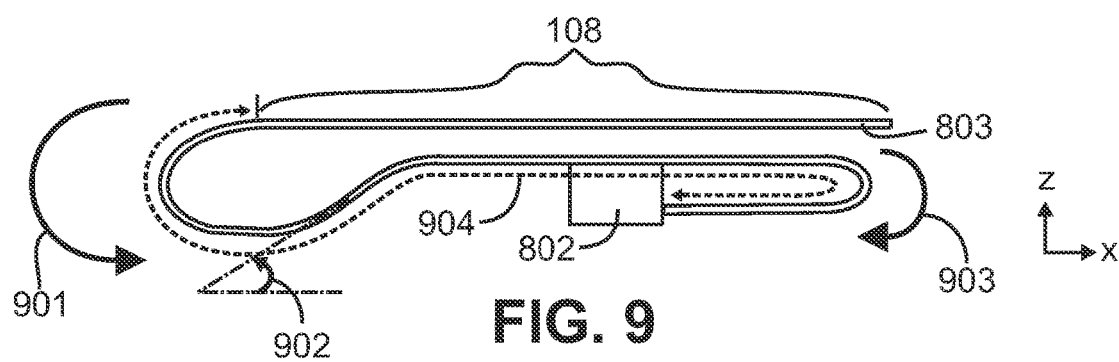
FIG. 9 is side view of the lightguide including the light emitting region, the light mixing region and the relative position maintaining element of FIG. 8.

FIG. 9 is side view of the lightguide 803 including the light emitting region 108, the light mixing region 904 and the relative position maintaining element (not shown) inside the housing 802 of FIG. 8. The light mixing region 904 is represented by a dashed line corresponding to the length of the lightguide 803 between the light emitting region 108 and the relative position maintaining element (not shown) inside the housing 802 in the x-z plane. In this embodiment, the first bend angle 901 is 180 degrees, the second bend angle 902 is 45 degrees, and the third bend angle 903 is 180 degrees.

Figure 10:
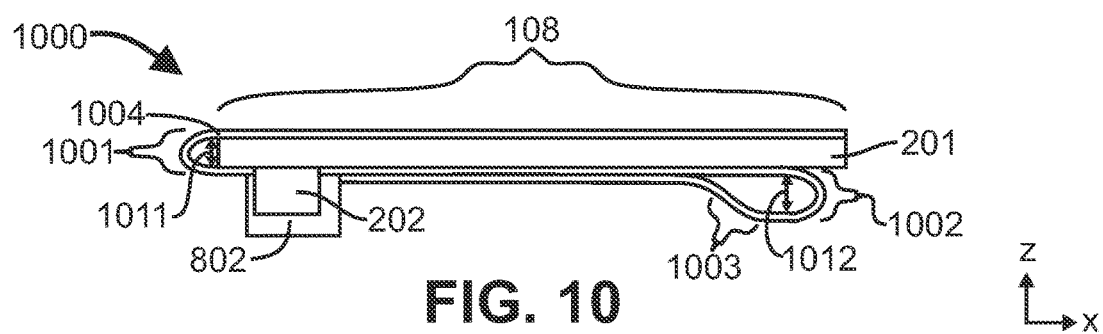
FIG. 10 is a side view of one embodiment of a light emitting device including a film-based lightguide including two bends operatively coupled to a frame.

FIG. 10 is a side view of one embodiment of a light emitting device 1000 including a lightguide 1004 operatively coupled to a frame 201. In this embodiment, the housing 802 includes a relative position maintaining element (not shown), a plurality of coupling lightguides (not shown), and a light source (not shown). The housing 802 is operatively coupled to two tabs 202 of the frame 201. The lightguide 1004 includes a first bend 1001 with a first bend angle of 180 degrees in the light mixing region of the lightguide 1004 between the light emitting region 108 and the housing 802. In this embodiment, the first bend 1001 positions the housing 802 behind the light emitting region 108 and closer to the light emitting region 108 of the lightguide 1004 in the z direction. In this embodiment, the lightguide 803 further includes a second bend 1002 and a third bend 1003 in the light mixing region of the lightguide 1004 to accommodate the long length of the lightguide 1004 1004 (in the x-z plane including the first bend 1001, the second bend 1002, and the third bend 1003). In this example, the ratio of the length of the light mixing region to the length of the light emitting region 108 in the x-z plane is greater than 2 and the lightguide 1004 is folded behind itself twice due to the first bend 1001 and the second bend 1002. The housing 802 is positioned closer to the light emitting region 108 of the lightguide 1004 than the sum of the first diameter 1011 of the first bend 1001 and the second diameter 1012 of the second bend 1002.

Figure 11:
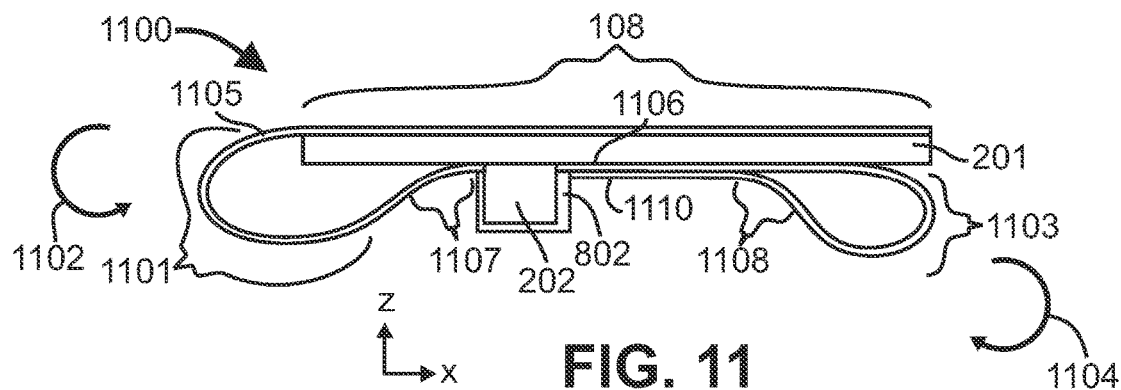
FIG. 11 is a side view of one embodiment of a light emitting device including a film-based lightguide with 3 bends operatively coupled to a frame.

FIG. 11 is a side view of one embodiment of a light emitting device 1100 including a lightguide 1105 operatively coupled to a frame 201. In this embodiment, the housing 802 includes a relative position maintaining element (not shown), a plurality of coupling lightguides (not shown), and a light source (not shown). The housing 802 is physically coupled to two tabs 202 of the frame 201. The lightguide 1105 includes a first bend 1101 with a first bend angle 1102 of 225 degrees in the light mixing region of the lightguide 1105 between the light emitting region 108 and the housing 802 that folds a second region 1106 of the lightguide 1105 behind or beneath and closer to the light emitting region 108 of the lightguide 1105 in the z direction. In this embodiment, the lightguide 1105 further includes a second bend 1103 with a second bend angle 1104 of 225 degrees in the light mixing region of the lightguide 1105 to fold the lightguide 1105 behind or beneath and closer to the second region 1106 of the lightguide 1105 and the light emitting region 108 of the lightguide 1105 in the z direction. In this embodiment, the first bend 1101 and the second bend 1103 are in the same plane (the x-z plane) and in the light mixing region of the lightguide 1105 between the light emitting region 108 and the housing 802. In this embodiment, the lightguide 1105 includes a third bend 1107 and a fourth bend 1108 that bend the lightguide 1105 to bring it substantially parallel with another region of the lightguide 1105 (such as the light emitting region 108) or component of the light emitting device 1100, such as the frame 201. In the embodiment shown, the third bend 1107 bends the lightguide 1105 such that the second region 1106 of the lightguide 1105 is parallel to the light emitting region 108 of the lightguide 1105. The fourth bend 1108 bends the lightguide 1105 such that the third region 1110 of the lightguide 1105 between the housing 802 and the second bend 1103 is parallel to the light emitting region 108 of the lightguide 1105.

Figure 12:
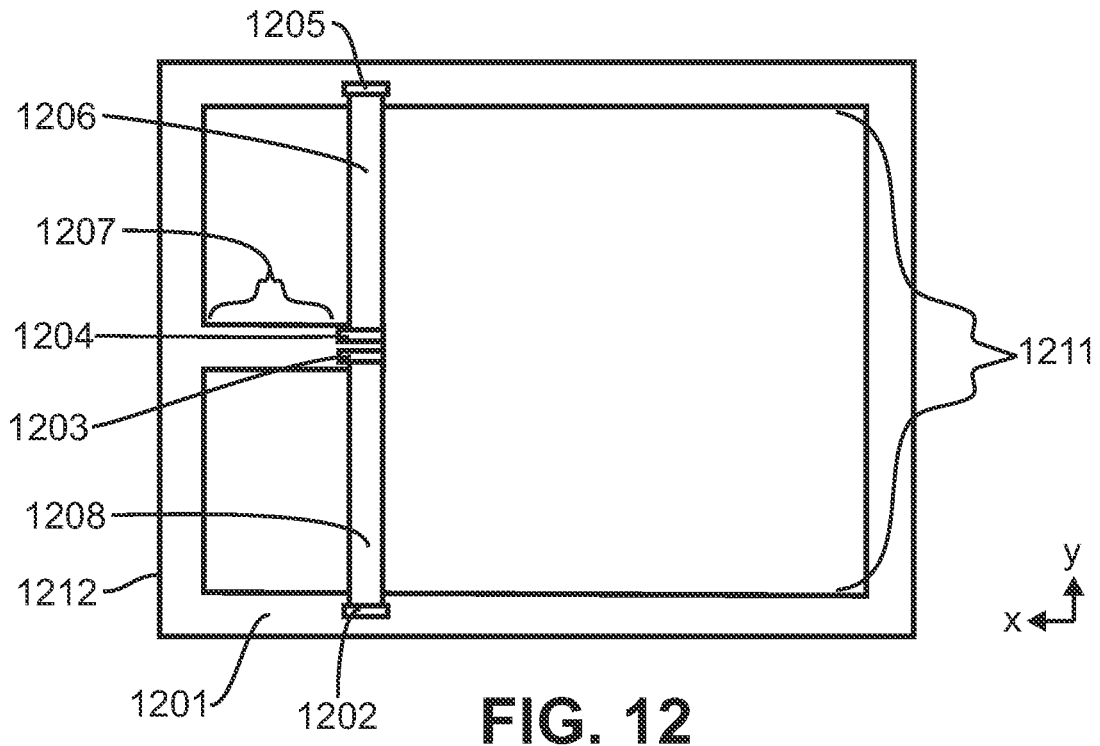
FIG. 12 is a bottom view of one embodiment of a frame, a first relative position maintaining element, and a second relative position maintaining element suitable for use in an embodiment of a light emitting device.

FIG. 12 is a bottom view of one embodiment of a frame 1201, a first relative position maintaining element 1206, and a second relative position maintaining element 1208 suitable for use in an embodiment of a light emitting device. The first relative position maintaining element 1206 is operatively coupled to the frame 1201 using a first tab 1204 and a second tab 1205 of the frame 1201 wherein the first tab 1204 extends from a support arm 1207 of the frame 1201 extending into the opening 1211 of the frame 1201. The second relative position maintaining element 1208 is operatively coupled to the frame 1201 using a third tab 1203 and a fourth tab 1202 of the frame 1201 wherein the third tab 1203 extends from the support arm 1207 of the frame 1201 extending into the opening 1211 of the frame 1201. In this embodiment, the support arm 1207 permits the first relative position maintaining element 1206 and the second relative position maintaining element 1208 to be used along a first side 1212 of the frame 1201 such that a film-based lightguide (not shown) wrapped around the frame 1201 can utilize two light input couplers (not shown) along the first side 1212 of the frame 1201.

Figure 13:
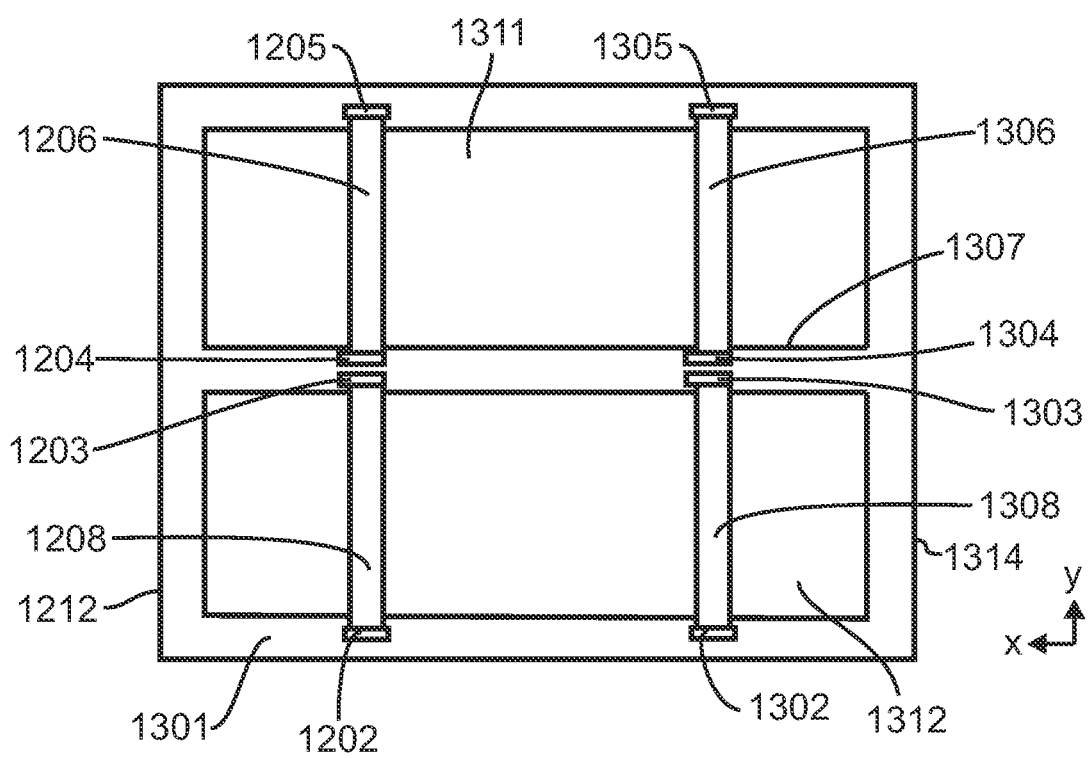
FIG. 13 is a bottom view of one embodiment of a frame, a first relative position maintaining element, a second relative position maintaining element, a third relative position maintaining element, and a fourth relative position maintaining element suitable for use in an embodiment of a light emitting device.

FIG. 13 is a bottom view of one embodiment of a frame 1301, a first relative position maintaining element 1206, a second relative position maintaining element 1208, a third relative position maintaining element 1306, and a fourth relative position maintaining element 1308 suitable for use in an embodiment of a light emitting device. In this embodiment, a support arm 1307 extends across the length (x direction) of the frame 1301 to create a first opening 1311 and a second opening 1312 within the interior of the frame 1301. The first relative position maintaining element 1206 is operatively coupled to the frame 1301 using a first tab 1204 and a second tab 1205 of the frame 1301 wherein the first tab 1204 extends from the support arm 1307 of the frame 1301. The second relative position maintaining element 1208 is operatively coupled to the frame 1301 using a third tab 1203 and fourth tab 1202 of the frame 1301 wherein the third tab 1203 extends from the support arm 1307 of the frame 1301. The third relative position maintaining element 1306 is operatively coupled to the frame 1301 using a fifth tab 1304 and a sixth tab 1305 of the frame 1301 wherein the fifth tab 1304 extends from the support arm 1307 of the frame 1301. The fourth relative position maintaining element 1308 is operatively coupled to the frame 1301 using a seventh tab 1303 and an eighth tab 1302 of the frame 1301 wherein the seventh tab 1303 extends from the support arm 1307 of the frame 1301. In this embodiment, the support arm 1307 permits the first relative position maintaining element 1206 and the second relative position maintaining element 1208 to be used along a first side 1212 of the frame 1301 and the third relative position maintaining element 1306 and the fourth relative position maintaining element 1308 to be used along a second side 1314 of the frame 1301 such that a film-based lightguide (not shown) wrapped around the frame 1301 on the first side 1212 and second side 1314 can utilize two light input couplers (not shown) along the first side 1212 of the frame 1301 and two light input couplers (not shown) along the second side 1314 of the frame 1301.

Figure 14:
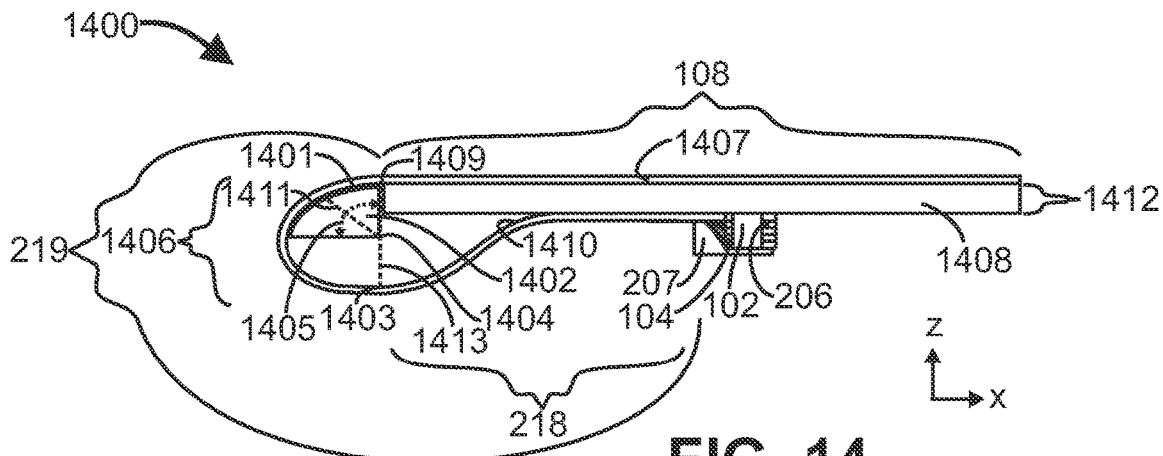
FIG. 14 is a side view of one embodiment of a reflective display with a film lightguide and a guide with a guide surface adjacent a surface of the film lightguide with a subtended angle of 90 degrees.

FIG. 14 is a side view of one embodiment of a reflective display 1400 including a film lightguide 1407 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1407 includes a first bend 1406 in the light mixing region 219 such that a portion 218 of the light mixing region 219 is positioned behind the light emitting region 108 of the film lightguide 1407 and reflective spatial light modulator 1408. A guide 1402 is positioned within the first bend 1406 such that a first curved surface 1401 of the guide 1402 is adjacent the inner surface 1410 of the film lightguide 1407. In this embodiment, the first curved surface 1401 of the guide 1402 adjacent the inner surface 1410 of the film lightguide 1407 at the first bend 1406 in a plane (x-z plane as shown) comprising the first bend 1406 of the film lightguide 1407 has a subtended angle 1405 from the midpoint 1404 of the line 1413 (shown dashed) between a point 1409 on the inner surface 1410 of the film lightguide 1407 at the start of the first bend 1406 and the point 1403 on the inner surface 1410 of the film lightguide 1407 at the end of the first bend 1406. In this embodiment, the subtended angle 1405 is 90 degrees and the radius of curvature 1411 of the first curved surface 1401 of the guide 1402 adjacent the inner surface 1410 of the film lightguide 1407 in the plane (x-z plane) comprising the first bend 1406 is greater than 1.5 times the thickness 1412 of the reflective spatial light modulator 1408.

Figure 15:
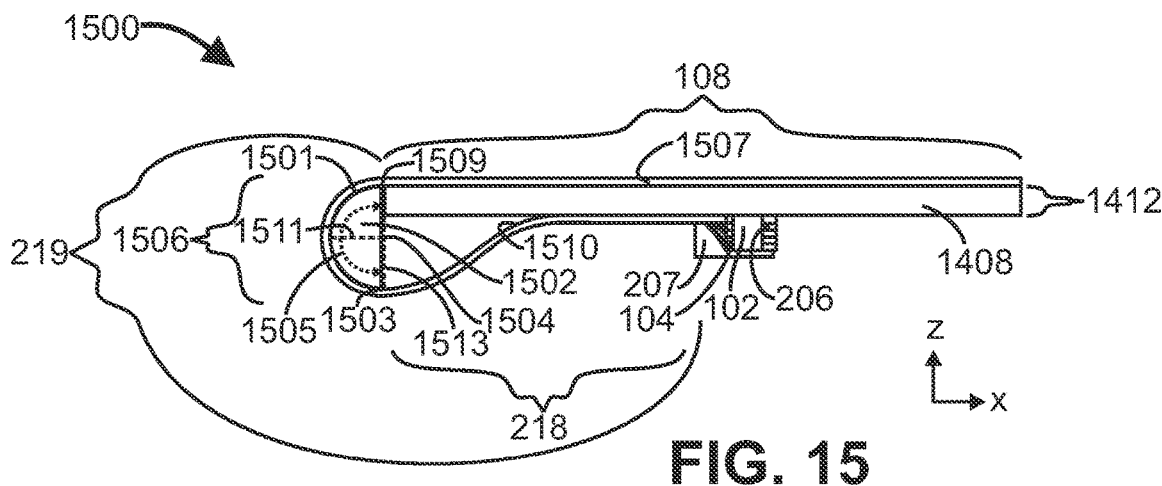
FIG. 15 is a side view of one embodiment of a reflective display with a film lightguide and a guide with a guide surface adjacent a surface of the film lightguide with a subtended angle of 180 degrees.

FIG. 15 is a side view of one embodiment of a reflective display 1500 including a film lightguide 1507 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1507 includes a first bend 1506 in the light mixing region 219 such that a portion 218 of the light mixing region 219 is positioned behind the light emitting region 108 of the film lightguide 1507 and reflective spatial light modulator 1408. A guide 1502 is positioned within the first bend 1506 such that a first curved surface 1501 of the guide 1502 is adjacent the inner surface 1510 of the film lightguide 1507. In this embodiment, the first curved surface 1501 of the guide 1502 adjacent the inner surface 1510 of the film lightguide 1507 at the first bend 1506 in a plane (x-z plane as shown) comprising the first bend 1506 of the film lightguide 1507 has a subtended angle 1505 from the midpoint 1504 of the line 1513 (shown dashed) between a point 1509 on the inner surface 1510 of the film lightguide 1507 at the start of the first bend 1506 and the point 1503 on the inner surface 1510 of the film lightguide 1507 at the end of the first bend 1506. In this embodiment, the subtended angle 1505 is 180 degrees and the radius of curvature 1511 of the first curved surface 1501 of the guide 1502 adjacent the inner surface 1510 of the film lightguide 1507 in the plane (x-z plane) comprising the first bend 1506 is greater than the thickness 1412 of the reflective spatial light modulator 1408.

Figure 16:
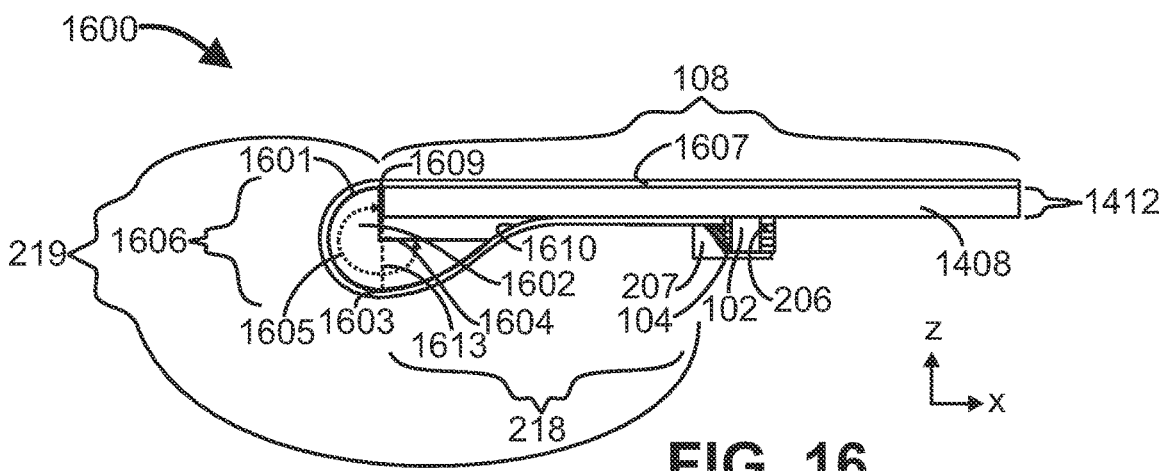
FIG. 16 is a side view of one embodiment of a reflective display with a film lightguide and a guide with a guide surface adjacent a surface of the film lightguide with a subtended angle of 270 degrees.

FIG. 16 is a side view of one embodiment of a reflective display 1600 including a film lightguide 1607 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1607 includes a first bend 1606 in the light mixing region 219 such that a portion 218 of the light mixing region 219 is positioned behind the light emitting region 108 of the film lightguide 1607 and reflective spatial light modulator 1408. A guide 1602 is positioned within the first bend 1606 such that a first curved surface 1601 of the guide 1602 is adjacent the inner surface 1610 of the film lightguide 1607. In this embodiment, the first curved surface 1601 of the guide 1602 adjacent the inner surface 1610 of the film lightguide 1607 at the first bend 1606 in a plane (x-z plane as shown) comprising the first bend 1606 of the film lightguide 1607 has a subtended angle 1605 from the midpoint 1604 of the line 1613 (shown dashed) between a point 1609 on the inner surface 1610 of the film lightguide 1607 at the start of the first bend 1606 and the point 1603 on the inner surface 1610 of the film lightguide 1607 at the end of the first bend 1606. In this embodiment, the subtended angle 1605 is 270 degrees.

Figure 17:
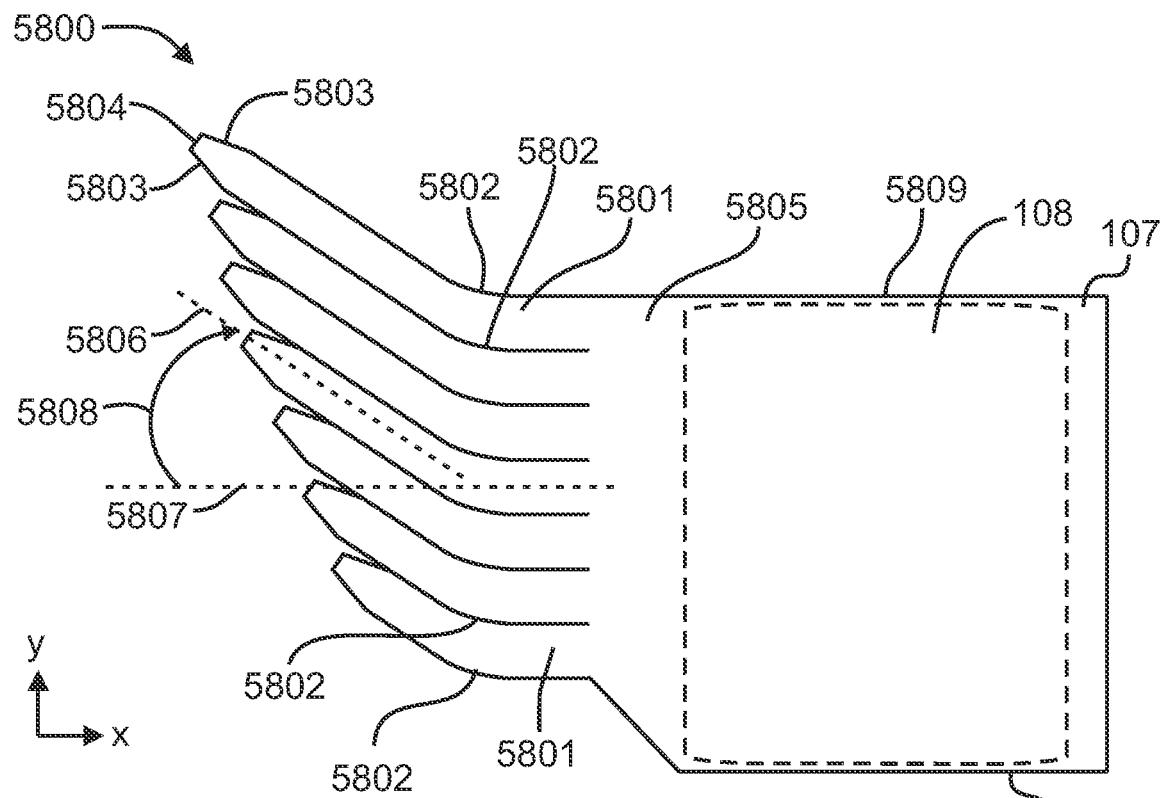
FIG. 17 is top view of one embodiment of a film-based lightguide including an array of oriented coupling lightguides with tapered light collimating lateral edges adjacent the input surface and light turning edges between the light input surface and the light mixing region of the film-based lightguide.

FIG. 17 is top view of one embodiment of a film-based lightguide 5800 including an array of oriented coupling lightguides 5801 oriented parallel to a first direction 5806 at a coupling lightguide orientation angle 5808 from the second direction 5807 perpendicular to the direction (y-direction) of the array of oriented coupling lightguides 5801 at the light mixing region 5805. The array of oriented coupling lightguides 5801 includes tapered light collimating lateral edges 5803 adjacent the light input surface 5804 and light turning lateral edges 5802 between the light input surface 5804 and the light mixing region 5805 of the film-based lightguide 107. In this embodiment, light from a light source (not shown) disposed to emit light into the light input surface 5804 when the array of oriented coupling lightguides 5801 are folded propagates with its optical axis parallel to the first direction 5806 of the array of oriented coupling lightguides 5801 and the optical axis is turned by the light turning lateral edges 5802 such that the optical axis is substantially parallel to the second direction 5807 perpendicular to the direction (y-direction) of the array of oriented coupling lightguides 5801 at the light mixing region 5805. In this embodiment, when the oriented coupling lightguides 5801 are folded, the light source can be positioned between the planes (parallel to the z direction) including the lateral edges (5809, 5810) of the lightguide 107 such that a device or display including the light emitting device with the film-based lightguide 5800 does not require a large frame or a border region extending significantly past the lateral edges (5809, 5810) of the film-based lightguide in the y direction (as folded once or when the array of oriented coupling lightguides 5801 are folded and the light source, the array of oriented coupling lightguides 5801, and the light mixing region 5805 are folded behind the light emitting region 108 of the film based lightguide 107). The array of oriented coupling lightguides 5801 permit the light source to be positioned between the planes including the lateral edges (5809, 5810) of the film-based lightguide and the light turning lateral edges 5802 redirect the optical axis of the light toward the second direction 5807 perpendicular to the direction (y-direction) of the array of oriented coupling lightguides 5801 at the light mixing region 5805 such that the optical axis of the light is oriented substantially parallel to the second direction 5807 when the light is extracted by light extraction features (not shown) with light redirecting surface oriented substantially parallel to the array direction (y direction) of the array of oriented coupling lightguides 5801.

Figure 18:
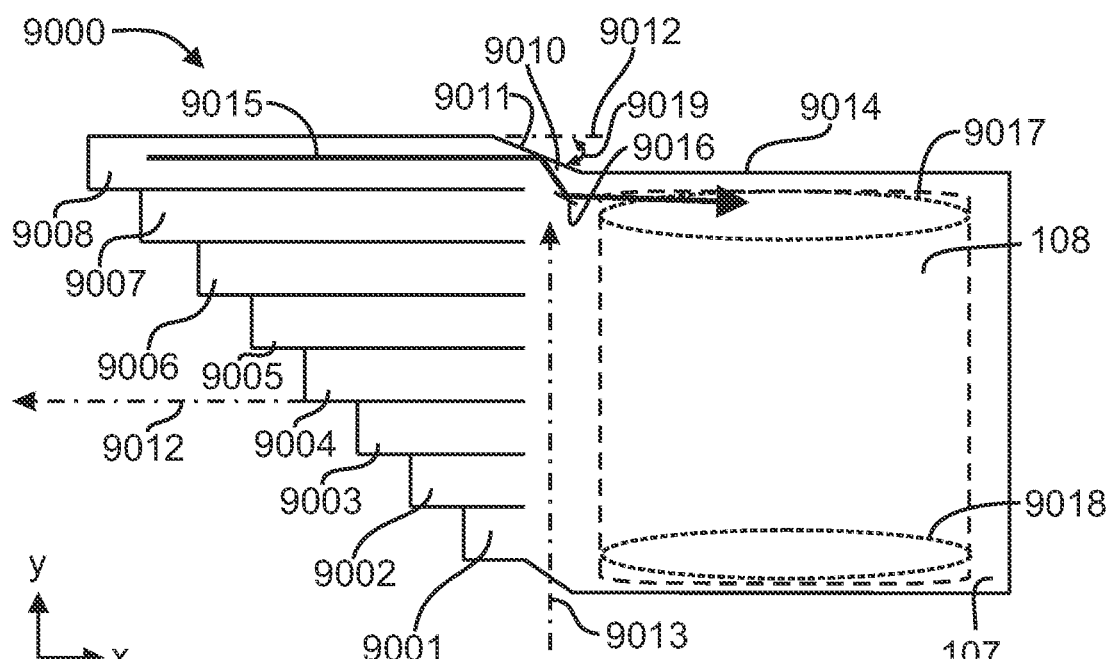
FIG. 18 is a top view of one embodiment of a film-based lightguide including a light mixing region extending past the light emitting region.

FIG. 18 is a top view of one embodiment of a film-based lightguide 9000 including coupling lightguides (9001, 9002, 9003, 9004, 9005, 9006, 9007, and 9008) cut from a lightguide 107 and separated from the light emitting region 108 by a light mixing region 9010. The light mixing region 9010 extends past the light emitting region 108 far lateral edge 9014 in a first direction 9013 orthogonal to the extended direction 9012 of the coupling lightguides (9001, 9002, 9003, 9004, 9005, 9006, 9007, and 9008). Light 9015 propagating through the eighth coupling lightguide 9008 (shown as light 9015 propagating before the coupling lightguides (9001, 9002, 9003, 9004, 9005, 9006, 9007, and 9008) are folded in the +z and −y direction for clarity) reflects from an angled light mixing region lateral edge 9011 toward the light emitting region 108. The angled light mixing region lateral edge 9011 is oriented at a first extended orientation angle 9019 to the extended direction 9012 to direct light 9015 from the light mixing region 9010 toward the light emitting region 108 of the lightguide 107. In this embodiment, light 9015 totally internally reflects from an internal light directing edge 9016 formed by a cut in the lightguide 107, to direct it closer to the far area 9017 (the area of the light emitting region 108 further from the light input surface (not shown) of the folded and stacked coupling lightguides (9001, 9002, 9003, 9004, 9005, 9006, 9007, and 9008) when they are folded in the +z and −y direction) of the light emitting region 108 closer to the far lateral edge 9014. In this embodiment, the eighth coupling lightguide 9008 can direct more light to the far area 9017 of the light emitting region 108 to increase the light flux arriving to the far area to compensate for the reduced light flux relative to the near area 9018 of the light emitting region 108 due to more flux being absorbed in the longer coupling lightguides (the eighth coupling lightguide 9008 and the seventh coupling lightguide 9007, for example) than the shorter coupling lightguides (the first coupling lightguide 9001 and the second coupling lightguide 9002, for example).

FIG. 19 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, nm, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

FIG. 20 is a top view of portions of one embodiment of a light emitting device 6000 including an array of coupling lightguides 104 (prior to being folded to receive light from a light source (not shown)) extended from the lightguide 107 in an extended direction 9312 perpendicular to the array direction 9313 of the linear array of coupling lightguides 104. The light emitting device 6000 further includes a lightguide region 106 comprising a light mixing region 105, a lightguide 107, and a light emitting region 108. The array of coupling lightguides 104 comprises a total width, $w_1$, where they meet the lightguide region 106 in the array direction 9313 of the array of coupling lightguides 104. In this embodiment, the lightguide 107, light mixing region 105, lightguide region 106, and light emitting region 108 comprise two excess width regions 5601 that extend beyond the coupling lightguides 104 in the array direction 9313. Due to the contribution of the excess width regions 5601, the lightguide 107, light mixing region 105, lightguide region 106, and light emitting region 108 have a total width, $w_2$, in the array direction 9313 of the array of coupling lightguides 104 larger than the total width, $w_1$, of the array of coupling lightguides 104 in the array direction 9313 of the coupling lightguides 104. The lightguide 107 is positioned above a reflective spatial light modulator 3408 and below a light turning film 3403 comprising an array of light turning features 3401 in the form of grooves (only a few grooves are shown for clarity). The light emitting device 6000 may include other layers, adhesive layers, cladding layers, etc. as described elsewhere herein that are not shown in FIG. 20 for clarity. Light 5602, 5603 represent light from similar angles within the coupling lightguides 104 with a lower intensity (such as 10% of the peak intensity) due to the falloff in intensity at larger angles of the light propagating to the light emitting region 108 at approximately the same angle, being extracted from the core layer of the lightguide 107 and reflecting off of the light turning features 3401 of the light turning film 3403 (as shown in FIG. 19). However, light 5603 propagates directly to the light emitting region 108 without reflecting off a lateral edge 2201 of the lightguide 107 and light 5602 reflects of a lateral edge 2201 of the lightguide 107 and propagates to the light emitting region 108. As can be seen from FIG. 20, the potential angular shadow is represented as an angular shadow region 5605 where the luminance be lower than the neighboring regions of the light emitting region 108 due to an absence of light (represented by the arrow 5604) originating from the excess width region 5601 propagating at an angle similar to light 5602 and 5603. However, the light emitting device 6000 of FIG. 20 comprises two methods of angular shadow visibility reduction. The first method of reducing the visibility of the angular shadow region 5605 includes adding a first interior light directing edge 6001 in the light mixing region 105 outside of the excess width region 5601 and a second interior light directing edge 6002 in the light mixing region 105 and in the excess width region 5601. Light 6005 exits the coupling lightguide 104 and reflects from the first interior light directing edge 6001 in the light mixing region outside of the excess width region 5601 toward the second interior light directing edge 6002 in the excess width region in the light mixing region. Light 6005 then reflects from the second interior light directing edge 6002 toward the light emitting region where it increases the luminous intensity (and reduces the visibility) of the angular shadow region 5605. In this first method, the light 6005 directly reflects from within the excess width region 5601 and propagates toward the light emitting region and therefore increases the luminance intensity in the angular shadow region. The second method of reducing the visibility of the angular shadow region 5605 includes adding a third interior light directing edge 6003 in the light emitting region 108 outside of the excess width region 5601 and a fourth interior light directing edge 6004 in the light mixing region 105 and outside the excess width region 5601. Light 6006 exits the coupling lightguide 104, propagates through the light mixing region 105, and then reflects from the third interior light directing edge 6003 in the light emitting region 108 toward the fourth interior light directing edge 6004. Light 6006 then reflects from the fourth interior light directing edge 6004 toward the light emitting region where it increases the luminous intensity (and reduces the visibility) of the angular shadow region 5605. Light 6006 indirectly appears to originate from the excess width region 5601 and corresponds to a location and direction (represented by the direction of the arrow 5604) of light that would be the same for light had it originated from the excess width region 5601 and propagated toward the light emitting region 108.

Figure 21:
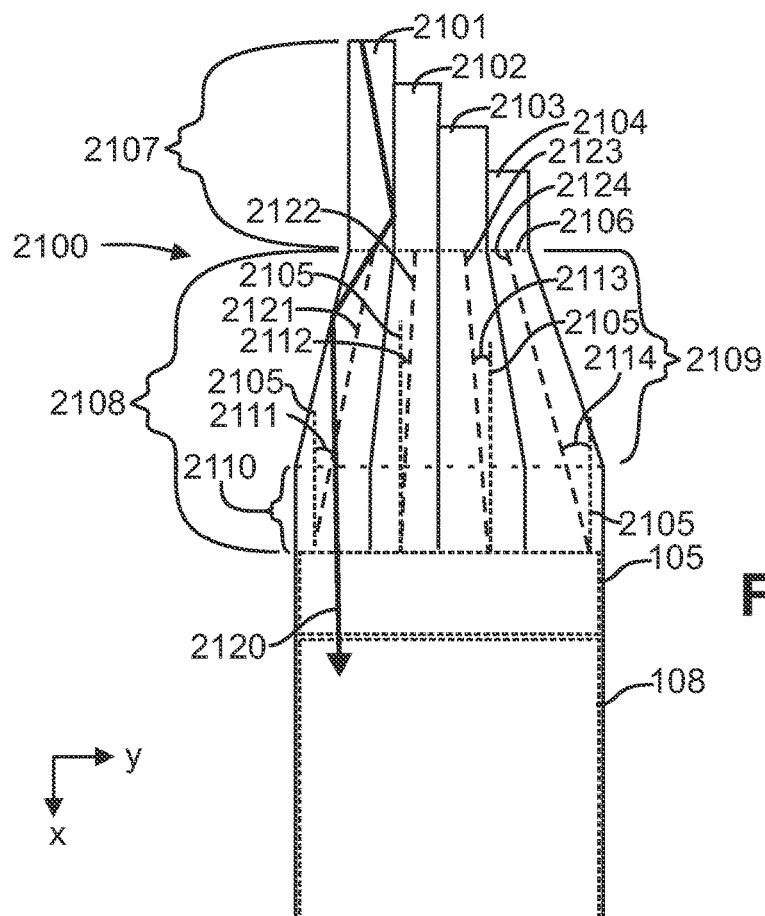
FIG. 21 is a top view of one embodiment of a film-based lightguide comprising a plurality of coupling lightguides with an extended coupling lightguide region.
Figure 22:
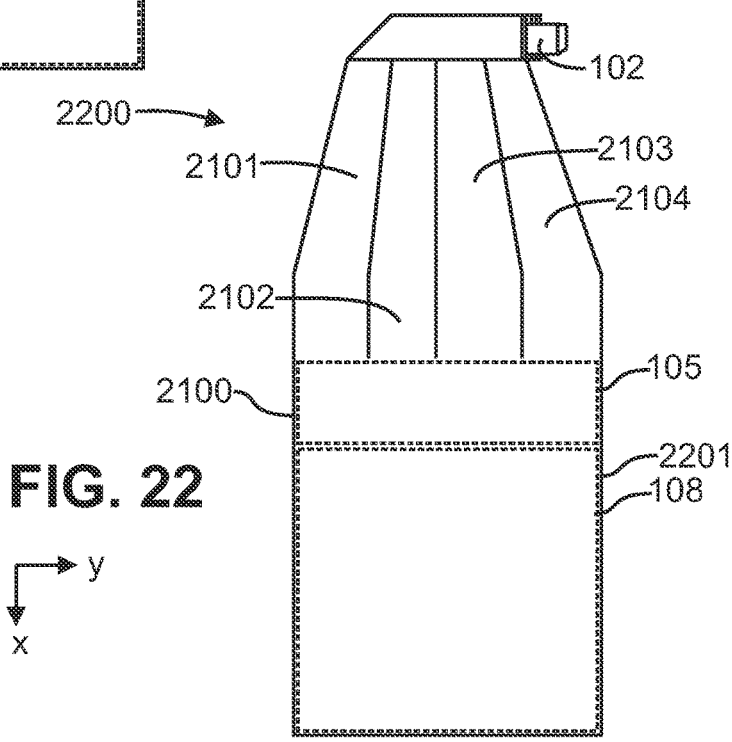
FIG. 22 is a top view of a light emitting device comprising the film-based lightguide of FIG. 21.

FIG. 21 is a top view of a film-based lightguide 2100 in un-folded form comprising a light emitting region 108 and a first coupling lightguide 2101, a second coupling lightguide 2102, a third coupling lightguide 2103, and a fourth coupling lightguide 2104 extending from a lighting mixing region 105 positioned between the coupling lightguides (2101, 2102, 2103, 2104) and the light emitting region 108. The film-based lightguide comprises a first coupling lightguide 2101 with a first coupling lightguide orientation angle 2111 (such as +12 degrees, for example) in the tapered region 2109 of the extended coupling lightguide region 2108 defined between the first coupling lightguide axis 2121 of the first coupling lightguide 2101 and a direction 2105 parallel to the major component of the direction of the first coupling lightguide 2101 to the light mixing region 105 (direction 2105 is in the x direction in FIG. 21). The film-based lightguide 2100 further comprises a second coupling lightguide 2102 with a second coupling lightguide orientation angle 2112 (such as +5 degree, for example) in the tapered region 2109 of the extended coupling lightguide region 2108 defined between the second coupling lightguide axis 2122 of the second coupling lightguide 2102 and the direction 2105 parallel of the major component of the direction of the second coupling lightguide 2102 to the light mixing region 105. The film-based lightguide 2100 further comprises a third coupling lightguide 2103 with a third coupling lightguide orientation angle 2113 (such as −5 degrees for example) in the tapered region 2109 of the extended coupling lightguide region 2108 defined between the third coupling lightguide axis 2123 of the third coupling lightguide 2103 and the direction 2105 parallel of the major component of the direction of the third coupling lightguide 2103 to the light mixing region 105. The film-based lightguide 2100 further comprises a fourth coupling lightguide 2104 with a fourth coupling lightguide orientation angle 2114 (such as −12 degrees, for example) in the tapered region 2109 of the extended coupling lightguide region 2108 defined between the fourth coupling lightguide axis 2124 of the fourth coupling lightguide 2104 and the direction 2105 parallel of the major component of the direction of the fourth coupling lightguide 2104 to the light mixing region 105. Each of the coupling lightguides (2101, 2102, 2103, 2104) comprises linear, parallel lateral edges in a first region 2107 of the coupling lightguides (2101, 2102, 2103, 2104) on a side of a fold line 2106 closer to the ends of the coupling lightguides (2101, 2102, 2103, 2104) and an extended coupling lightguide region 2108 of the coupling lightguides (2101, 2102, 2103, 2104) on the opposite side of the fold line 2106 and on a side of the fold line closer to the light mixing region 105. The extended coupling lightguide region 2108 comprises a tapered region 2109 adjacent the fold line and a linear region 2110 between the tapered region 2109 and the light mixing region 105. In this embodiment, the film-based lightguide 2100 is illustrated in un-folded form without any folds in the coupling lightguides (2101, 2102, 2103, 2104) or the light mixing region 105 to illustrate the geometry, shape, and features of the film-based lightguide 2100 and its regions. The coupling lightguides (2101, 2102, 2103, 2104) may be folded along the fold line 2106 and stacked such that their ends form a light input surface disposed to receive light from a light source (shown in FIG. 22). Light 2120 is a portion of the light from the light source 102 (shown in FIG. 21) and its propagation through the film-based lightguide 2100 is shown in the unfolded form of the film-based lightguide 2100 in FIG. 21 to clearly illustrate the path (the actual path would be through the folded coupling lightguides (shown in FIG. 22) and optionally a folded light mixing region) in a light emitting device embodiment incorporating the film-based lightguide 2100 of FIG. 21 after folding the coupling lightguides (2101, 2102, 2103, 2104) as shown in FIG. 22. The light 2120 propagating through the first coupling lightguide 2101 reflects off a lateral edge of the first coupling lightguide 2101 in the first region 2107 and then reflects off of an angled lateral edge of the coupling lightguide 2101 in the tapered region 2109 of the extended coupling lightguide region 2108. This reflection provides some collimation (reduction of the angle) of the light 2120 along the optical axis of the light propagating in the light mixing region (+x direction toward the light emitting region 108 for the embodiment of FIG. 21) and the light 2120 then passes through the linear region 2110 of the extended coupling lightguide region 2108 before passing into the light mixing region 105 and into the light emitting region 108 where it is extracted from the film-based lightguide 2100.

FIG. 22 is a top view of a light emitting device 2200 comprising the film-based lightguide 2100 of FIG. 21 wherein the coupling lightguides (2101, 2102, 2103, 2104) are folded along the fold line 2106 (shown in FIG. 21) and stacked such that their ends are positioned to receive light from a light source 102. As can be seen in FIG. 22, in addition to providing some collimation of light from the light source and redistribution of light from the light source, the tapering of the coupling lightguides (2101, 2102, 2103, 2104) enables the light source to not be positioned beyond the lateral edge 2201 of the light emitting region 108 in the width direction (y direction) for the light emitting device 2200.

Figure 23:
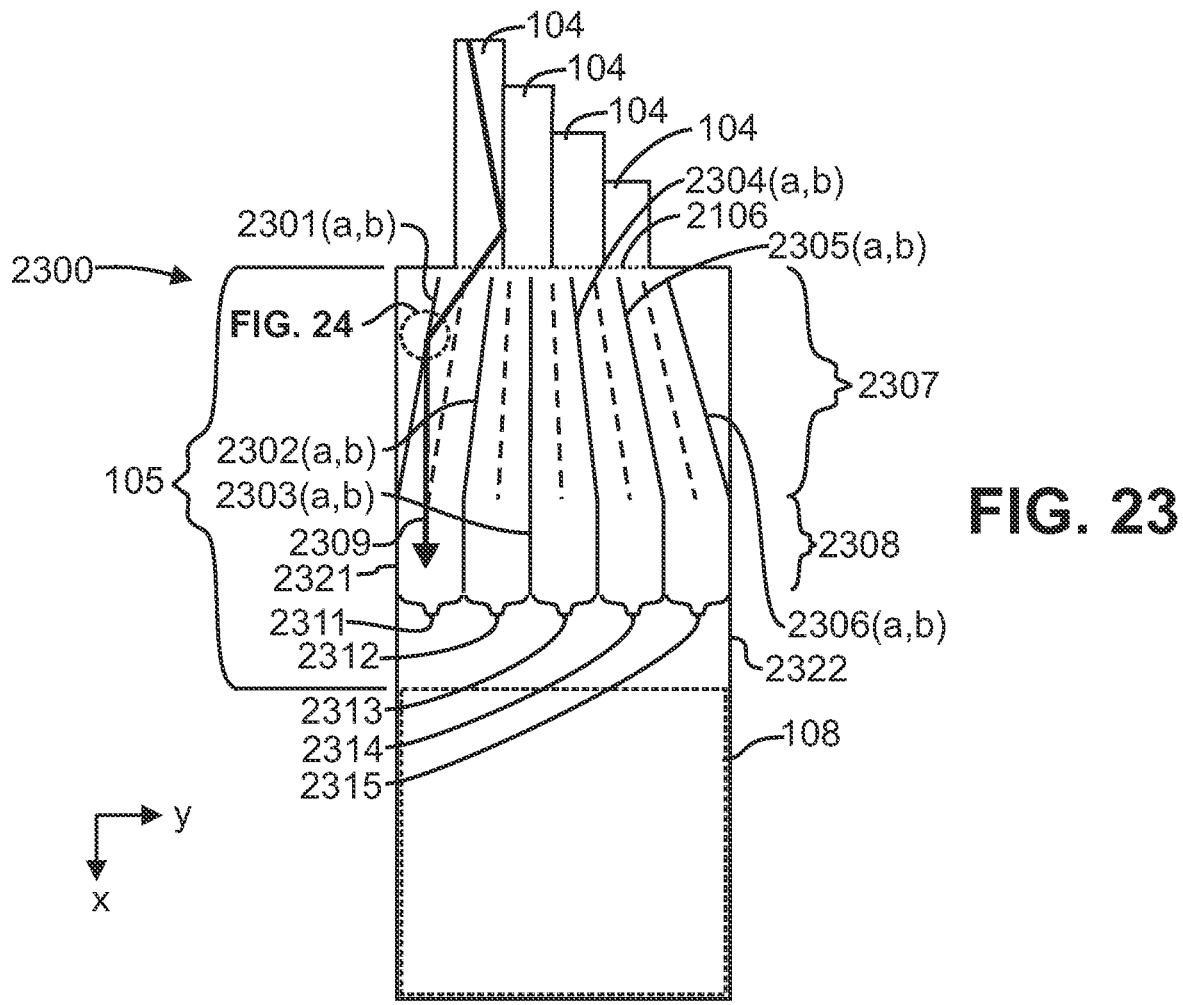
FIG. 23 is a top view of one embodiment of a film-based lightguide comprising a plurality of channels defined by interior light directing edges in the light mixing region.
Figure 24:
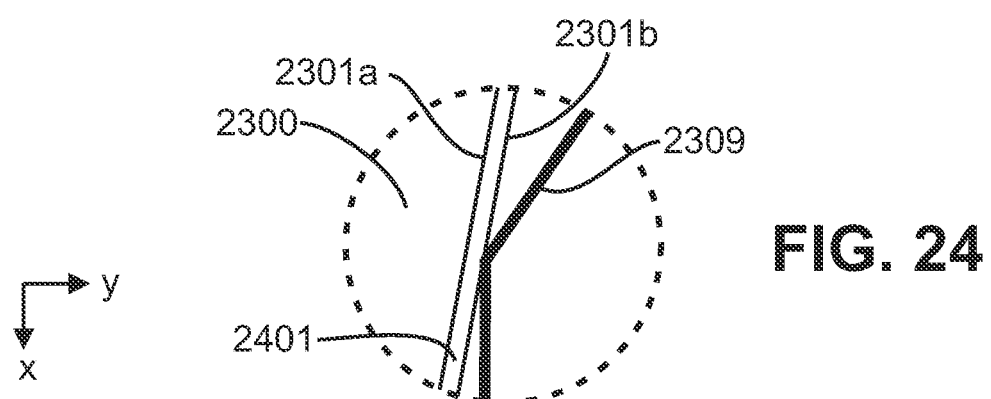
FIG. 24 is an enlarged portion of FIG. 23 showing two interior light directing edges.

FIG. 23 is a top view of a film-based lightguide 2300 in un-folded form comprising a light emitting region 108 and coupling lightguides 104 extended from a lighting mixing region 105 positioned between the coupling lightguides 104 and the light emitting region 108. The film-based lightguide comprises first interior light directing edges 2301a and 2301b (such as two interior edges of a film formed from a cut through the film) and second interior light directing edges 2302a and 2302b at a non-zero angle to the first interior light directing edges 2301a and 2301b in a tapered channel region 2307 of the light mixing region 105 and parallel to each other in a linear channel region 2308 of the light mixing region 105. The first interior light directing edges 2301a and 2301a are formed from cuts in the film-based lightguide 2300 and are shown magnified in FIG. 24 with an air gap 2401 between them. The first interior light directing edge 2301b and a second interior light directing edge 2302a are reflecting surfaces that define a first channel 2311 therebetween wherein at least a portion of the light entering the first channel 2311 from one or more coupling lightguides 104 totally internally reflects from at least one of the first interior light directing edge 2301b and a second interior light directing edge 2302a as it propagates toward the light emitting region 108 with a directional component in the +x direction. The film-based lightguide 2300 further comprises third interior light directing edges (2303a and 2303*b*), fourth interior light directing edges (2304*a* and 2304*b*), fifth interior light directing edges (2305*a* and 2305*b*), and sixth interior light directing edges (2306*a* and 2306*b*) in the light mixing region 105. In this embodiment, pairs of the interior light directing edges (2301*b* and 2302*a*; 2302*b* and 2303*a*; 2303*b* and 2304*a*; 2304*b* and 2305*a*; and 2305*b* and 2306*a*) are reflective surfaces that define channels (2311, 2312, 2313, 2314, and 2315, respectively) which are tapered channels in this embodiment, in the tapered channel regions 2307 within the light mixing region 105 (and in the linear channel region 2308 for channels 2312, 2313, and 2314) that direct light flux received from the light source across a first width dimension (such as w1) to a larger width dimension (such as w2) closer to the light emitting region 108 along the channel in a width direction, (y direction), which in this embodiment is also the array direction of the array of coupling lightguides 104 which is perpendicular to the to the thickness direction (z direction) of the film and perpendicular to the direction of the optical axis of light propagating in the light mixing region (+x direction). In this embodiment, the first lateral edge 2321 of the film-based lightguide 2300 also defines a portion of the first channel 2311 with the second interior light directing edge 2302*a* in the linear channel region 2308. Similarly, the second lateral edge 2322 of the film-based lightguide 2300 also defines a portion of the fifth channel 2315 with the fifth light directing edge 2305*b* in the linear channel region 2308. The channels (2311, 2312, 2313, 2314, and 2315) are oriented at channel orientation angles defined as the average angle between the interior light directing edges (2301*b* and 2302*a*; 2302*b* and 2303*a*; 2303*b* and 2304*a*; 2304*b* and 2305*a*; and 2305*b* and 2306*a*, respectively) in the tapered channel region 2307 from the optical axis of the light propagating through the light mixing region 105 (which for this embodiment is parallel to the +x axis in the embodiment shown in FIG. 23). In the embodiment shown in FIG. 23, the channel orientation angles for the channels (2311, 2312, 2313, 2314, and 2315) are the angles of the dashed lines (−9 degrees, −3 degrees, 0 degrees, +3 degrees, and +9 degrees, respectively) shown within the respective channel from the +x direction. In this embodiment, the film-based lightguide 2300 is illustrated in unfolded form without any folds in the coupling lightguides 104 or the light mixing region 105 to illustrate the geometry, shape, and features of the film-based lightguide 2300 and its regions. The coupling lightguides 104 may be folded along the fold line 2106 and stacked such that their ends form a light input surface disposed to receive light from a light source (not shown). Light 2309 is a portion of the light from the light source and its propagation through the film-based lightguide 2300 is shown in the unfolded form of the film-based lightguide 2300 to clearly illustrate the path (the actual path would be through the folded coupling lightguides 104 after they were folded and optionally the folded light mixing region) in a light emitting device embodiment incorporating the film-based lightguide 2300 of FIG. 23. The light 2309 propagating through a coupling lightguide 104 reflects off of a lateral edge of the coupling lightguide 104 and then propagates through the first channel 2311 where it reflects off the first interior light directing edge 2301*b* in the tapered channel region 2307. This reflection provides some collimation (reduction of the angle of propagation of light from the optical axis of light propagating in the light mixing region (+x direction in the embodiment shown in FIG. 23)) of the light 2309 along the optical axis of light propagating in the light mixing region (+x direction toward the light emitting region 108) and the light 2309 then passes through the linear channel region 2308 of the light mixing region 105 before passing into the light emitting region 108 where it is extracted from the film-based lightguide 2100. In the embodiment shown in FIG. 23, the interior light directing edges (2301*b* and 2302*a*; 2302*b* and 2303*a*; 2303*b* and 2304*a*; 2304*b* and 2305*a*; and 2305*b* and 2306*a*) of the channels 2311, 2312, 2313, 2314, and 2315, respectively, provide some collimation of light from a light source (reduction of the angular width (FWHM intensity) from the +x axis in the x-y plane in this embodiment) for a light source positioned to input light into the coupling lightguides 104, redistribution of light from the light source, and the tapering enables the light source to not be positioned beyond the first lateral edge 2321 or second lateral edge 2322 of the film-based lightguide 2300 in the width direction (y direction) for a light emitting device comprising the film-based lightguide 2300.

Figure 25:
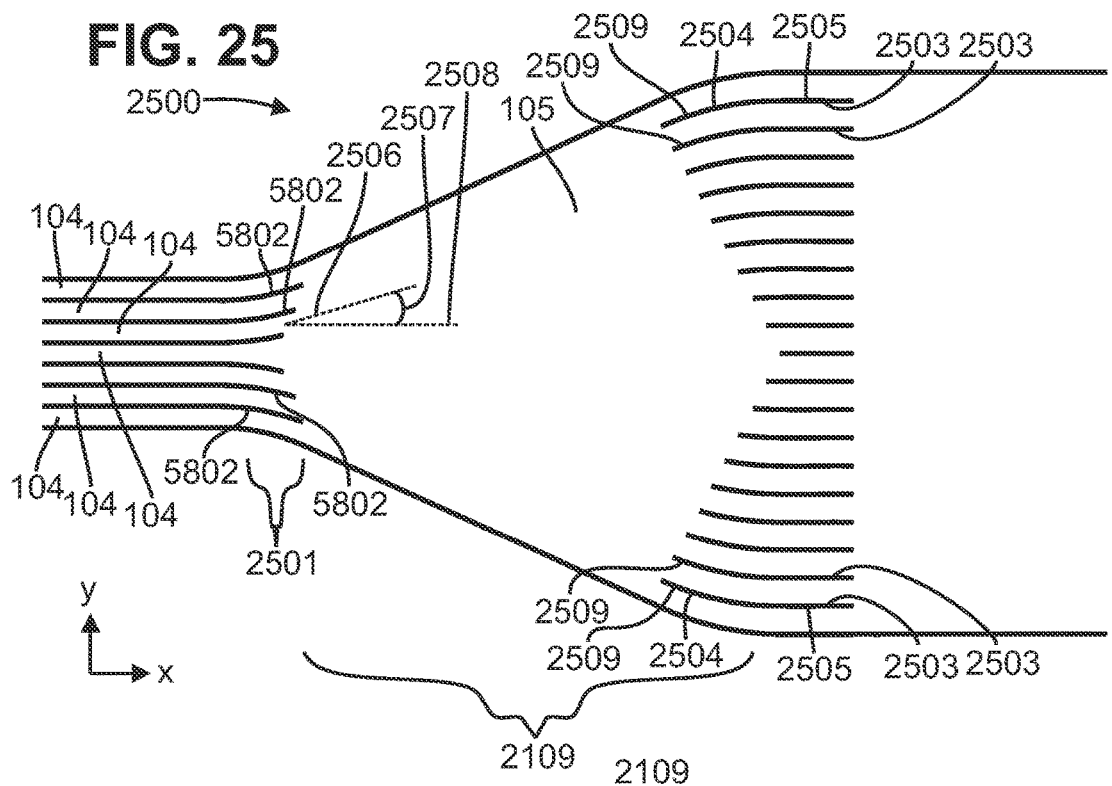
FIG. 25 is a top view of film-based lightguide comprising a light mixing region with a tapered region increasing in width and angle redirectors and coupling lightguides with spatially distributing end portions.

FIG. 25 is a top view of a film-based lightguide 2500 comprising a light mixing region 105 with a tapered region 2109 increasing in width in a direction (y direction or direction parallel to the array direction of the array of coupling lightguides 104) from the coupling lightguides 104 toward (along the +x direction as shown) the light emitting region (not shown). A plurality of coupling lightguides 104 comprise spatially distributing end portions 2501 with curved light turning lateral edges 5802. The axis 2506 of the end portions 2501 of one or more coupling lightguides 104 is oriented at an orientation angle 2507 from the direction 2508 (parallel to x direction) perpendicular to the array direction (y direction) of the array of coupling lightguides 104. The light mixing region further has interior light direction edges 2503 forming angle redirectors 2509 with curved regions 2504 and a linear region 2505 of the interior light direction edges 2503 with lateral edges oriented in a direction (x direction) perpendicular to the array direction (y direction) of the array of coupling lightguides 104. In the embodiment shown in FIG. 25, light from coupling lightguides 104 is distributed toward the wider regions of the tapered region 2109 of the light mixing region 105 due to the spatially distributing end portions 2501 and the angle redirectors 2509 receive this light and redirect the light toward angles nearer the direction parallel to the direction (x direction) orthogonal to the array direction (y direction) of the coupling lightguides or nearer an average direction from the light mixing region to the light emitting region of the lightguide. In one embodiment, one or more (or all) of the coupling lightguides do not have spatially distributing end portions.

Figure 26:
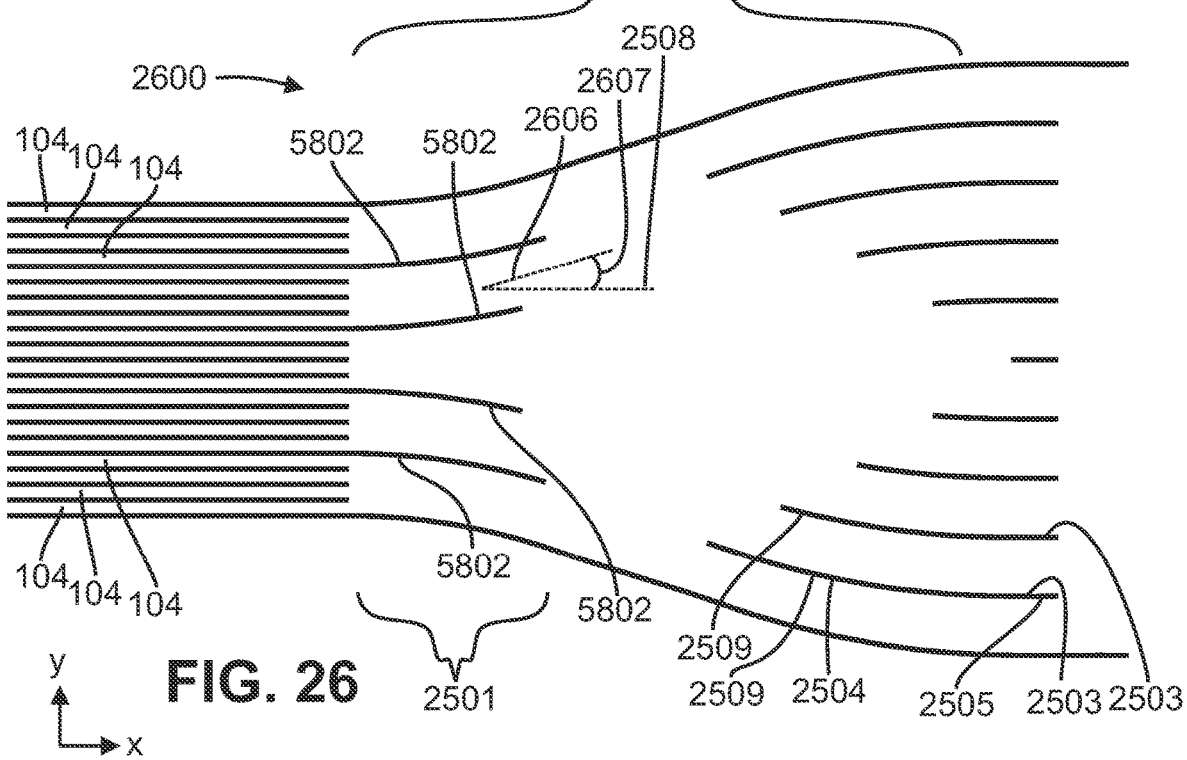
FIG. 26 is a top view of film-based lightguide comprising a light mixing region with a tapered region increasing in width and angle redirectors and a portion of the coupling lightguides comprising spatially distributing end portions.

FIG. 26 is a top view of a film-based lightguide 2600 comprising a light mixing region 105 with a tapered region 2109 increasing in width in a direction (y direction or direction parallel to the array direction of the array of coupling lightguides 104) from the coupling lightguides 104 toward (along the +x direction as shown) the light emitting region (not shown). A portion of the plurality of coupling lightguides 104 comprise spatially distributing end portions 2501 with curved light turning lateral edges 5802. The axis 2606 of the end portions 2501 of the grouping of coupling lightguides 104 between the curved light turning lateral edges 5802 is oriented at an orientation angle 2607 from the direction 2508 (parallel to x direction) perpendicular to the array direction (y direction) of the array of coupling lightguides 104. The light mixing region further has interior light direction edges 2503 forming angle redirectors 2509 with curved regions 2504 and a linear region 2505 of the interior light direction edges 2503 with lateral edges oriented in a direction (x direction) perpendicular to the array direction (y direction) of the array of coupling lightguides 104. In the embodiment shown in FIG. 26, light from coupling lightguides 104 is distributed toward the wider regions of the tapered region 2109 of the light mixing region 105 and the angle redirectors 2509 receive this light and redirect the light toward angles nearer the direction parallel to the direction (x direction) orthogonal to the array direction (y direction) of the array of coupling lightguides, nearer an average direction from the light mixing region to the light emitting region of the lightguide, or nearer a direction from which the light mixing region extends from the light emitting region. In one embodiment, one or more (or all) of the coupling lightguides do not have spatially distributing end portions.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

EQUIVALENTS

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius.

What is claimed is:

1. A film-based lightguide comprising:
a lightguide formed from a film having lateral edges and opposing surfaces with a thickness not greater than about 0.5 millimeters therebetween in a thickness direction;
a light emitting region of the lightguide defined by a plurality of light extraction features;
a tapered light mixing region comprising a tapered region of the film increasing in width in a direction along the film toward the light emitting region, the tapered light mixing region configured to receive light from a light source and propagate the light to the light emitting region of the lightguide; and
a plurality of interior light directing edges positioned between the lateral edges of the film in the tapered light mixing region, the plurality of interior light directing edges comprising curved sections that redirect light within the tapered light mixing region of the lightguide.

2. The film-based lightguide of claim 1 wherein the plurality of interior light directing edges are formed by cuts in the film that create an air gap between internal edges of the film.

3. The film-based lightguide of claim 1 wherein the plurality of interior light directing edges define channels that redirect light in the tapered light mixing region, the film comprises a light mixing region comprising the tapered light mixing region and a linear channel region, the interior light directing edges extend into the linear channel region, and the interior light directing edges of the channels are substantially parallel to each other in the linear channel region.

4. The film-based lightguide of claim 1 wherein the plurality of interior light directing edges are curved in the curved sections, and the plurality of interior light directing edges comprise linear sections where the plurality of interior light directing edges are linear.

5. The film-based lightguide of claim 1 wherein the plurality of interior light directing edges define channels that redirect light in the tapered light mixing region, and the channels transfer angular ranges of light in the tapered light mixing region to spatially separated light in the light emitting region.

6. The film-based lightguide of claim 1 wherein the plurality of interior light directing edges are positioned within 25 millimeters from a boundary between the tapered light mixing region and the light emitting region of the lightguide.

7. The film-based lightguide of claim 1 wherein the interior light directing edges totally internally reflect light propagating through the tapered light mixing region such that the light propagates at a smaller angle to a direction orthogonal to a width direction and orthogonal to the thickness direction of the film.

8. The film-based lightguide of claim 1 wherein the plurality of interior light directing edges are angle redirectors, and the curved sections of the interior light directing edges comprise arc sections of circles when viewed from the thickness direction, and a difference between radii of curvature of neighboring radii of the arc sections is within 20% of an average distance between the arc sections.

9. The film-based lightguide of claim 1 wherein the plurality of interior light directing edges are angle redirectors and positioned in the tapered light mixing region with portions of the tapered light mixing region without angle redirectors on either side of the angle directors in a direction along the film from where light enters the film and the light emitting region.

10. A light emitting device comprising the film-based lightguide of claim 1 and one or more light sources wherein the plurality of interior light directing edges are angle redirectors and an average distance along the film between where light from the one or more light sources enters the film and a beginning of the angle redirectors is at least 10% of an average total length of the tapered light mixing region from where the light from the one or more light sources enters the film and the light emitting region of the lightguide.

11. The light emitting device of claim 10 wherein the average distance is at least 25% of the average total length of the tapered light mixing region.

12. The light emitting device of claim 10 wherein the plurality of interior light directing edges are positioned within 25 millimeters from a boundary between the tapered light mixing region and the light emitting region of the lightguide.

13. A film-based lightguide comprising:
a lightguide formed from a film having lateral edges and opposing surfaces with a thickness not greater than about 0.5 millimeters therebetween in a thickness direction, the lightguide having an array of coupling lightguides arrayed in an array direction in a form of strips of the film extending from and continuous with a lightguide region of the film;
a light emitting region of the lightguide defined by a plurality of light extraction features;
a tapered light mixing region of the lightguide positioned between the array of coupling lightguides and the light emitting region of the lightguide, the tapered light mixing region comprising a tapered region increasing in width in a direction along the film from the array of coupling lightguides and the light emitting region; and
a plurality of interior light directing edges positioned in the tapered light mixing region comprising curved sections that redirect light within the tapered light mixing region to angles nearer a direction orthogonal to the array direction of the array of coupling lightguides and the thickness direction.

14. The film-based lightguide of claim 13 wherein the plurality of interior light directing edges are angle redirectors and an average distance along the film between where the array of coupling lightguides meet the tapered light mixing region and a beginning of the angle redirectors is at least 10% of an average total length of the tapered light mixing region from where the array of coupling lightguides meet the tapered light mixing region and the light emitting region of the lightguide.

15. The film-based lightguide of claim 13 wherein the plurality of interior light directing edges are angle redirectors and an average distance along the film between where the array of coupling lightguides meet the tapered light mixing region and a beginning of the angle redirectors is at least 20% of an average total length of the tapered light mixing region from where the array of coupling lightguides meet the tapered light mixing region and the light emitting region of the lightguide.

16. The film-based lightguide of claim 13 wherein the array of coupling lightguides comprise orientation angles at end portions of the array of coupling lightguides where they meet the tapered light mixing region, and the end portions of the array of coupling lightguides redistribute light flux output from the array of coupling lightguides such it is spatially distributed into a larger width region of the tapered light mixing region.

17. The film-based lightguide of claim 13 wherein a light flux output from the array of coupling lightguides is directed to the interior light directing edges.

18. A light emitting device comprising the film-based lightguide of claim 13 and one or more light sources wherein the plurality of interior light directing edges are angle redirectors and an average distance along the film between where light from one or more light sources enters the film and a beginning of the angle redirectors is at least 10% of an average total length of the tapered light mixing region from where the light from the one or more light sources enters the film and the light emitting region of the lightguide.

19. The light emitting device of claim 18 wherein the average distance is at least 25% of the average total length of the tapered light mixing region.

20. A film-based lightguide comprising:
a lightguide formed from a film having lateral edges and opposing surfaces with a thickness not greater than about 0.5 millimeters therebetween;
a light emitting region of the lightguide defined by a plurality of light extraction features;
a tapered light mixing region of the lightguide comprising a tapered region increasing in width in a direction along the film toward the light emitting region, the tapered light mixing region configured to receive light from a light source and propagate the light to the light emitting region of the lightguide; and
a plurality of interior light directing edges positioned between the lateral edges of the film in the tapered light mixing region, the plurality of interior light directing edges comprising linear sections in a form of stepped facets that collectively redirect light within the tapered light mixing region of the lightguide as a curved section.

* * * * *